(12) United States Patent
van der Merwe et al.

(10) Patent No.: US 11,681,293 B2
(45) Date of Patent: Jun. 20, 2023

(54) SYSTEM AND METHOD FOR DISTRIBUTED UTILITY SERVICE EXECUTION

(71) Applicant: DEKA Products Limited Partnership, Manchester, NH (US)

(72) Inventors: Dirk A. van der Merwe, Canterbury, NH (US); Dean Kamen, Bedford, NH (US); Derek G. Kane, Manchester, NH (US); Gregory J. Buitkus, Dracut, MA (US); Emily A. Carrigg, Weare, NH (US); Raphael I. Zack, Manchester, NH (US); Daniel F. Pawlowski, Raymond, NH (US); Matthew B. Kinberger, Manchester, NH (US); Stewart M. Coulter, Bedford, NH (US); Christopher C. Langenfeld, Nashua, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 475 days.

(21) Appl. No.: 16/435,007

(22) Filed: Jun. 7, 2019

(65) Prior Publication Data
US 2019/0377349 A1 Dec. 12, 2019

Related U.S. Application Data

(60) Provisional application No. 62/682,129, filed on Jun. 7, 2018.

(51) Int. Cl.
G05D 1/02 (2020.01)
G06Q 10/0835 (2023.01)
B60L 53/80 (2019.01)

(52) U.S. Cl.
CPC ......... G05D 1/0212 (2013.01); G05D 1/0231 (2013.01); G05D 1/0255 (2013.01);
(Continued)

(58) Field of Classification Search
CPC .. G05D 1/0212; G05D 1/0231; G05D 1/0255; G05D 1/0257; G05D 1/0276;
(Continued)

(56) References Cited

U.S. PATENT DOCUMENTS

| 584,127 A | 6/1897 | Draullette et al. |
| 849,270 A | 4/1907 | Schafer |

(Continued)

FOREIGN PATENT DOCUMENTS

| CA | 2822729 | 3/2006 |
| CA | 2897221 | 3/2006 |

(Continued)

OTHER PUBLICATIONS

U.S. Appl. No. 15/600,703 (U22), B1-B100, B102-B103.
(Continued)

*Primary Examiner* — Anshul Sood
(74) *Attorney, Agent, or Firm* — William A. Bonk, III

(57) ABSTRACT

Utility services related to executing services requiring trips of various lengths, and short-distance assistance to customers. Utility services can be delivered by semi-autonomous and autonomous vehicles on various types of routes, and can be delivered economically. A network of utility vehicles provide the utility services, and can include a commonly-shared dispatch system.

34 Claims, 43 Drawing Sheets

(52) U.S. Cl.
CPC ......... *G05D 1/0257* (2013.01); *G05D 1/0276* (2013.01); *G06Q 10/08355* (2013.01); *B60L 53/80* (2019.02); *G05D 2201/0213* (2013.01)

(58) Field of Classification Search
CPC ........... G05D 2201/0213; G06Q 10/08; G06Q 10/08355; G06Q 50/28
See application file for complete search history.

(56) References Cited

U.S. PATENT DOCUMENTS

| | | | |
|---|---|---|---|
| 880,823 A | 3/1908 | Redfield |
| 2,224,411 A | 12/1940 | Smith |
| 2,415,056 A | 1/1947 | Wheeler |
| 2,618,447 A | 11/1952 | Lecarme |
| 2,742,973 A | 4/1956 | Johannesen |
| 2,966,223 A | 12/1960 | Gleasman |
| 3,017,199 A | 1/1962 | Sechrist |
| 3,145,797 A | 8/1964 | Taylor |
| 3,179,355 A | 4/1965 | Pickering |
| 3,260,324 A | 7/1966 | Suarez |
| 3,283,398 A | 11/1966 | Andren |
| 3,288,234 A | 11/1966 | Feliz |
| 3,306,626 A | 2/1967 | Kawada |
| 3,313,365 A | 4/1967 | Jackson |
| 3,338,328 A | 8/1967 | Cataldo |
| 3,348,518 A | 10/1967 | Forsyth |
| 3,374,845 A | 3/1968 | Selwyn |
| 3,399,742 A | 9/1968 | Malick |
| 3,446,304 A | 5/1969 | Alimanestiand |
| 3,450,219 A | 6/1969 | Fleming |
| 3,515,401 A | 6/1970 | Gross |
| 3,580,344 A | 5/1971 | Floyd |
| 3,596,298 A | 8/1971 | Durst, Jr. |
| 3,628,624 A | 12/1971 | Wesener |
| 3,718,342 A | 2/1973 | Freed |
| 3,787,066 A | 1/1974 | Hautier |
| 3,790,150 A | 2/1974 | Lippert |
| 3,860,264 A | 1/1975 | Douglas |
| 3,872,945 A | 3/1975 | Hickman |
| 3,893,689 A | 7/1975 | Verhoff |
| 3,952,822 A | 4/1976 | Udden |
| 3,965,402 A | 6/1976 | Mogle |
| 3,993,154 A | 11/1976 | Simmons et al. |
| 4,005,907 A | 2/1977 | Bonomo |
| 4,018,440 A | 4/1977 | Deutsch |
| 4,030,753 A | 6/1977 | Meiners |
| 4,054,319 A | 10/1977 | Fogg et al. |
| 4,062,558 A | 12/1977 | Wasserman |
| 4,065,145 A | 12/1977 | Chambers |
| 4,065,146 A | 12/1977 | Denzer |
| 4,076,270 A | 2/1978 | Winchell |
| 4,078,627 A | 3/1978 | Brown et al. |
| 4,087,107 A | 5/1978 | Winchell |
| 4,088,199 A | 5/1978 | Trautwein |
| 4,094,372 A | 6/1978 | Notter |
| 4,109,741 A | 8/1978 | Gabriel |
| 4,111,445 A | 9/1978 | Haibeck |
| 4,115,445 A | 9/1978 | Hearsey |
| 4,140,200 A | 2/1979 | Tucek |
| 4,151,892 A | 5/1979 | Francken |
| D253,234 S | 10/1979 | Cooke |
| 4,222,449 A | 9/1980 | Feliz |
| 4,264,082 A | 4/1981 | Fouchey, Jr. |
| 4,266,627 A | 5/1981 | Lauber |
| 4,274,503 A | 6/1981 | Charles Mackintosh |
| 4,281,734 A | 8/1981 | Johnston |
| 4,293,052 A | 10/1981 | Daswick |
| 4,307,788 A | 12/1981 | Shelton |
| 4,325,565 A | 4/1982 | Winchell |
| 4,354,569 A | 10/1982 | Eichholz |
| D266,758 S | 11/1982 | Johannsen et al. |
| 4,363,493 A | 12/1982 | Veneklasen |
| 4,373,600 A | 2/1983 | Buschbom |
| 4,375,840 A | 3/1983 | Campbell |
| 4,413,693 A | 11/1983 | Derby |
| 4,448,455 A | 5/1984 | Ellegaard |
| 4,456,086 A | 6/1984 | Wier |
| 4,484,648 A | 11/1984 | Jephcott |
| 4,510,956 A | 4/1985 | King |
| 4,512,588 A | 4/1985 | Cox |
| 4,556,997 A | 12/1985 | Takamiya |
| 4,560,022 A | 12/1985 | Kassai |
| 4,566,707 A | 1/1986 | Nitzberg |
| 4,570,078 A | 2/1986 | Yashima |
| 4,571,844 A | 2/1986 | Komasaku |
| 4,624,469 A | 11/1986 | Bourne, Jr. |
| 4,648,783 A | 3/1987 | Tan |
| 4,657,271 A | 4/1987 | Salmon |
| 4,657,272 A | 4/1987 | Davenport |
| 4,674,584 A | 6/1987 | Watkins |
| 4,685,693 A | 8/1987 | Vadjunec |
| 4,709,772 A | 12/1987 | Brunet |
| 4,712,806 A | 12/1987 | Patrin |
| 4,716,980 A | 1/1988 | Butler |
| 4,722,547 A | 2/1988 | Kishi |
| 4,732,353 A | 3/1988 | Studer |
| 4,740,001 A | 4/1988 | Torleumke |
| 4,746,132 A | 5/1988 | Eagan |
| 4,750,578 A | 6/1988 | Brandenfels |
| 4,754,255 A | 6/1988 | Sanders et al. |
| 4,770,410 A | 9/1988 | Brown |
| 4,778,133 A | 10/1988 | Sakurai |
| 4,786,069 A | 11/1988 | Tang |
| 4,787,679 A | 11/1988 | Arnold |
| 4,790,400 A | 12/1988 | Sheeter |
| 4,790,548 A | 12/1988 | Decelles |
| 4,794,730 A | 1/1989 | Fischbach |
| 4,794,999 A | 1/1989 | Hester |
| 4,798,255 A | 1/1989 | Wu |
| 4,802,542 A | 2/1989 | Houston |
| 4,809,804 A | 3/1989 | Houston |
| 4,834,200 A | 5/1989 | Kajita |
| 4,837,694 A | 6/1989 | Narita et al. |
| 4,863,182 A | 9/1989 | Chern |
| 4,867,188 A | 9/1989 | Reid |
| 4,869,279 A | 9/1989 | Hedges |
| 4,874,055 A | 10/1989 | Beer |
| 4,890,853 A | 1/1990 | Olson |
| 4,897,070 A | 1/1990 | Wagstaff |
| 4,913,252 A | 4/1990 | Bartley et al. |
| 4,919,225 A | 4/1990 | Sturges |
| D308,364 S | 6/1990 | Beasley, Jr. et al. |
| 4,941,854 A | 7/1990 | Takahashi et al. |
| 4,944,360 A | 7/1990 | Sturges |
| 4,953,851 A | 9/1990 | Sherlock |
| 4,964,679 A | 10/1990 | Rath |
| 4,967,862 A | 11/1990 | Pong et al. |
| 4,973,071 A | 11/1990 | Ishizaki |
| 4,984,754 A | 1/1991 | Yarrington |
| 4,985,947 A | 1/1991 | Ethridge |
| 4,998,596 A | 3/1991 | Miksitz |
| 5,001,636 A | 3/1991 | Shiraishi et al. |
| 5,002,295 A | 3/1991 | Lin |
| 5,011,171 A | 4/1991 | Cook |
| 5,012,176 A | 4/1991 | LaForge |
| RE33,675 E | 8/1991 | Young |
| 5,044,457 A | 9/1991 | Aikman |
| 5,052,237 A | 10/1991 | Reimann |
| 5,076,390 A | 12/1991 | Haskins |
| 5,087,103 A | 2/1992 | Pompier |
| 5,088,761 A | 2/1992 | Takehara et al. |
| 5,098,041 A | 3/1992 | Uetrecht |
| 5,111,899 A | 5/1992 | Reimann |
| 5,123,972 A | 6/1992 | Ostrander |
| 5,124,938 A | 6/1992 | Algrain |
| 5,125,468 A | 6/1992 | Coker |
| 5,127,709 A | 7/1992 | Rubinstein |
| 5,136,219 A | 8/1992 | Takahashi |
| 5,158,493 A | 10/1992 | Morgrey |
| 5,161,820 A | 11/1992 | Vollmer |
| 5,165,711 A | 11/1992 | Tsai |
| 5,168,947 A | 12/1992 | Rodenborn |
| 5,171,173 A | 12/1992 | Henderson |

(56) References Cited

U.S. PATENT DOCUMENTS

| | | |
|---|---|---|
| 5,186,270 A | 2/1993 | West |
| 5,208,521 A | 5/1993 | Aoyama |
| 5,217,246 A | 6/1993 | Williams |
| 5,221,883 A | 6/1993 | Takenaka |
| 5,229,068 A | 7/1993 | Johansson et al. |
| 5,241,875 A | 9/1993 | Kochanneck |
| 5,248,007 A | 9/1993 | Watkins |
| 5,261,503 A | 11/1993 | Yasui |
| 5,274,576 A | 12/1993 | Williams |
| 5,276,588 A | 1/1994 | Repplinger |
| 5,276,624 A | 1/1994 | Ito |
| 5,297,646 A | 3/1994 | Yamamura |
| 5,307,888 A | 5/1994 | Urvoy |
| 5,307,892 A | 5/1994 | Philips |
| 5,314,034 A | 5/1994 | Chittal |
| 5,350,033 A | 9/1994 | Kraft |
| 5,364,165 A | 11/1994 | Okamoto |
| 5,366,036 A | 11/1994 | Perry |
| 5,369,580 A | 11/1994 | Monji |
| 5,376,868 A | 12/1994 | Toyoda |
| D355,148 S | 2/1995 | Orsolini |
| 5,388,658 A | 2/1995 | Ando et al. |
| 5,397,890 A | 3/1995 | Schueler |
| 5,408,411 A | 4/1995 | Nakamura |
| 5,408,811 A | 4/1995 | Satake |
| 5,417,298 A | 5/1995 | Shibahata |
| 5,419,624 A | 5/1995 | Adler |
| 5,450,919 A | 9/1995 | Shitani |
| 5,465,806 A | 11/1995 | Higasa |
| 5,482,125 A | 1/1996 | Pagett |
| D373,121 S | 8/1996 | Deiuliis et al. |
| 5,551,756 A | 9/1996 | Gurasich et al. |
| 5,575,348 A | 11/1996 | Goertzen |
| 5,576,959 A | 11/1996 | Hrovat |
| D376,585 S | 12/1996 | Wathen et al. |
| 5,615,116 A | 3/1997 | Gudat |
| D381,325 S | 7/1997 | McMahan et al. |
| 5,646,845 A | 7/1997 | Gudat |
| 5,649,605 A | 7/1997 | Ronne et al. |
| 5,657,828 A | 8/1997 | Nagamachi |
| 5,695,021 A | 12/1997 | Schaffner |
| 5,701,965 A | 12/1997 | Kamen et al. |
| 5,701,968 A | 12/1997 | Wright-Ott |
| 5,705,746 A | 1/1998 | Trost |
| 5,732,379 A | 3/1998 | Eckert |
| 5,743,347 A | 4/1998 | Gingerich |
| 5,746,282 A | 5/1998 | Fujiwara |
| 5,769,441 A | 6/1998 | Namngani |
| 5,774,819 A | 6/1998 | Yamamoto et al. |
| 5,775,452 A | 7/1998 | Patmont |
| 5,791,425 A | 8/1998 | Kamen |
| 5,794,730 A | 8/1998 | Kamen |
| 5,799,745 A | 9/1998 | Fukatani |
| 5,799,914 A | 9/1998 | Chivallier et al. |
| 5,826,209 A | 10/1998 | Matsuno |
| D402,645 S | 12/1998 | Garguilo |
| 5,848,660 A | 12/1998 | McGreen |
| 5,850,136 A | 12/1998 | Kaneko |
| 5,869,943 A | 2/1999 | Nakashima et al. |
| 5,869,946 A | 2/1999 | Carobolante |
| 5,893,896 A | 4/1999 | Imamura et al. |
| 5,927,414 A | 7/1999 | Kan et al. |
| 5,928,309 A | 7/1999 | Korver |
| 5,931,421 A | 8/1999 | Surauer et al. |
| 5,939,864 A | 8/1999 | Lenhart et al. |
| 5,965,991 A | 10/1999 | Koike |
| 5,971,091 A | 10/1999 | Kamen |
| 5,973,463 A | 10/1999 | Okuda |
| 5,975,225 A | 11/1999 | Kamen |
| 5,986,221 A | 11/1999 | Stanley |
| 6,002,975 A | 12/1999 | Schiffmann |
| 6,003,624 A | 12/1999 | Jorgensen et al. |
| 6,024,182 A | 2/2000 | Hamada et al. |
| 6,036,619 A | 3/2000 | Tashiro |
| 6,039,142 A | 3/2000 | Eckstein |
| 6,050,357 A | 4/2000 | Staelin |
| 6,052,647 A | 4/2000 | Parkinson |
| 6,053,579 A | 4/2000 | Nelson et al. |
| 6,059,062 A | 5/2000 | Staelin |
| 6,062,600 A | 5/2000 | Kamen et al. |
| 6,062,651 A | 5/2000 | Schaad |
| 6,065,558 A | 5/2000 | Wielenga |
| 6,073,951 A | 6/2000 | Jindra et al. |
| 6,076,033 A | 6/2000 | Hamada |
| 6,089,680 A | 7/2000 | Yoshioka et al. |
| 6,092,249 A | 7/2000 | Kamen et al. |
| D428,936 S | 8/2000 | Serfaty et al. |
| 6,105,704 A | 8/2000 | Hamada |
| 6,108,592 A | 8/2000 | Kurtzberg et al. |
| 6,123,398 A | 9/2000 | Arai |
| 6,125,953 A | 10/2000 | Arai |
| 6,125,957 A | 10/2000 | Kauffmann |
| 6,131,057 A | 10/2000 | Tamaki |
| 6,141,613 A | 10/2000 | Fan |
| 6,148,939 A | 11/2000 | Brookhart |
| 6,154,692 A | 11/2000 | Cielaszyk |
| D434,762 S | 12/2000 | Ikenaga |
| 6,169,946 B1 | 1/2001 | Griessbach |
| 6,189,643 B1 | 2/2001 | Takahashi |
| 6,192,305 B1 | 2/2001 | Schiffmann |
| 6,208,734 B1 | 3/2001 | Ortscheid et al. |
| 6,208,929 B1 | 3/2001 | Matsuno et al. |
| 6,212,276 B1 | 4/2001 | Inoue |
| 6,223,104 B1 | 4/2001 | Kamen |
| 6,223,114 B1 | 4/2001 | Boros |
| 6,225,977 B1 | 5/2001 | Li |
| D444,184 S | 6/2001 | Kettler |
| 6,247,548 B1 | 6/2001 | Hayashi |
| 6,260,646 B1 | 7/2001 | Fernandez et al. |
| 6,263,261 B1 | 7/2001 | Brown |
| 6,264,218 B1 | 7/2001 | Slagerman |
| 6,270,105 B1 | 8/2001 | Friedrich |
| 6,273,212 B1 | 8/2001 | Husted et al. |
| 6,276,471 B1 | 8/2001 | Kratzenberg et al. |
| 6,285,778 B1 | 9/2001 | Nakajima |
| 6,288,505 B1 | 9/2001 | Heinzmann |
| 6,292,722 B1 | 9/2001 | Holmes et al. |
| 6,302,230 B1 | 10/2001 | Kamen |
| 6,311,794 B1 | 11/2001 | Morrell et al. |
| 6,320,336 B1 | 11/2001 | Eguchi |
| 6,324,446 B1 | 11/2001 | Brown et al. |
| 6,325,736 B1 | 12/2001 | Hamada |
| 6,328,125 B1 | 12/2001 | Van Den Brink |
| 6,332,103 B1 | 12/2001 | Steenson, Jr. |
| 6,332,104 B1 | 12/2001 | Brown |
| D452,692 S | 1/2002 | Fukuda |
| 6,343,664 B2 | 2/2002 | Morrell et al. |
| 6,356,188 B1 | 3/2002 | Meyers |
| 6,357,544 B1 | 3/2002 | Kamen |
| 6,360,996 B1 | 3/2002 | Bockman et al. |
| 6,367,817 B1 | 4/2002 | Kamen |
| 6,371,228 B1 | 4/2002 | Husted et al. |
| 6,375,209 B1 | 4/2002 | Schlangen |
| 6,377,906 B1 | 4/2002 | Rowe |
| 6,386,576 B1 | 5/2002 | Kamen et al. |
| 6,388,580 B1 | 5/2002 | Graham |
| 6,397,046 B1 | 5/2002 | Kfoury |
| 6,405,816 B1 | 6/2002 | Kamen et al. |
| 6,408,240 B1 | 6/2002 | Morrell et al. |
| 6,415,215 B1 | 7/2002 | Nishizaki |
| 6,415,879 B2 | 7/2002 | Kamen et al. |
| 6,416,272 B1 | 7/2002 | Suehiro |
| 6,435,535 B1 | 8/2002 | Field |
| 6,435,538 B2 | 8/2002 | Ellis |
| 6,443,250 B1 | 9/2002 | Kamen et al. |
| 6,443,251 B1 | 9/2002 | Morrell et al. |
| 6,446,320 B1 | 9/2002 | Kilgore |
| 6,463,369 B2 | 10/2002 | Sadano |
| D466,122 S | 11/2002 | Moody |
| 6,484,829 B1 | 11/2002 | Cox |
| D466,516 S | 12/2002 | Peiker |
| 6,502,011 B2 | 12/2002 | Haag |
| 6,508,319 B1 | 1/2003 | Langenfeld et al. |
| 6,538,411 B1 | 3/2003 | Field et al. |

(56) References Cited

U.S. PATENT DOCUMENTS

| | | |
|---|---|---|
| 6,543,564 B1 | 4/2003 | Kamen |
| 6,543,848 B1 | 4/2003 | Yasuo Suga et al. |
| 6,543,858 B1 | 4/2003 | Melton |
| 6,547,026 B2 | 4/2003 | Kamen et al. |
| 6,553,271 B1 | 4/2003 | Morrell |
| 6,554,250 B2 | 4/2003 | Alves et al. |
| 6,556,909 B2 | 4/2003 | Matsumoto |
| 6,561,294 B1 | 5/2003 | Kamen |
| 6,562,511 B2 | 5/2003 | Daroux |
| 6,571,176 B1 | 5/2003 | Shinmura |
| 6,571,892 B2 | 6/2003 | Kamen |
| 6,575,539 B2 | 6/2003 | Reich |
| 6,581,714 B1 | 6/2003 | Kamen |
| 6,582,181 B2 | 6/2003 | Suehiro et al. |
| 6,586,901 B1 | 7/2003 | Singer et al. |
| 6,593,849 B2 | 7/2003 | Chubb |
| 6,598,941 B2 | 7/2003 | Field et al. |
| 6,614,343 B1 | 9/2003 | Fennel |
| 6,615,938 B2 | 9/2003 | Morrell et al. |
| 6,634,451 B2 | 10/2003 | Sakakiyama |
| 6,643,451 B1 | 11/2003 | Tokura et al. |
| 6,647,248 B1 | 11/2003 | Ortscheid et al. |
| 6,651,763 B1 | 11/2003 | Kamen et al. |
| 6,651,766 B2 | 11/2003 | Kamen |
| 6,654,674 B2 | 11/2003 | Lu |
| 6,654,675 B2 | 11/2003 | Pedersen et al. |
| 6,659,211 B2 | 12/2003 | Esposito |
| 6,659,570 B2 | 12/2003 | Nakamura |
| D485,279 S | 1/2004 | DeCombe |
| 6,694,225 B2 | 2/2004 | Aga |
| 6,704,622 B2 | 3/2004 | Tinskey |
| 6,713,693 B1 | 3/2004 | Sadowski et al. |
| D489,027 S | 4/2004 | Waters |
| D489,029 S | 4/2004 | Waters |
| D489,300 S | 5/2004 | Chang |
| 6,752,231 B2 | 6/2004 | Hume |
| D493,127 S | 7/2004 | Waters |
| D493,128 S | 7/2004 | Waters |
| D493,801 S | 8/2004 | Byun |
| D494,099 S | 8/2004 | Maurer |
| 6,779,621 B2 | 8/2004 | Kamen et al. |
| 6,781,960 B1 | 8/2004 | Charas |
| 6,789,640 B1 | 9/2004 | Arling |
| 6,793,258 B2 | 9/2004 | Gray |
| 6,796,396 B2 | 9/2004 | Kamen |
| 6,799,649 B2 | 10/2004 | Kamen et al. |
| 6,827,163 B2 | 12/2004 | Amsbury et al. |
| 6,856,326 B1 | 2/2005 | Zhai |
| D503,402 S | 3/2005 | Su et al. |
| 6,866,107 B2 | 3/2005 | Heinzmann et al. |
| 6,868,931 B2 | 3/2005 | Morrell |
| D503,928 S | 4/2005 | Obata |
| 6,874,591 B2 | 4/2005 | Morrell et al. |
| 6,889,784 B2 | 5/2005 | Troll |
| 6,907,949 B1 | 6/2005 | Wang |
| D507,206 S | 7/2005 | Wang |
| 6,920,947 B2 | 7/2005 | Kamen et al. |
| 6,938,923 B2 | 9/2005 | Mulhern et al. |
| 6,962,383 B2 | 11/2005 | Takenoshita et al. |
| 6,965,206 B2 | 11/2005 | Kamen et al. |
| 6,969,079 B2 | 11/2005 | Kamen et al. |
| 7,000,933 B2 | 2/2006 | Arling et al. |
| 7,004,271 B1 | 2/2006 | Kamen et al. |
| 7,006,901 B2 | 2/2006 | Wang |
| D517,086 S | 3/2006 | Siebel |
| 7,017,686 B2 | 3/2006 | Kamen et al. |
| D521,017 S | 5/2006 | Jewitt |
| 7,040,713 B2 | 5/2006 | Rudolf |
| D524,315 S | 7/2006 | Reusing |
| 7,090,040 B2 | 8/2006 | Kamen et al. |
| D528,468 S | 9/2006 | Arling |
| D529,005 S | 9/2006 | Hong |
| 7,102,328 B2 | 9/2006 | Long et al. |
| 7,130,702 B2 | 10/2006 | Morrell |
| 7,174,976 B2 | 2/2007 | Kamen et al. |
| 7,178,611 B2 | 2/2007 | Zupanick |
| 7,178,614 B2 | 2/2007 | Ishii |
| 7,182,166 B2 | 2/2007 | Gray et al. |
| D539,810 S | 4/2007 | Cummins |
| 7,198,223 B2 | 4/2007 | Phelps, III et al. |
| 7,210,544 B2 | 5/2007 | Kamen et al. |
| 7,219,912 B2 | 5/2007 | Meyer |
| D544,486 S | 6/2007 | Hussaini |
| 7,234,779 B2 | 6/2007 | Bedford et al. |
| D546,782 S | 7/2007 | Poulet et al. |
| D549,721 S | 8/2007 | Ito |
| D549,722 S | 8/2007 | Ito et al. |
| D551,592 S | 9/2007 | Chang et al. |
| D551,722 S | 9/2007 | Chang et al. |
| 7,272,681 B2 | 9/2007 | Davies |
| 7,273,116 B2 | 9/2007 | Kamen et al. |
| D552,609 S | 10/2007 | Kornblum |
| 7,275,607 B2 | 10/2007 | Kamen et al. |
| D556,149 S | 11/2007 | Kaufhold et al. |
| D557,220 S | 12/2007 | Ewringmann |
| D557,221 S | 12/2007 | Ewringmann |
| 7,303,032 B2 | 12/2007 | Kahlert et al. |
| 7,316,441 B2 | 1/2008 | Iwatani et al. |
| D564,033 S | 3/2008 | Itskov et al. |
| 7,363,993 B2 | 4/2008 | Ishii |
| 7,370,713 B1 | 5/2008 | Kamen |
| 7,399,035 B2 | 7/2008 | Kusanagi et al. |
| 7,481,291 B2 | 1/2009 | Nishikawa |
| D585,906 S | 2/2009 | Berg et al. |
| D587,660 S | 3/2009 | Lin |
| 7,539,557 B2 | 5/2009 | Yamauchi |
| 7,546,889 B2 | 6/2009 | Kamen et al. |
| D598,927 S | 8/2009 | Hirsch |
| 7,589,643 B2 | 9/2009 | Dagci |
| 7,592,900 B2 | 9/2009 | Kamen et al. |
| D601,922 S | 10/2009 | Imai et al. |
| 7,640,086 B2 | 12/2009 | Nakashima et al. |
| 7,688,191 B2 | 3/2010 | Lu |
| 7,690,447 B2 | 4/2010 | Kamen et al. |
| 7,690,452 B2 | 4/2010 | Kamen et al. |
| 7,703,568 B2 | 4/2010 | Ishii |
| D614,998 S | 5/2010 | Fujita |
| 7,740,099 B2 | 6/2010 | Field et al. |
| D619,945 S | 7/2010 | Sadanowicz et al. |
| 7,757,794 B2 | 7/2010 | Heinzmann et al. |
| 7,789,174 B2 | 9/2010 | Kamen |
| 7,823,676 B2 | 11/2010 | Yamada et al. |
| 7,856,248 B1 | 12/2010 | Fujisaki |
| 7,857,088 B2 | 12/2010 | Field |
| D632,229 S | 2/2011 | Kruse |
| 7,896,440 B2 | 3/2011 | Tsai |
| 7,900,725 B2 | 3/2011 | Heinzmann et al. |
| 7,917,097 B2 | 3/2011 | Hawkins et al. |
| 7,938,207 B2 | 5/2011 | Kamen et al. |
| 7,958,956 B2 | 6/2011 | Kakinuma et al. |
| D644,654 S | 9/2011 | Maitlen et al. |
| 8,011,459 B2 | 9/2011 | Serai |
| 8,014,923 B2 | 9/2011 | Ishii |
| 8,025,325 B1 | 9/2011 | Carrier et al. |
| 8,028,777 B2 | 10/2011 | Kakinuma |
| 8,050,820 B2 | 11/2011 | Yanaka |
| 8,050,837 B2 | 11/2011 | Yamada |
| 8,074,388 B2 | 12/2011 | Trainer |
| 8,091,672 B2 | 1/2012 | Gutsch |
| 8,113,244 B2 | 2/2012 | Kamen et al. |
| 8,151,912 B2 | 4/2012 | Koide et al. |
| 8,155,828 B2 | 4/2012 | Fuwa et al. |
| 8,160,794 B2 | 4/2012 | Fuwa |
| 8,162,089 B2 | 4/2012 | Shaw |
| 8,170,780 B2 | 5/2012 | Field |
| 8,170,781 B2 | 5/2012 | Fuwa |
| 8,172,016 B2 | 5/2012 | Goertzen et al. |
| 8,186,462 B2 | 5/2012 | Kamen |
| 8,224,524 B2 | 7/2012 | Nakashima |
| 8,225,891 B2 | 7/2012 | Takenaka |
| 8,239,992 B2 | 8/2012 | Schnittman |
| 8,248,222 B2 | 8/2012 | Kamen |
| 8,249,773 B2 | 8/2012 | Kawada |
| 8,255,105 B2 | 8/2012 | Weissert |

(56) References Cited

U.S. PATENT DOCUMENTS

| | | |
|---|---|---|
| 8,265,774 B2 | 9/2012 | Senba |
| 8,269,130 B2 | 9/2012 | Mangan et al. |
| 8,285,474 B2 | 10/2012 | Doi |
| 8,312,017 B2 | 11/2012 | Martin et al. |
| 8,326,469 B2 | 12/2012 | Phillips |
| 8,346,441 B2 | 1/2013 | Miki et al. |
| 8,371,410 B2 | 2/2013 | Fuwa |
| D678,217 S | 3/2013 | Helm |
| D678,320 S | 3/2013 | Kanalakis, Jr. |
| 8,396,611 B2 | 3/2013 | Phillips |
| 8,417,404 B2 | 4/2013 | Yen |
| 8,418,705 B2 | 4/2013 | Ota et al. |
| 8,453,768 B2 | 6/2013 | Kamen |
| 8,467,941 B2 | 6/2013 | Field |
| D686,200 S | 7/2013 | Huang et al. |
| 8,490,723 B2 | 7/2013 | Heinzmann |
| 8,504,248 B2 | 8/2013 | Taira |
| 8,564,444 B2 | 10/2013 | Ota et al. |
| 8,572,822 B2 | 11/2013 | Hasegawa |
| 8,584,782 B2 | 11/2013 | Chen |
| 8,587,583 B2 | 11/2013 | Newcombe |
| 8,621,684 B2 | 1/2014 | Okumatsu |
| 8,636,451 B2 | 1/2014 | Yamashita et al. |
| 8,639,416 B2 | 1/2014 | Jones |
| 8,640,807 B2 | 2/2014 | Takenaka |
| 8,672,339 B2 | 3/2014 | Raike, III |
| 8,672,356 B2 | 3/2014 | Inaguma |
| 8,684,123 B2 | 4/2014 | Chen |
| 8,690,265 B2 | 4/2014 | Noblanc |
| D704,621 S | 5/2014 | Taylor |
| D705,799 S | 5/2014 | Funabashi et al. |
| 8,738,238 B2 | 5/2014 | Rekow |
| 8,738,278 B2 | 5/2014 | Chen |
| D706,807 S | 6/2014 | Harre |
| D707,701 S | 6/2014 | d'Amore |
| 8,744,720 B1 | 6/2014 | Fujisaki |
| 8,753,208 B2 | 6/2014 | Jaouen et al. |
| D708,203 S | 7/2014 | Johnson |
| 8,775,001 B2 | 7/2014 | Phillips |
| 8,807,250 B2 | 8/2014 | Chen |
| 8,830,048 B2 | 9/2014 | Kamen et al. |
| 8,832,875 B2 | 9/2014 | Odashima et al. |
| 8,843,244 B2 | 9/2014 | Phillips |
| D716,325 S | 10/2014 | Brudnicki |
| 8,860,551 B2 | 10/2014 | Carraher |
| D716,818 S | 11/2014 | Alegiani |
| 8,925,563 B2 | 1/2015 | Ota et al. |
| 8,958,976 B2 | 2/2015 | Kajima |
| D723,558 S | 3/2015 | Downs |
| 8,978,791 B2 | 3/2015 | Ha |
| 9,002,535 B2 | 4/2015 | Powers |
| 9,016,410 B2 | 4/2015 | Trowell et al. |
| D729,270 S | 5/2015 | Clare |
| D729,833 S | 5/2015 | Clare |
| 9,038,212 B2 | 5/2015 | Yamaguchi et al. |
| D732,062 S | 6/2015 | Kwon |
| 9,045,190 B2 | 6/2015 | Chen |
| 9,056,629 B2 | 6/2015 | Kamo |
| 9,079,039 B2 | 7/2015 | Carlson |
| 9,096,281 B1 | 8/2015 | Li |
| D738,907 S | 9/2015 | Cabrera-Cordon et al. |
| D738,913 S | 9/2015 | Cabrera-Cordon et al. |
| 9,126,497 B2 | 9/2015 | Heinzmann |
| 9,156,516 B2 | 10/2015 | Kahlert |
| D742,300 S | 11/2015 | Fontaeus |
| D742,407 S | 11/2015 | Park |
| D742,795 S | 11/2015 | Siao |
| 9,187,071 B2 | 11/2015 | Vinck et al. |
| 9,193,066 B2 | 11/2015 | Ohm |
| 9,218,003 B2 | 12/2015 | Fong |
| D747,352 S | 1/2016 | Lee et al. |
| D750,179 S | 2/2016 | Foulkes et al. |
| D752,572 S | 3/2016 | Kohler et al. |
| 9,278,036 B2 | 3/2016 | Lee |
| 9,309,692 B2 | 4/2016 | Westwinkel |
| D755,785 S | 5/2016 | Sirotich |
| D757,732 S | 5/2016 | Galanti |
| D758,284 S | 6/2016 | Ringer et al. |
| D762,179 S | 7/2016 | Wong |
| 9,400,044 B2 | 7/2016 | Wadhva et al. |
| D763,359 S | 8/2016 | Kwong |
| D764,520 S | 8/2016 | Lee et al. |
| 9,403,566 B2 | 8/2016 | Jacobsen |
| 9,404,756 B2 | 8/2016 | Fong |
| D765,718 S | 9/2016 | Vinna |
| D766,312 S | 9/2016 | Hedges |
| 9,455,104 B1 | 9/2016 | Leusenkamp et al. |
| D769,314 S | 10/2016 | Piroddi |
| D770,514 S | 11/2016 | Bae et al. |
| D772,255 S | 11/2016 | Taylor et al. |
| D772,924 S | 11/2016 | Begin et al. |
| D772,930 S | 11/2016 | Vazquez et al. |
| D775,148 S | 12/2016 | Anzures |
| 9,527,213 B2 | 12/2016 | Luo |
| D778,312 S | 2/2017 | Goodwin et al. |
| 9,567,021 B2 | 2/2017 | Mailey |
| D784,405 S | 4/2017 | Kim et al. |
| D786,278 S | 5/2017 | Motamedi |
| D786,770 S | 5/2017 | Smallhorn |
| D787,420 S | 5/2017 | Smallhorn |
| D787,996 S | 5/2017 | Rode et al. |
| 9,636,265 B2 | 5/2017 | Furuta |
| 9,656,704 B2 | 5/2017 | Couture |
| 9,662,438 B2 | 5/2017 | Kamen et al. |
| D791,174 S | 7/2017 | Hart et al. |
| D792,444 S | 7/2017 | Cho et al. |
| D794,674 S | 8/2017 | Brush |
| 9,730,029 B2 | 8/2017 | Choudhury |
| 9,744,879 B2 | 8/2017 | Drako |
| D797,772 S | 9/2017 | Mizono et al. |
| D798,318 S | 9/2017 | Ferguson |
| 9,750,896 B2 | 9/2017 | Kamen et al. |
| 9,770,825 B2 | 9/2017 | Goldenberg |
| D801,996 S | 11/2017 | Yang |
| D802,002 S | 11/2017 | Howard et al. |
| D804,393 S | 12/2017 | Yoo et al. |
| D805,972 S | 12/2017 | Lee et al. |
| D805,973 S | 12/2017 | Mullaney |
| D807,235 S | 1/2018 | Collins |
| D807,236 S | 1/2018 | Collins |
| D807,277 S | 1/2018 | Lee et al. |
| D812,533 S | 3/2018 | Lee et al. |
| D814,370 S | 4/2018 | Kim et al. |
| D816,090 S | 4/2018 | Stonecipher et al. |
| 9,974,467 B2 | 5/2018 | Blahnik et al. |
| D821,410 S | 6/2018 | Vinna et al. |
| 9,989,970 B1 | 6/2018 | Morey |
| 9,996,157 B2 | 6/2018 | Chaudhri et al. |
| 10,007,391 B2 | 6/2018 | Sabatelli et al. |
| 10,025,472 B2 | 7/2018 | Sabatelli |
| D825,437 S | 8/2018 | Hilton et al. |
| D825,493 S | 8/2018 | Chen |
| D826,244 S | 8/2018 | Yampolskaya |
| D826,255 S | 8/2018 | Andrizzi et al. |
| 10,055,108 B2 | 8/2018 | Bates |
| 10,055,184 B1 | 8/2018 | Ferrell et al. |
| D829,740 S | 10/2018 | Lepine et al. |
| D830,384 S | 10/2018 | Lepine et al. |
| D830,385 S | 10/2018 | Lepine et al. |
| D830,386 S | 10/2018 | Lepine et al. |
| D831,046 S | 10/2018 | Hashimoto et al. |
| D832,289 S | 10/2018 | Chen et al. |
| 10,088,993 B2 | 10/2018 | Hall |
| 10,127,250 B2 | 11/2018 | Dingman et al. |
| 10,130,534 B2 | 11/2018 | Mattes |
| D835,118 S | 12/2018 | Lee et al. |
| D835,139 S | 12/2018 | Li |
| D835,141 S | 12/2018 | Li et al. |
| D835,632 S | 12/2018 | Liu et al. |
| 10,149,589 B2 | 12/2018 | Lindhe |
| D838,731 S | 1/2019 | Pillamarri et al. |
| 10,172,752 B2 | 1/2019 | Goffer |
| D840,413 S | 2/2019 | Leach et al. |
| D841,021 S | 2/2019 | Klar et al. |

(56) References Cited

U.S. PATENT DOCUMENTS

| | | |
|---|---|---|
| D841,022 S | 2/2019 | Klar et al. |
| D841,676 S | 2/2019 | Zhang |
| D841,687 S | 2/2019 | Muller et al. |
| 10,203,211 B1 * | 2/2019 | Mishra .............. G01C 21/3415 |
| 10,216,188 B2 | 2/2019 | Brady et al. |
| D842,897 S | 3/2019 | Kumar |
| 10,220,843 B2 | 3/2019 | Coulter |
| 10,222,798 B1 | 3/2019 | Brady et al. |
| 10,229,245 B2 | 3/2019 | Laurance |
| 10,230,538 B2 | 3/2019 | Killian et al. |
| 10,233,021 B1 * | 3/2019 | Brady ................. G05D 1/0282 |
| 10,235,014 B2 | 3/2019 | Yang |
| 10,241,516 B1 | 3/2019 | Brady et al. |
| D847,161 S | 4/2019 | Chaudhri |
| 10,266,097 B2 | 4/2019 | Takahata |
| 10,272,294 B2 | 4/2019 | Williams et al. |
| D847,836 S | 5/2019 | Thoreson |
| 10,296,167 B2 | 5/2019 | Liu |
| 10,296,194 B2 | 5/2019 | McLean |
| 10,308,430 B1 | 6/2019 | Brady et al. |
| 10,310,499 B1 | 6/2019 | Brady et al. |
| 10,318,589 B2 | 6/2019 | Sharp |
| 10,338,776 B2 | 7/2019 | Andersson |
| D855,634 S | 8/2019 | Kim |
| 10,372,304 B2 | 8/2019 | Jaramillo, III |
| 10,379,695 B2 | 8/2019 | Carlos |
| 10,386,942 B2 | 8/2019 | Kim |
| 10,423,283 B2 | 9/2019 | Ikeda |
| 10,474,737 B1 | 11/2019 | Girsova et al. |
| 10,532,885 B1 | 1/2020 | Brady et al. |
| 10,628,790 B1 * | 4/2020 | Aggarwal ............. G06Q 10/087 |
| 10,901,418 B2 | 1/2021 | Brady et al. |
| 2001/0006125 A1 | 7/2001 | Richey |
| 2001/0037163 A1 | 11/2001 | Allard |
| 2002/0007239 A1 | 1/2002 | Matsumoto |
| 2002/0011361 A1 | 1/2002 | Richey |
| 2002/0056582 A1 | 5/2002 | Chubb |
| 2002/0063006 A1 | 5/2002 | Kamen |
| 2002/0074189 A1 | 6/2002 | Hester |
| 2002/0082749 A1 | 6/2002 | Meyers |
| 2002/0121394 A1 | 9/2002 | Kamen |
| 2002/0121572 A1 | 9/2002 | Jacobson |
| 2002/0189870 A1 | 12/2002 | Kamen |
| 2003/0014167 A1 | 1/2003 | Pedersen |
| 2003/0128840 A1 | 7/2003 | Luginbill |
| 2003/0226698 A1 | 12/2003 | Kamen |
| 2004/0005958 A1 | 1/2004 | Kamen |
| 2004/0007121 A1 | 1/2004 | Graves |
| 2004/0007399 A1 | 1/2004 | Heinzmann et al. |
| 2004/0007644 A1 | 1/2004 | Phelps, III et al. |
| 2004/0055796 A1 | 3/2004 | Kamen |
| 2004/0069543 A1 | 4/2004 | Kamen |
| 2004/0124655 A1 | 7/2004 | Takenoshita et al. |
| 2004/0135434 A1 | 7/2004 | Honda |
| 2004/0201271 A1 | 10/2004 | Kakinuma |
| 2004/0256886 A1 | 12/2004 | Wu |
| 2004/0262871 A1 | 12/2004 | Schreuder |
| 2005/0029023 A1 | 2/2005 | Takami |
| 2005/0121866 A1 | 6/2005 | Kamen |
| 2005/0134014 A1 | 6/2005 | Xie |
| 2005/0211477 A1 | 9/2005 | Gray |
| 2005/0236208 A1 | 10/2005 | Runkles |
| 2005/0236894 A1 | 10/2005 | Lu et al. |
| 2005/0251292 A1 | 11/2005 | Casey |
| 2006/0108956 A1 | 5/2006 | Clark |
| 2006/0163437 A1 | 7/2006 | Lin |
| 2006/0187646 A1 | 8/2006 | Belson et al. |
| 2006/0202439 A1 | 9/2006 | Kahlert |
| 2006/0231313 A1 | 10/2006 | Ishii |
| 2006/0279554 A1 | 12/2006 | Shin |
| 2006/0293850 A1 | 12/2006 | Ahn |
| 2007/0001830 A1 | 1/2007 | Dagci |
| 2007/0055424 A1 | 3/2007 | Peters et al. |
| 2007/0085300 A1 | 4/2007 | Loewenthal |
| 2007/0100511 A1 | 5/2007 | Koerlin |
| 2007/0156286 A1 | 7/2007 | Yamauchi |
| 2007/0198175 A1 * | 8/2007 | Williams ......... G06Q 10/06311 701/533 |
| 2007/0208483 A1 | 9/2007 | Rabin |
| 2007/0213900 A1 | 9/2007 | Raab |
| 2007/0216205 A1 | 9/2007 | Davis |
| 2007/0221423 A1 | 9/2007 | Chang |
| 2007/0296170 A1 | 12/2007 | Field |
| 2008/0029985 A1 | 2/2008 | Chen |
| 2008/0042379 A1 | 2/2008 | Amran |
| 2008/0066974 A1 | 3/2008 | Pearlman |
| 2008/0086241 A1 | 4/2008 | Phillips |
| 2008/0147281 A1 | 6/2008 | Ishii |
| 2008/0149798 A1 | 6/2008 | Tinoco |
| 2008/0174415 A1 | 7/2008 | Tanida |
| 2008/0197599 A1 | 8/2008 | Comstock |
| 2008/0238005 A1 | 10/2008 | James |
| 2008/0294288 A1 | 11/2008 | Yamauchi |
| 2008/0302938 A1 | 12/2008 | Goodwin et al. |
| 2009/0009984 A1 | 1/2009 | Mangiardi |
| 2009/0032323 A1 | 2/2009 | Kakinuma |
| 2009/0037033 A1 | 2/2009 | Phillips |
| 2009/0045025 A1 | 2/2009 | Bassett |
| 2009/0078485 A1 | 3/2009 | Gutsch |
| 2009/0105908 A1 | 4/2009 | Casey |
| 2009/0115149 A1 | 5/2009 | Wallis |
| 2009/0224524 A1 | 9/2009 | Rathsack |
| 2010/0025139 A1 | 2/2010 | Kosaka |
| 2010/0107076 A1 | 4/2010 | Laurance |
| 2010/0114468 A1 | 5/2010 | Field |
| 2010/0121538 A1 | 5/2010 | Ishii |
| 2010/0126787 A1 | 5/2010 | Kawada |
| 2010/0138128 A1 | 6/2010 | Strothmann |
| 2010/0222994 A1 | 9/2010 | Field |
| 2010/0230919 A1 | 9/2010 | Kawada |
| 2010/0235028 A1 | 9/2010 | Ishii |
| 2010/0237645 A1 | 9/2010 | Trainer |
| 2010/0250040 A1 | 9/2010 | Yamano |
| 2011/0035101 A1 | 2/2011 | Kawada et al. |
| 2011/0054717 A1 | 3/2011 | Yamauchi |
| 2011/0106339 A1 | 5/2011 | Phillips et al. |
| 2011/0123286 A1 | 5/2011 | Van Roosmalen |
| 2011/0175329 A1 | 7/2011 | Gingras |
| 2011/0209929 A1 | 9/2011 | Heinzmann |
| 2011/0215540 A1 | 9/2011 | Hunziker et al. |
| 2011/0220427 A1 | 9/2011 | Chen |
| 2011/0221160 A1 | 9/2011 | Shaw |
| 2011/0225417 A1 | 9/2011 | Maharajh et al. |
| 2011/0238247 A1 | 9/2011 | Yen |
| 2011/0285195 A1 | 11/2011 | Ratgen |
| 2012/0019554 A1 | 1/2012 | Narimatu et al. |
| 2012/0046821 A1 | 2/2012 | Pettersson |
| 2012/0072052 A1 | 3/2012 | Powers |
| 2012/0168240 A1 | 7/2012 | Wilson |
| 2012/0174037 A1 | 7/2012 | Relyea et al. |
| 2012/0185091 A1 | 7/2012 | Field |
| 2012/0185094 A1 | 7/2012 | Rosenstein |
| 2012/0197470 A1 | 8/2012 | Inui |
| 2012/0205176 A1 | 8/2012 | Ha |
| 2012/0215355 A1 | 8/2012 | Bewley |
| 2012/0219395 A1 | 8/2012 | Inaguma et al. |
| 2012/0239284 A1 | 9/2012 | Field |
| 2012/0290162 A1 | 11/2012 | Stevens |
| 2012/0313335 A1 | 12/2012 | Zanderlehn |
| 2013/0032422 A1 | 2/2013 | Chen |
| 2013/0032423 A1 | 2/2013 | Chen |
| 2013/0080015 A1 | 3/2013 | Strothmann |
| 2013/0081885 A1 | 4/2013 | Connor |
| 2013/0105239 A1 | 5/2013 | Fung |
| 2013/0146409 A1 | 6/2013 | Boyle |
| 2013/0188809 A1 | 7/2013 | Jones |
| 2013/0218380 A1 | 8/2013 | Phillips et al. |
| 2013/0228385 A1 | 9/2013 | Chen |
| 2013/0231814 A1 | 9/2013 | Sarokhan |
| 2013/0253769 A1 | 9/2013 | Kamo et al. |
| 2013/0332064 A1 | 12/2013 | Funk |
| 2014/0005933 A1 | 1/2014 | Fong |
| 2014/0018994 A1 | 1/2014 | Panzarella |
| 2014/0034400 A1 | 2/2014 | Underwood |

(56) References Cited

U.S. PATENT DOCUMENTS

| | | |
|---|---|---|
| 2014/0058600 A1 | 2/2014 | Hoffmann |
| 2014/0083225 A1 | 3/2014 | Downs |
| 2014/0088761 A1 | 3/2014 | Shamlian |
| 2014/0187237 A1 | 7/2014 | Li |
| 2014/0202777 A1 | 7/2014 | Lee |
| 2014/0246257 A1 | 9/2014 | Jacobsen |
| 2014/0246258 A1 | 9/2014 | Wyrobek |
| 2014/0277888 A1 | 9/2014 | Dastoor et al. |
| 2014/0371979 A1 | 12/2014 | Drew |
| 2015/0006005 A1 | 1/2015 | Yu et al. |
| 2015/0060162 A1 | 3/2015 | Goffer |
| 2015/0112264 A1 | 4/2015 | Kamen et al. |
| 2015/0119289 A1 | 4/2015 | Chen |
| 2015/0123453 A1 | 5/2015 | Benoit, Jr. |
| 2015/0012057 A1 | 7/2015 | Carlson et al. |
| 2015/0197247 A1 | 7/2015 | Ichinokawa |
| 2015/0198440 A1 | 7/2015 | Pearlman et al. |
| 2015/0231891 A1 | 8/2015 | Yashiro et al. |
| 2015/0245962 A1 | 9/2015 | Furuta |
| 2015/0246703 A1 | 9/2015 | Oishi et al. |
| 2015/0289653 A1 | 10/2015 | Hector et al. |
| 2015/0342517 A1 | 12/2015 | Rabischong |
| 2016/0014252 A1 | 1/2016 | Biderman et al. |
| 2016/0031497 A1 | 2/2016 | Luo |
| 2016/0035161 A1 | 2/2016 | Friedli et al. |
| 2016/0069691 A1 | 3/2016 | Fong |
| 2016/0075535 A1 | 3/2016 | Ooms |
| 2016/0101685 A1 | 4/2016 | Darpino et al. |
| 2016/0144505 A1 | 5/2016 | Fong |
| 2016/0170411 A1 | 6/2016 | Wei |
| 2016/0264019 A1 | 9/2016 | Drako |
| 2016/0291848 A1 | 10/2016 | Hall |
| 2016/0362147 A1 | 12/2016 | Mailey |
| 2017/0052033 A1 | 2/2017 | Fong |
| 2017/0080967 A1 | 3/2017 | Atkins |
| 2017/0176188 A1 | 6/2017 | Georgy et al. |
| 2017/0225321 A1 | 8/2017 | Oeyle |
| 2017/0240169 A1 | 8/2017 | Coulter et al. |
| 2017/0243365 A1 | 8/2017 | Nuijten |
| 2017/0259811 A1 | 9/2017 | Coulter et al. |
| 2017/0300058 A1 | 10/2017 | Peret et al. |
| 2018/0024553 A1 | 1/2018 | Kong et al. |
| 2018/0056985 A1 | 3/2018 | Coulter |
| 2018/0102227 A1 | 4/2018 | Poon |
| 2018/0143801 A1 | 5/2018 | Stucker et al. |
| 2018/0146757 A1 | 5/2018 | Singh Johar |
| 2018/0164829 A1 | 6/2018 | Oshima et al. |
| 2018/0185212 A1 | 7/2018 | Lucas |
| 2018/0203522 A1 | 7/2018 | Stucki et al. |
| 2018/0253220 A1 | 9/2018 | Tuhami |
| 2018/0329418 A1* | 11/2018 | Baalke .................. G06Q 50/28 |
| 2019/0025853 A1 | 1/2019 | Julian |
| 2019/0033868 A1* | 1/2019 | Ferguson ................ B60R 21/34 |
| 2019/0038487 A1 | 2/2019 | Cherny |
| 2019/0041219 A1* | 2/2019 | Schubert ............ G01C 21/3602 |
| 2019/0046373 A1 | 2/2019 | Coulter |
| 2019/0087778 A1* | 3/2019 | Evans, Jr. .............. G06Q 10/06 |
| 2019/0114564 A1* | 4/2019 | Ferguson ......... G06Q 10/06312 |
| 2019/0224057 A1 | 7/2019 | Jordan |
| 2019/0231617 A1 | 8/2019 | Cazali |
| 2019/0269567 A1 | 9/2019 | Kao |
| 2021/0141377 A1 | 5/2021 | Brady et al. |

FOREIGN PATENT DOCUMENTS

| | | |
|---|---|---|
| CA | 2897542 | 1/2016 |
| CN | 101056680 | 10/2007 |
| CN | 104071275 | 10/2014 |
| DE | 2048593 | 5/1971 |
| DE | 3103961 | 9/1982 |
| DE | 3128112 | 2/1983 |
| DE | 3242880 | 6/1983 |
| DE | 3411489 | 10/1984 |
| DE | 4110905 | 10/1991 |
| DE | 4404594 | 8/1995 |
| DE | 19625498 | 11/1997 |
| DE | 29808091 | 8/1998 |
| DE | 29808096 | 8/1998 |
| DE | 10209093 | 9/2003 |
| EP | 0109927 | 5/1984 |
| EP | 0193473 | 9/1986 |
| EP | 0537698 | 4/1993 |
| EP | 0551986 | 7/1993 |
| EP | 0663313 | 7/1995 |
| EP | 0746089 | 12/1996 |
| EP | 0958978 | 11/1999 |
| EP | 1063530 | 12/2000 |
| EP | 1791609 | 9/2005 |
| EP | 1791609 | 3/2006 |
| EP | 1759973 | 3/2007 |
| EP | 1805071 | 7/2007 |
| FR | 980237 | 5/1951 |
| FR | 2502090 | 9/1982 |
| GB | 152664 | 1/1922 |
| GB | 1213930 | 11/1970 |
| GB | 2139576 | 11/1984 |
| GB | 2388579 | 11/2003 |
| JP | 52-44933 | 4/1977 |
| JP | 57-87766 | 1/1982 |
| JP | 57-110569 | 7/1982 |
| JP | 59-73372 | 4/1984 |
| JP | 60-255580 | 12/1985 |
| JP | 62-12810 | 1/1987 |
| JP | 63-305082 | 12/1988 |
| JP | H01-316810 | 12/1989 |
| JP | 2-190277 | 7/1990 |
| JP | 4-201793 | 7/1992 |
| JP | 5-213240 | 8/1993 |
| JP | 6-171562 | 12/1994 |
| JP | 61-05415 | 12/1994 |
| JP | 7255780 | 10/1995 |
| JP | 09-010375 | 1/1997 |
| JP | 9-248320 | 9/1997 |
| JP | 10-023613 | 1/1998 |
| JP | 2000-070308 | 7/2000 |
| JP | 2000-288032 | 10/2000 |
| JP | 2005-022631 | 1/2005 |
| JP | 4572594 | 1/2006 |
| JP | 2007-069688 | 3/2007 |
| JP | D1314974 | 11/2007 |
| JP | D1323922 | 3/2008 |
| JP | 4687784 | 7/2010 |
| JP | 2010-240011 | 10/2010 |
| JP | 2010-274759 | 12/2010 |
| JP | 2011-246124 | 12/2011 |
| JP | 5243795 | 7/2013 |
| JP | 2014-019212 | 2/2014 |
| JP | 2014-174275 | 9/2014 |
| JP | 2014-195403 | 10/2014 |
| JP | 2014-204544 | 10/2014 |
| JP | 2014-218247 | 11/2014 |
| JP | 2015-070897 | 4/2015 |
| JP | 2015-171895 | 10/2015 |
| JP | 2016-084135 | 5/2016 |
| JP | 2018-062344 | 4/2018 |
| TW | D124943 | 6/2006 |
| WO | WO 1986/05752 | 10/1986 |
| WO | WO 1989/06117 | 7/1989 |
| WO | WO 1996/23478 | 8/1996 |
| WO | WO 1998/46474 | 10/1998 |
| WO | WO 1999/11488 | 3/1999 |
| WO | WO 2000/023315 | 4/2000 |
| WO | WO 2000/054719 | 9/2000 |
| WO | WO 2000/054721 | 9/2000 |
| WO | WO 2000/075001 | 12/2000 |
| WO | WO 2001/002920 | 1/2001 |
| WO | WO 2002/30730 | 4/2002 |
| WO | WO 2002/072383 | 9/2002 |
| WO | WO 2003/068342 | 8/2003 |
| WO | WO2003/103559 | 12/2003 |
| WO | WO 2003/106250 | 12/2003 |
| WO | WO 2004/007264 | 1/2004 |
| WO | WO2004/078603 | 9/2004 |
| WO | WO 2006/031917 | 3/2006 |

(56) References Cited

FOREIGN PATENT DOCUMENTS

| WO | WO 2006/042302 | 4/2006 |
|---|---|---|
| WO | WO 2009/052471 | 4/2009 |
| WO | WO 2010/084421 | 7/2010 |
| WO | WO 2012/090248 | 7/2012 |
| WO | WO 2013/096789 | 6/2013 |
| WO | WO 2015/167411 | 11/2015 |
| WO | WO 2017/147347 | 8/2017 |
| WO | WO 2017/156586 | 9/2017 |
| WO | WO 2017/180868 | 10/2017 |
| WO | WO 2017/201513 | 11/2017 |

OTHER PUBLICATIONS

U.S. Appl. No. 15/600,703 (U22), C8-C40, C42-050, C52-C65, C67-C74.
U.S. Appl. No. 15/787,613 (W10) C1-C7, C41, C51, C66.
Derry et al., Automated Doorway Detection for Assistive Shared-Control Wheelchairs, 2013 IEEE International Conference on Robotics and Automation, May 6-10, 2013, https://cpb-us-e1.wpmucdn.com/sites.northwestern.edu/dist/5/1812/files/2016/05/13icra_derry.pdf.
U.S. Appl. No. 16/035,205, filed Jul. 13, 2018.
U.S. Appl. No. 15/600,703, filed May 20, 2017.
PCT/US17/33705, May 20, 2017.
PCT/2018/042114, Jul. 13, 2018.
U.S. Appl. No. 15/486,980, filed Apr. 13, 2017.
PCT/US17/27410, Apr. 13, 2017.
U.S. Appl. No. 15/441,190, filed Feb. 23, 2017.
PCT/US17/19214, Feb. 23, 2017.
U.S. Appl. No. 16/200,088, filed Nov. 26, 2018.
Adhikari, B., A Single Subject Participatory Action Design Method for Powered Wheelchairs Providing Automated Back-in Parking Assistance to Cognitively Impaired Older Adults: A pilot study, Department of Computer Science, The University of British Columbia, Vancouver, Canada, Jan. 5, 2015, slide deck.
Adhikari, B., A Single Subject Participatory Action Design Method for Powered Wheelchairs Providing Automated Back-in Parking Assistance to Cognitively Impaired Older Adults: A pilot study, Master's Thesis, Department of Comptuer Science, The University of British Columbia, Vancouver, Canada, Dec. 2014.
Brown, Jr. et al., "A Single-Wheel, Gyroscopically Stabilized Robot," IEEE Robotics & Automation Magazine, Sep. 1997.
"BTCR9 Fansyn Bluetooth . . . " Fanimation, published Feb. 4, 2017 (Retrieved from the Internet Sep. 27, 2019). Internet URL: https://web.archive.org/web/20170204193258/https://www.fanimation.com/products/index.php/controls-remotes/fansync-bluetooth-receiver-transmitter-downlight.html(Year : 2017).
Cho et al, *Sloped Terrain Segmentation for Autonomous Drive Using Sparse 3D Point Cloud*, The Scientific World Journal, 2014, https://www.hindawi.com/journals/tswj/2014/582753/.
Cooper, Rory A., "Intelligent Control of Power Wheelchairs", IEEE Engineering in Medicine and Biology Magazine, IEEE Service Center, Piscataway, NJ, US, vol. 14, No. 4, Jul. 1, 1995, pp. 423-431, XP11084628.
Dejun Yin and Yoichi Hori, "A Novel Traction Control for Electric Vehicle without Chassis Velocity, Motion Control", Federico Casolo (Ed.), InTech, DOI: 10.5772/6962. Available from: https://mts.intechopen.com/books/motion-control/a-novel-traction-control-for-electric-vehide-without-chassis-velocity, 2010.
Derry et al., Automated Doorway Detection for Assistive Shared-Control Wheelchairs, 2013 IEEE International Conference on Robotics and Automation, May 6-10, 2013, https://cpb-us-el.wpmucdn.com/sites.northwestern.edu/dist/5/1812/files/2016/05/13icra_derry.pdf.
Elnagar, A., "Prediction of Moving Objects in Dynamic Environments Using Kalman Filters," Proceedings of 2001 IEEE International Symposium on Computational Intelligence in Robotics and Automation, Jul. 29-Aug. 1, 2001.

Fresk, et al., "Full Quaternion Based Attitude Control for a Quadrator", 2013 European Control Conference (EDD), Jul. 17-19, 2013, Zurich, Switzerland, pp. 3864-3869.
Grasser, F. et al., "JOE: A Mobile, Inverted Pendulum," IEEE Transactions on Industrial Electronics, vol. 49, No. 1, Feb. 2002.
Ha, et al. "Trajectory Tracking Control for Navigation of Self-Contained Mobile Inverse Pendulum" Intelligent Robots and Systems '94. 'Advanced Robotic Systems and the Real World', IROS '94. Proceedings of the IEEE/RSJ/GI International Conference on, vol. 3, no., pp. 1875-1882, Sep. 12-16, 1994.
Ha, et al., "Trajectory Tracking Control for Navigation of the Inverse Pendulum Type Self-Contained Mobile Robot" Robotics and Autonomous Systems 17, 65-80 (1996).
Helgesson, L., "Pitch and roll estimating Kalman filter for stabilizing quadrocopters", http:/lhelge.se/2012/04/pitch-and-roll-estimating-kalman-filter-for-stabilizing-quadrocopters/, Oct. 15, 2012.
How et al., "Clinical Evaluation of the Intelligent Wheelchair System", Proceedings of Festival of international Conference on Caregiving, Disability, Aging and Technology, Toronto, Canada, 2011.
I-Real, Personal Mobility Device, https://www.youtube.com/warch?v=WAGpxIUpdWw, Published on Jan. 15, 2013, appeared first in Apr. 2012, D1 Grand Prix event, Odaiba, JP.
Ishida and Miyamoto, "Collision-Detecting Device for Omnidirectional Electric Wheelchair", Research Article, ISRN Robotics, vol. 2013, Article ID 672826, Nov. 1, 2012.
I-swing, Single Person Vehicle, https://www.youtube.com/watch?feature=player_embedded&v=1QSybf7sLtg, Published on Sep. 14, 2006, Featured on Hacked Gadgets, http://hackedgadgets.com.
I-Unit, Wheelchair, https://www.youtube.com/watch?v=RbrrIrh3GBE, Published on June 6, 2006, Filmed at Megaweb Center at Tokyo.
Johnson, R.C., "Unicycles and Bifurcations", American J. of Physics, vol. 66, No. 7, 589-92 (Oct. 22, 2002).
Kanoh, "Applied Control of Inverted Pendulum", Computrol, vol. 2, (1983), pp. 69-75.
Kawaji, S., "Stabilization of Unicycle Using Spinning Motion", Denki Gakkai Ronbushi, D, vol. 107, Issue 1, Japan (1987), pp. 21-28.
Koyanagi et al., "A Wheeled Inverse Pendulum Type Self-Contained Mobile Robot", The Society of Instrument and Control Engineers, Special issue of the 31st SICE Annual Conference, Japan 1992, pp. 51-56.
Koyanagi et al., "A Wheeled Inverse Pendulum Type Self-Contained Mobile Robot and its Two Dimensional Trajectory Control", Proceeding of the Second International Symposium on Measurement and Control in Robotics, Japan 1992, pp. 891-897.
Koyanagi et al., "A Wheeled Inverse Pendulum Type Self-Contained Mobile Robot and its Posture Control and Vehicle Control", The Society of Instrument and Control Engineers, Special issue of the 31st SICE Annual Conference, Japan, 1992, pp. 13-16.
Lam, H. K. et al., "Fuzzy Model Reference Control of Wheeled Mobile Robots," The 27th Annual Conference of the IEEE Industrial Electronics Society (2001).
Liu, H.S. et al., "Accelerometer for Mobile Robot Positioning," IEEE Transactions on Industry Applications, vol. No. 3, Oct. 1999.
Meeussen et al., Autonomous Door Opening and Plugging In with a Personal Robot, Willow Garage, USA, IEEE International Conference on Robotics and Automation, May 3-7, 2010, http://www.willowgarage.com/sites/default/files/m2.pdf.
Momoi & Yamafuji, "Motion Control of the Parallel Bicycle-Type Mobile Robot Composed of a Triple Inverted Pendulum", Paper Read at Meeting of Japan Society of Mechanical Engineering (Series C), vol. 57, No. 541, (Sep. 1991), pp. 154-159.
Montella, C., et al., "To the Bookstore! Autonomous Wheelchair Navigation in an Urban Environment", Lehigh University, published in FSR, 2012, Part of the Springer Tracts in Advanced Robotics book series (STAR, vol. 92), first online Dec. 31, 2013.
News article, "Amazing Wheelchair Goes Up and Down Stairs".
Oishi et al., "Building A Smart Wheelchair On A Flexible Software Platform", RESNA International Conference on Technology and Aging, 2011.

(56) References Cited

OTHER PUBLICATIONS

Osaka et al., "Stabilization of unicycle", Systems and Control, vol. 25, No. 3, Japan Mar. 1981, pp. 159-166.
PCT/US2017/019214, Written Opinion of the International Search Authority, dated Aug. 31, 2017.
PCT/US2017/027410, Written Opinion of the International Search Authority, dated Dec. 4, 2017.
PCT/US2017/033705, Written Opinion of the International Search Authority, dated Nov. 23, 2017.
PCT/US2017/033705, Invitation to pay additional fees and partial search report, Int. App. #PCT/US2017/033705, Intl. filing date May 20, 2017.
Roy et al., "Five-Wheel Unicycle System", Medical & Biological Engineering & Computing, vol. 23, No. 6, United Kingdom Nov. 1985, pp. 593-596. Entire document can be purchased via: https://link.springer.com/article/10.1007%2F8F02455316.
Sabatini, A, "Quaternion-based Extended Kalman Filter for Determining Orientation by Inertial and Magnetic Sensing", IEEE Transactions on Biomedical Engineering, vol. 53:7, Jul. 2006, pp. 1346-1356.
Schoonwinkel, A., "Design and Test of a Computer-Stabilized Unicycle", Stanford University (1988), UMI Dissertation Services, Dissertation Abstracts International, vol. 49/03-B, Stanford University 1987, pp. 890-1294.
Bob_Schor. "Re: Cannot get latch mechanical action on Boolean button . . . " NI Community, published Jun. 2, 2018 (Retrieved from the Internet Sep. 26, 2019). Internet URL: https://forums.ni.com/t5/LabVIEW/Cannot-get-latch-mechanical-action-on-boolean-button-inside-a/td-p/3799821?profile.language=en (Year: 2018).
Sheng et al., "Postural Stability of a Human Riding a Unicycle and Its Emulation by a Robot," IEEE Transactions on Robotics and Automation, vol. 13:5, Oct. 1997.
Sheng, Zaiquan; Yamafuji, Kazuo: "Realization of a Human Riding a Unicycle by a Robot". Proceedings of the 1995 IEEE International Conference on Robotics and Automation, vol. 2, 1995, pp. 1319-1326.
Stew's Hovercraft Page, http://www.stewcam.com/hover-craft.html.
Takahashi et al., "Back and Forward Moving Scheme of Front Wheel Raising for Inverse Pendulum Control Wheel Chair Robot", Proceedings of the 2001 IEEE International Conference of Robotics & Automation, Seoul, Korea, May 21-26, 2001, pp. 3189-3194.
Takahashi et al., "Front Wheel Raising and Inverse Pendulum Control of Power Assist Wheel Chair Robot", IEEE, 1999, pp. 668-673.
Tanaka et al., "A Mobile Robot for Service Use: Behaviour Simulation System and Intelligent Control," Proceedings of the 1997 IEEE/RSJ International Conference on Intelligent Robots and Systems, 1997.
TECKNICO'S Home Page, "Those Amazing Flying Machines", http://www.swiftsite.com/technico, May 24, 1999.
Ulyanov et al., "Fuzzy Intelligent Emotion and Instinct Control of a Robotic Unicycle," Proceedings of the 1996 4th International Workshop on Advanced Motion Control, Mar. 18-21, 1996.
Ulyanov et al., "Soft computing for the intelligent robust control of a robotic unicycle with a new physical measure for mechanical controllability". Soft Computing vol. 2:2, Jun. 1998, pp. 73-88.
Umpad, Leomar. "How Do I Use My Samsung Galaxy Device as a TV Remote Control?" Tech Recipes,published Nov. 27, 2014 (Retrieved from the Internet Sep. 27, 2019). Internet URL: <https://www.Tech-recipes.com/rx/51556/how-do-i-use-my-samsung-galaxy-device-as-a-tv-remote-control/> (Year: 2014).
Viswanathan et al., "Navigation Assistance for Intelligent Wheelchairs", 3rd International Conference on Technology and Aging/RESNA, Toronto, 2011.
Vos et al., "Dynamics and Nonlinear Adaptive Control of an Autonomous Unicycle—Theory and Experiment", American Institute of Aeronautics and Astronautics, A90-26772 10-39, Washington, D.C. 1990, Abstract only.
Vos, D., Dynamics and Nonlinear Adaptive Control of an Autonomous Unicycle, Massachusetts Institute of Technology, Jun. 7, 1989.
Vos, D., "Nonlinear Control of an Autonomous Unicycle Robot: Practical Issues", Massachusetts Institute of Technology, Jun. 5, 1992.
Wang et al., "Real-time Model-based Electrical Powered Wheelchair Control", Med Eng Phys. Dec. 2009: 31(10): 1244-1254.
Watson Industries, Inc., "Single Axis Vertical Reference System Owner's Manual ADS-C132-1A", Apr. 20, 2015, pp. 3-4.
Welch et al., "An Introduction to the Kalman Filter," SIGGRAPH 2001, Department of Computer Science University of North Carolina at Chapel Hill, http://www.cs.unc.edu/~l_welch.gbl, 2001.
WO 2000/073101, IPER of the International Search Authority, filing date Mar. 14, 2000.
WO 2000/075001, IPER of the International Search Authority, filing date Jun. 1, 2000.
WO2002/030730, IPER of the International Search Authority, filing date Oct. 11, 2001.
WO2004/007264, Initial Publication with ISR, International Publication Date Jan. 22, 2004.
WO 2017/147347 Written Opinion of the International Search Authority, Int. App. #PCT/US2017/019214, priority date Feb. 23, 2016.
WO 2017/201513, Invitation to pay additional fees and partial search report, Int. App. #PCT/US2017/033705, Inti. filing date May 20, 2017.
WO 2017/201513, Written Opinion of the International Searching Authority, Int. App. #PCT/US2017/033705, Intl. filing date May 20, 2017.
Wolstenholme, Kevin. "Updating Glide—The Full Breawkdown." RisingHigh Academy, published Aug. 26, 2017 (Retrieved from the Internet Sep. 26, 2019). Internet URL: https://risinghighacademy.com/category/games/(Year:2017).
Yamafuji & Kawamura, "Study on the Postural and Driving Control of Coaxial Bicycle", Paper Read at Meeting of Japan Society of Mechanical Engineering (Series C), vol. 54, No. 501, (May 1988), pp. 1114-1121, Abstract in English.
Yamafuji & Kawamura, "Study of Postural and Driving Control of Coaxial Bicycle", Papers Read at Meeting of Japan Society of Mechanical Engineering (vol. C), vol. 54, No. 501 (May 1988), Paper No. 87-0901A.
Yamafuji et al., "Synchronization and Steering Control of Parallel Bicycle", Paper Read at Meeting of Japan Society of Mechanical Engineering (Series C), vol. 55, No. 513, (May 1989), pp. 1229-1234.
Yamafuji, "A Proposal for Modular-Structured Mobile Robots for Work that Principally Involve a Vehicle with Two Parallel Wheels", Automation Technology, vol. 20, pp. 113-118 (1988).
Yun et al., "Implementation and Experimental Results of a Quarternion-Based Kalman Filter for Human Body Motion Tracking", Proceedings of the 2005 IEEE International Conference on Robotics and Automation, Barcelona, Spain, Apr. 2005, pp. 317-322.
Yun et al., "Design, Implementation and Experimental Results of a Quarternion-Based Kalman Filter for Human Body Motion Tracking", IEEE Transactions on Robotics, vol. 22, No. 6, Dec. 2006, pp. 1216-1227.
Zenkov, DV, AM Bloch, and JE Marsden [2001] "The Lyapunov-Malkin Theorem and Stabilization of the Unicycle with Rider". Systems and Control Letters, vol. 45, No. 4, Apr. 5, 2002, pp. 293-302(10).
Zenkov, DV, AM Bloch, NE Leonard and JE Marsden, "Matching and Stabilization of Low-Dimensional Nonholonomic Systems". Proc. CPC, 39, (2000), 1289-1295.

\* cited by examiner

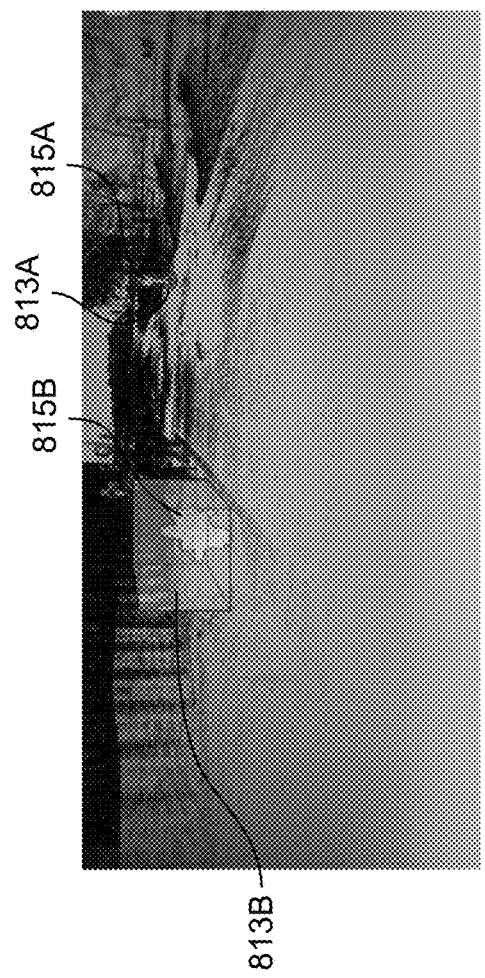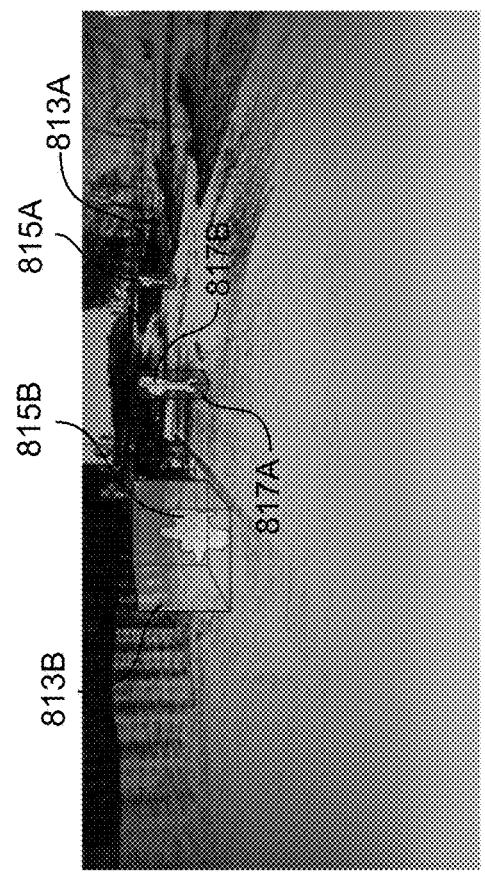
FIG. 22

SYSTEM AND METHOD FOR DISTRIBUTED UTILITY SERVICE EXECUTION

CROSS REFERENCE TO RELATED APPLICATIONS

This application claims the benefit of U.S. Provisional Application Ser. No. 62/682,129, filed Jun. 7, 2018, entitled SYSTEM AND METHOD FOR DISTRIBUTED UTILITY SERVICE EXECUTION, which is incorporated herein by reference in its entirety.

BACKGROUND

The present teachings relate generally to utility services. For example, the present teachings can relate to assisted delivery of goods originating at distributed establishments and destined for customers located in the vicinity of the distributed establishments. What is needed is a system that can accommodate trips of various lengths, and can solve the problem of short-distance assistance to customers. What is further needed is a system that can accommodate semi-autonomous and autonomous operation, and can deliver utility services economically.

SUMMARY

The utility system of the present teachings solves the problems stated herein and other problems by one or a combination of the features stated herein.

The system of the present teachings can be part of a fleet network of similar systems. The fleet network can also include trucks, planes, cars such as self-driving cars, and business establishments. All members of the fleet network can communicate seamlessly to share, for example, but not limited to, navigation data, dynamic objects, alternate routing, and utility requirements including utility characteristics, customer location, and destination. The system of the present teachings can interface with existing truck systems so that the fleet is seamlessly connected. Piloted utility vehicles can include technology disclosed in U.S. patent application Ser. No. 15/600,703 filed on May 20, 2017, entitled Mobility Device.

The utility robot of the present teachings can operate in an autonomous or semi-autonomous mode. The autonomous utility robot can, in conjunction with the network, control its movement without the assistance of an operator. The semi-autonomous utility robot can include technology that can receive and process input from the operator of the semi-autonomous utility robot. The input can, for example, but not limited to, override autonomous control of the utility robot, or be considered in controlling the utility robot, or be ignored. The utility robot can include a set of sensors appropriate for the location of the utility robot. For example, when the utility robot is deployed in an environment that includes many other members of the fleet network, the utility robot can include a first number of sensors. In some configurations, for example, in an environment that includes a relatively small number of members of the fleet network, the utility robot can include a second number of sensors. The sensors can operate in conjunction with sensors that are associated with other members of the fleet network. In some configurations, the utility robot can include enough physical storage space to accommodate delivery items from typical distributed sources such as pharmaceuticals, food, meals, and documents. The utility robot can operate on city sidewalks, and near and within buildings, among other places.

The utility robot can include the capability to determine a current location and situation of the utility robot (localization), through the use of, for example, but not limited to, fiducials, sensors, external application data, operator input, beacons, and physical orientation of the utility robot. The utility robot can plan a route to reach a desired destination, detect obstacles along the route, and dynamically determine specific actions that the utility robot is to take based on the route, current location, and obstacles. Obstacles can include, but are not limited to including, dynamic (mobile) obstacles, such as, for example, but not limited to, pedestrians, vehicles, animals, and static obstacles such as, for example, but not limited to, trashcans, sidewalks, trees, buildings, and potholes. The utility robot can accommodate map matching including locating obstacles visually and matching them to other data such as, for example, satellite data. The utility robot can determine preferred routes and routes to be avoided. In some configurations, the utility robot can climb curbs. In some configurations, the utility robot can climb stairs. The utility robot can achieve stabilized operation while on four wheels, including while climbing stairs. The utility robot can maintain a pre-selected distance, which could vary along the route, from an obstacle such as, for example, but not limited to, a building. The utility robot of the present teachings can be driven by an operator who is seated upon a seating feature of the utility robot. In some configurations, the utility robot can take the form of a wheelchair, and can thus legally traverse sidewalks in all jurisdictions. The utility robot can accommodate disabled operators, and can include carrying capacity for, for example, but not limited to, pizzas and pharmaceuticals. In some configurations, the utility robot can follow rules of the road to maintain the safety of the utility robot, the operator of the utility robot (when present), and the people and obstacles encountered by the utility robot. The rules can include, for example, but not limited to, what to do when encountering an obstacle and what to do when crossing a road. For example, the rules can include prohibitions on rolling over someone or something, and traveling into unsafe places. The rules can also include prohibitions on stopping in unsafe locations, for example, the middle of an intersection. In general, safety protocols can be established and learned by the utility robot of the present teachings.

The utility robot of the present teachings can serve many purposes. The utility robot of the present teachings can be summoned to assist an individual in carrying heavy things, for example, to a bus stop. In some configurations, the utility robot of the present teachings can watch for threats and odd occurrences, and can be summoned to escort individuals from place to place. In some configurations, the utility robot of the present teachings can be summoned by a mobile device, to a location that can change between the summons and the rendez-vous of the utility robot and the mobile device. The utility vehicle can transport items from one location to another, for example, from a pharmacy to the residence of the person ordering the pharmaceuticals. The utility robot can communicate with pedestrians and vehicles, for example, by gesturing and providing awareness feedback.

In some configurations, the utility robot of the present teachings can travel at least fifteen miles at sixteen miles/hour on a single battery charge. The utility robot of the present teachings can use GPS, road signs, stereo cameras, cell phone repeaters, smart beacons with steerable RF beams that can direct the utility robot along a desired route, IMU data between beacons, and other beacon data to help the utility robot to recognize and traverse the desired route. In some configurations, at least one autonomous utility robot of the present teachings can be coupled, for example, electronically, with at least one semi-autonomous utility robot. Batteries can include quick change/quick charge batteries. In some configurations, batteries can be protected from being stolen. The batteries can be locked down, for example, or they can include an identification number that is required to enable the batteries.

The utility robot of the present teachings can accommodate such numbers and types of sensors as are necessary for the function of the utility robot. For example, the utility robot, when operating in an urban area, can expect to receive real time data relevant to its travel path from other members of the fleet network such as, for example, but not limited to, beacons and fiducials. Thus, the utility robot, when operating in an urban area, can include a sensor package appropriate for its environment. The same utility robot, when operating in an area that includes fewer fleet members can include a sensor package appropriate for its environment, and possibly different form the urban area sensor package. Sensors can be integrated with the utility robot of the present teachings. The sensors can access and/or collect street/building/curb data, and can include, for example, but not limited to, visual sensors, LIDAR, RADAR, ultrasonic sensors, and audio sensors, and data from GPS, Wifi and cell towers, commercial beacons, and painted curbs. The visual sensors can include stereoscopic visual sensors that can enable object classification and stop light classification, for example. In some configurations, visual sensors can detect curbs. Detection of curbs can be simplified by painting the curbs with substances that can include, but are not limited to including, reflective materials and colors. Curbs can also be painted with conductive materials that can trigger detection by appropriate sensors mounted on a fleet member such as the utility robot. LIDAR can enable the creation of a point cloud representation of the environment of the utility robot, and can be used for obstacle avoidance, object classification, and mapping/localization. Maps can contain static objects in the environment. Localization provides information about the locations of static objects, which can be useful in recognizing dynamic objects. Audio and/or ultrasonic sensors can be used to detect the presence of, for example, but not limited to, vehicles, pedestrians, crosswalk signals, and animals, and can enable collision avoidance and semi-autonomous driving. Ultrasonic sensors can enable calculation of the distance between the utility robot and the closest object. In some configurations, the utility robot can accommodate repositioning of the sensors upon the utility robot. For example, sensors can be positioned to accommodate the variable placement of storage containers on the utility robot.

In some configurations, vehicles, such as, for example, but not limited to, trucks and self-driving vehicles, can transport the utility robots of the present teachings closer to their starting locations and destinations, and can retrieve the utility robots to remove them to storage, charging, and service areas, for example. With respect to trucks, in some configurations, as the utility robots can enter the trucks, their batteries can be removed and be replaced with fully charged batteries so that the utility robots can continue their services. The truck can include the capability to swap out batteries and charge them. In some configurations, empty storage compartments can also be filled on the delivery truck, and the utility robot can be sent from the truck to perform further deliveries. The utility robots and trucks can locate each other wirelessly. A dispatching mechanism can couple trucks with services and batteries with utility robots that need them. The trucks can include at least one ramp to receive and discharge the utility robots of the present teachings.

In some configurations, the movement of trucks and utility robots of the present teachings can be coordinated to minimize one or more of service costs, service times, and occurrences of stranded utility robots. Service costs may include fuels for trucks, battery costs for utility robots, and maintenance/replacement costs of trucks and utility robots. The trucks can include on- and off-ramps that can accommodate rolling retrieval and discharge of the utility robots. The trucks can be parked in convenient places and the utility robots of the present teachings can perform services in conjunction with the trucks. In some configurations, the trucks and utility robots can be dynamically routed to meet at a location, where the location can be chosen based at least on, for example, but not limited to, the amount of time it would take for the fleet members to reach the location, availability of parking at the location, and routing efficiency. In some configurations, the utility robots of the present teachings can be moved from place to place, depending upon where they are needed the most, by, for example, the trucks. Daily schedules can control where the utility robots of the present teachings are transported. For example, a truck can pick up the utility robot of the present teachings when the utility robot has completed its services and/or when its batteries need to be charged, and/or when it needs service. The utility robot can automatically remain in the location of its final service until a truck arrives to retrieve it. A truck can be used to transport the utility robot of the present teachings from a station such as a store where goods and services have been purchased to a retirement home, for example, where the goods and services are to be delivered. The utility robot of the present teachings can be dropped off at, for example, the retirement home at which time the utility robot can deliver the goods and services. In some configurations, a first of the utility robots of the present teachings can deliver parcels to the truck, and those parcels can be removed from the first of the utility robots to the truck. The parcels can be picked up by a second of the utility robots of the present teachings that is heading towards the delivery destination of the parcel. The utility robots of the present teachings can be deployed from moving trucks or other moving vehicles.

In some configurations, self-driving vehicles can be fitted with controls and hardware that can accommodate the utility robot of the present teachings. Self-driving vehicles can be more ubiquitous in and adaptable to urban settings than trucks. For example, a utility robot of the present teachings can receive goods to be delivered, summon a nearby self-driving vehicle, move to meet the vehicle, enter the vehicle, and become docked in the vehicle. The battery of the utility robot of the present teachings can be charged during the delivery trip by the self-driving vehicle. The self-driving vehicle, as part of the fleet, can access the service information for the utility robot from which the summons came, and can move the utility robot of the present teachings to the service destination(s).

In some configurations, at least one semi-autonomous utility robot can be associated with at least one autonomous utility robot. The semi-autonomous utility robot and the autonomous utility robot can wirelessly communicate with each other to maintain synchronous behavior when desired. In some configurations, the group of utility robots can form a secure ad hoc network whose participants can change as autonomous utility robots enter and leave association with the semi-autonomous utility robot. The ad hoc network can communicate with the fleet network. In some configurations, the utility robots can communicate by, for example, wifi, through standard electronic means such as text, email, and phone. In some configurations, each of the utility robots can share features of the route upon which the group travels by individually measuring wheel rotations and inertial values and sharing those data. The group of utility robots of the present teachings can arrange to meet a truck. The arrangement can be made by a cellular telephone call to a dispatcher, for example. A dispatcher, which may be automatic or semi-automatic, can locate the truck that is nearest the group of utility robots of the present teachings and can route the truck to the location of the group. In some configurations, a meetup request can be generated by one or more utility robots of the group, and can be electronically transmitted to trucks that come within wifi and/or ad hoc network range of the group of utility robots. In some configurations, the group of utility robots can be in continuous electronic communication with the fleet of trucks, can monitor their whereabouts, and can summon the nearest truck and/or the truck with the appropriate specifications such as, for example, size and on/off ramps. In some configurations, summoning the one or more of the utility robots of the group of the present teachings can automatically involve summoning a utility robot with the correctly-sized storage compartment(s) for the parcel(s), and the utility robot that is geographically closest to the pickup point for the parcel(s).

In some configurations, the utility robot can include storage for items to be delivered, and can track the sizes of storage containers on each utility robot, as well as the sizes of the contents of the storage containers. The utility robot can receive the size of the package and can determine if the package can fit in any available storage in the fleet of utility robots of the present teachings. The storage can be compartmentalized for security and safety of the contents of the delivered goods. Each of the compartments can be separately secured, and the sizes of the compartments can vary according to the sizes of the parcels. Each of the compartments can include, for example, a sensor that can read the address on the parcel and ensure that the parcel is sized correctly for the storage container and the utility robot. For example, a drug store might require several small compartments to house prescription orders, while a restaurant might require pizza-sized compartments. In some configurations, the utility robot can include operator seating, and the storage compartments can be located behind, above, beside, in front of, and/or under the operator, for example. The storage containers can be sized according to the current parcel load. For example, the storage containers can include interlockable features that can enable increasing or decreasing the interior size of the storage containers. The storage containers can also include exterior features that can enable flexible mounting of the storage containers upon the chassis of the utility robot of the present teachings.

In some configurations, the utility robot can include storage compartments and can accommodate long-term storage, for example, overnight storage, that can be advantageously provided when the utility robot is securely located within an enclosure in proximity to a charging station. The storage compartments can actively or passively self-identify, and can include tamper and content status information. The storage compartments can automatically interface with the system controller to provide information such as, for example, but not limited to, the tamper information and the content status information. In some configurations, the storage compartments can include information that can be used when by the controller to command the utility robot. In some configurations, when contents within the storage compartments are destination-tagged, the storage compartment can sense the place where the contents are to be delivered and can direct the controller to drive the utility robot to the destination. In some configurations, the storage compartment can transmit destination information to other members of the delivery fleet. In some configurations, contents within the storage compartment can protrude from the storage compartment. Sensors can detect the orientation of the storage compartment and can maintain the storage compartment at a pre-selected angle with respect to the ground.

In some configurations, storage compartments can include temperature/humidity control that can accommodate extended storage, for example, but not limited to, overnight storage, of goods for delivery. In some configurations, storage of food and pharmaceuticals, for example, can be accommodated by temperature and or humidity control within the storage compartments of the present teachings. In some configurations, the storage compartments can include insulation and cold packs of ice, dry ice or other commercially available cold packs such as model S-12762 available from ULINE® in Pleasant Prairie, Wis. In some configurations, storage compartments can include electrically powered refrigerators and/or heaters. In some configurations, the electrically powered heater or cooler may be powered by mains AC. In some configurations, the power can be provided by the batteries of utility robot.

The storage compartments can include sensors mounted exteriorly and interiorly. The storage compartment sensors can detect when they have been touched and moved, and can provide that information to a controller executing in the utility robot. In some configurations, storage compartment sensors can monitor environmental factors, such as, for example, but not limited to, temperature and humidity as well as shock and vibration loads. In some configurations, storage compartment sensors can detect the size and weight of a package and can read information embedded in or on the package. The information can, for example, be embedded in an RFID tag or encoded into a barcode or QR code. The utility robot can compare the information embedded in or on the package to a manifest associated with the delivery, and can raise an alert and/or alarm if the information does not match the manifest.

In some configurations, one or more of the storage compartments can ride above the operator of the utility robot of the present teachings. In some configurations, the above-operator storage compartment(s) can ride on a telescoping device, and can be raised up and down to enable convenient access to the contents of the storage compartment(s), while at the same time enabling convenient entry and exit of the operator onto the utility robot of the present teachings. The telescoping device can include articulation. The storage compartments can ride on positioning rails, and can be positioned backwards, forwards, up, down, and from side to side, for example. The storage compartments can be maintained in a particular orientation automatically by the controller.

In some configurations, the storage containers can be positioned in various orientations and at various locations with respect to each other and the chassis of the utility robot. The storage compartment can accommodate weather barriers to protect the operator of the utility robot from inclement weather. In some configurations, curtains attached to an elevated storage container can protect an operator and possibly storage containers from inclement weather. Parts of the storage container can be articulated to accommodate storing and removing items, and to accommodate secure placement of the storage container. In some configurations, the utility robot can include active control of the storage container, for example, to maintain a particular orientation of the storage container. If the contents of the storage container must remain in a particular orientation to prevent destruction of the contents, active control of the orientation of the contents within the storage container can be enabled. In some configurations, each face of the contents of the storage container can be identified to enable proper orientation of the contents.

In some configurations, sensors can be mounted in various locations on/in the storage container, for example, to notify the utility robot when the storage container could be subject to an undesired collision. In some configurations, the storage container and/or the manifest can inform the utility robot to adjust accelerations according to a pre-selected threshold. The utility robot, which can determine the current rate of acceleration of the utility robot based on data collected from the utility robot's wheel counter and IMU, can limit commands to the drive wheels and/or brakes to adjust accelerations according to the pre-selected threshold.

In some configurations, one of the storage containers can be mounted behind the operator, and can be greater than or equal to about two feet tall. The storage containers can include snap-on features that can allow placement of the storage containers onto the chassis in various configurations. The storage containers can receive and process information from an electronic application, for example, open and close commands from a wireless device. In some configurations, when a parcel is loaded into a storage container, the utility robot can identify, for example by taking a photograph, the individual who loads the parcel and associate the parcel with the identification. In some configurations, the storage container of the present teachings can measure 30-40 inches by two feet. In some configurations, the utility robot can automatically poll the parcels it carries and automatically summon any needed assistance to deliver the parcels in a timely manner. The mounted storage containers can be interchangeable with storage containers of sizes suitable for the particular delivery and can be secured to the utility robot.

The utility robot of the present teachings can be docked proximal to where package delivery can originate. In some configurations, docking stations can include openings in the building where the packages are located. Packages can be deposited at stations within the buildings and near the openings, and can be automatically sorted. The sorted packages can be automatically loaded onto a utility robot of the present teachings through one of the openings. Sensors and/or transponders can detect the contents of the packages.

The utility robots of the present teachings can include technology to collect payment for services and retain payment records. The utility robot can notify the service target that the service has been completed, for example, by a cell phone notification or a text. The service target can move towards the utility robot to avoid challenging terrain such as, for example, stairs. In some configurations in which the service provided is a delivery service, storage compartments can include embedded RFID circuitry that can be broken when the delivery storage is opened. An RFID scanner could be used to reveal that the storage container has been opened. To maintain privacy, the contents of the storage container can be moved to a secure location before opening. The utility robot can receive information about the service target such as, for example, biometric information, to identify that the service is being delivered to the correct target. For example, the utility robot can secure the storage container until the target is recognized by, for example, facial recognition technology. The utility robot can receive personal information such as credit card and cell phone information, to, for example, unlock a storage container. In some configurations, the utility robot can include biometric sensors, for example, facial sensors and/or fingerprint sensors, that can, for example, detect if the contents of a storage container are associated with the person attempting to collect the contents. In some configurations, the utility robot can combine correct location information with correct code entry or other forms of identification to unlock the storage container.

The utility robots of the present teachings can detect tampering with the utility robot, and thus unsafe and dangerous conditions. In some configurations, the utility robot can detect a change in the center of mass that can indicate tampering. Adding or subtracting weight from the utility robot can change the center of mass. The utility robot can include an IMU, and can measure the location of center of mass based on the response of the vehicle to accelerations and changes in the attitude of the utility robot. The change of mass can indicate that the utility robot might be compromised. In some configurations in which packages are being transported, the utility robot can detect packages that do not include identification sufficient to couple the package with the delivery target. For example, the utility robot can detect an unapproved package because a loading authorization code does not match the expected code, or the RFID code is incorrect or missing, or there is a mismatch between the actual weight of the package and the weight listed on the manifest. The utility robot can generate an alert, the type of which can depend upon the probable cause of the suspected tampering. Some alerts can be directed to the state authorities, while others can be directed to an electronic record that can be accessed by the utility robot of the present teachings, the trucks, the smart beacons, and other possible participants in the provided service, possibly through the fleet network. Following an error condition, the utility robot can automatically or semi-automatically steer the utility robot to a safe location such as a charging station. In some configurations, the contents of storage containers can be secured.

Beacons can communicate with the utility robot, and the status of the utility robot and its current activities can be provided to the beacons and thus to the fleet network. In some configurations where the utility robot is delivering goods, beacons can communicate with the contents of the storage containers, and a list and status of the contents of the storage containers can be made available to other members of the delivery fleet through the fleet network. All of the members of the fleet can be recognized by each other. If a utility robot of the present teachings detects that it has been compromised, it can initiate a safety procedure in which its secure electronic information can be backed up and destroyed, and the contents of its storage containers can be safely locked down.

To facilitate mapping of the route traveled by the utility robot between the starting and ending points, whether the starting point is at a fixed location, such as a pickup station associated with a brick-and-mortar source, or whether the starting point is at a mobile location, such as a truck or a pedestrian, the utility robot can begin with a static map. In some configurations, the static map can be derived from an open source map. In some configurations, the fleet system can include at least one server that can manage static map activity. In some configurations, the utility robot can maintain a local version of the static map from which it can operate between updates from the version maintained by the server. In some configurations, the utility robot can augment the static map with, for example, but not limited to, indications of congested areas based on information from, for example, but not limited to, other fleet vehicles, cell phone applications, obstacles such as trees and trash cans, pedestrians, heat map data, and wifi signals. The static map can be used, in conjunction with utility robot sensor data and fleet data, to deduce the location of dynamic objects. The utility robot can collect navigation data while enroute to a target and can avoid the congested areas. The utility robot can, for example, detect fiducials and beacons installed at various places along the path, for example, but not limited to, street corners and street signs at street corners. The fiducials and beacons can be members of the fleet network and thus share data with and possibly receive information from members of the fleet network. The fiducials and beacons can be installed and maintained by any entity including, but not limited to, the item's source entity, the company managing the deliveries, and the city in which the deliveries are taking place. The utility robots can receive information from fiducials and beacons installed at street intersections and, in some configurations, can send information to the fiducials and beacons that are configured to receive information. The utility robot can also sense safety features such as traffic lights and walk/no-walk indicators that can generate alerts audibly, visually, another type/frequency of signal, and/or all of the alert generation methods. The utility robot can process traffic light data and follow the pre-established road rules that it has learned. For example, the utility robot can be taught to stop when the traffic light is red. Vehicles in an intersection can be detected. Route issues such as closures can be detected. The utility robot can update the fleet network's database with information such as, but not limited to, traffic light information, that can enrich the mapping utility robot available to the fleet network. In some configurations, the utility robot can make use of information collected by a body camera worn by the operator of a member of the fleet network.

Semi-autonomous utility robots of the present teachings can receive input from operators during each trip and can use that input to record locations of obstacles such as, for example, but not limited to, stairs, cross-walks, doors, ramps, escalators, and elevators. From these data and real-time and/or semi-real-time data, maps and dynamic navigation routes can be created and updated. Autonomous utility robots can use the maps for current and future deliveries. For each step in the dynamic navigation route, the utility robot of the present teachings can determine the obstacles in the navigation route, the amount of time required to complete a desired motion that the utility robot will have to accomplish to follow the navigation path, the space that will be occupied by the static and dynamic obstacles in the path at that time, and the space required to complete the desired motion. With respect to the obstacles, the utility robot can determine if there is an obstacle in the path, how big the obstacle is, whether or not the obstacle is moving, and how fast and in what direction the obstacle is moving and accelerating. The dynamic navigation path can be updated during navigation. The path with the fewest obstacles can be chosen, and dynamic route modifications can be made if a selected route becomes less optimal while the utility robot is in transit. For example, if a group of pedestrians moves to a position in the chosen route, the route can be modified to avoid the group of pedestrians. Likewise, if repairs begin on a sidewalk, for example, the route can be modified to avoid the construction zone. Stereo cameras and point cloud data can be used to locate and avoid obstacles. The distance from various obstacles can be determined by real-time sensing technology such as, for example, but not limited to planar LIDAR, ultrasonic sensor arrays, RADAR stereoscopic imaging, monocular imaging, and velodyne LIDAR. In some configurations, processing of sensor data by the utility robot can allow the utility robot to determine, for example, whether the utility robot is within an allowed envelope of the planned path, and whether the obstacles in the navigation path are behaving as predicted in the dynamic navigation path. The utility robot can accommodate trips of various lengths, solving the problem of short-distance delivery of services.

Information can be derived from commercially-available navigation tools that provide online mapping for pedestrians, for example. Commercially-available navigation tools such as, for example, but not limited to, GOOGLE® maps, BING® maps, and MAQUEST® maps, can provide pedestrian map data that can be combined with obstacle data to generate a clear path from source to destination as the utility robot travels from one place to another. Crowd-sourced data can augment both navigational and obstacle data. Operators who travel in the vicinity of the source of the goods and the target services area can be invited to wear cameras and upload data to the utility robot, and/or to upload an application that can, for example, but not limited to, track location, speed of movement, congestion, and/or user comments. Operators can perform the job of smart sensors, providing, for example, but not limited to, situational awareness and preferred speed to the utility robot. In some configurations, operator driven systems of the present teachings can generate training data for interactions with people including, but not limited to, acceptable approach distances, following distances, and passing distances. Cellular phone-type data, such as, for example, but not limited to, obstacles and their speed and local conditions, can be made available to the fleet's database to enable detailed and accurate navigation maps. The utility robot can include technology that can determine areas in which the GPS signal falls below a desired threshold so that other technologies can be used to maintain communications. Sidewalks can be painted with various substances, such as, for example, but not limited to, photo luminescent substances, that can be detected by sensors on the utility robot. The utility robot can use the data gathered from sensing the substances to create and augment navigation maps.

Wheel rotation and inertial measurement data can be combined to determine dead reckoning positions when creating the maps. Sensor data, such as data from visual sensors, can be used to determine dead reckoning positions. The utility robots of the present teachings can receive information about their routes from information collected by trucks, and members of the fleet can be used to create/improve pedestrian maps. The trucks can include portable utility robots, and the operators of the trucks can collect further data by use of body cameras and location sensors to map walking deliveries. Visual, audible, and thermal sensing mechanisms can be used on the trucks and in conjunction with the operator's movements. The utility robot can make use of optimized and/or preferred route information collected by trucks and operators. The utility robot can include a pedestrian route on the desired navigation map.

In some configurations, the utility robot can learn navigation paths independently and can share the navigation information with other members of the fleet network. In some configurations, the operator can select at least one optimum navigation route. The utility robot can also include cameras that can be used to augment navigation maps. Areas that can be located inside buildings such as, for example, but not limited to, doors, stairs, and elevators, and routes limited to pedestrians, can be candidates for body camera data collection. In subsequent journeys to the same location, the doors, stairs, and elevators may be navigable by the utility robot, and the utility robot can by-pass pedestrian-only paths, for example. The utility robot can follow a planned route. The utility robot can receive commands from the operator, and/or can self-command based on the desired route. Steering and location assistance can be provided by navigation tools combined with obstacle avoidance tools. The utility robot can accommodate ADA access rules, including, but not limited to, space requirements with respect to the utility robot's egress and ingress requirements.

In some configurations, the dynamic navigation path can be updated by the utility robot when the utility robot determines if an obstacle can be surmounted and/or avoided. For example, the utility robot can determine if the obstacle can be driven over, such as a curb, a rock, or a pothole, or can be driven around. The utility robot can determine if the obstacle can be expected to move out of the navigation path, and if there is a way that the utility robot can make progress along the planned navigation path. In some configurations, the utility robot of the present teachings can accommodate crossing roads with and without traffic signals, curbs, dynamic obstacles, and complete path obstruction. The utility robot can include routing technology that can avoid congested areas based on, for example, but not limited to, current congestion information from other utility robots of the present teachings, crowd-sourced congestion information, and historical congestion information from other utility robots of the present teachings and trucks. Historical congestion information can include, but is not limited to including, day and time of congestions from past traverses in the same area by utility robots of the present teachings, and data and time of congestion from delivery truck speed. Dynamic navigation paths can be created based on current path data and the maps. The utility robot can include training technology in which data from operators traveling a route can inform the utility robot of the present teachings how to interact with moving obstacles and how to behave in an environment having moving obstacles. In some configurations, data from fleet drivers traveling the route can be used as training data for machine learning on how to interact with moving people or in an environment of moving people. In some configurations, a heat map of pedestrian traffic can be used to update pedestrian density data. In some configurations, route planning can take into account the desired transit time, the estimated transit time, how much space obstacles are occupying on the planned route, and how much space the utility robot requires. The utility robot can determine its status with respect to the planned route, and can track what movement the obstacles in the planned route are making.

Each form of sensor data can provide a unique view of its surroundings, and fusing the various types of sensor data can help to specifically identify obstacles, including dynamic objects. Using these data, dynamic objects can be classified by methods including, but not limited to, semantic segmentation. Predicting the future position of a dynamic object, after it has been identified, can be accomplished by semantic scene segmentation which can color code a scene based on object type. The future position of a dynamic object can also be predicted by creating behavioral models of dynamic objects that can be processed by the utility robots of the present teachings. Neural networks, Kalman filters, and other machine learning techniques can also be used to train the utility robot of the present teachings to understand and react to its surroundings. If the utility robot encounters an obstacle with which it can interact, for example, a pedestrian, the utility robot can be trained to stop before encountering the pedestrian, greet the pedestrian, and avoid hitting the pedestrian, for example. In some configurations, planar LIDAR, visual sensors, and ultrasonic sensors can be used to detect pedestrians. A critical distance around a pedestrian can be defined based on the distance needed to stop based on sensor delays, and social norms, for example. The socially-acceptable interactions between the utility robot and humans may be defined by data from user-driven systems interacting with humans. In some configurations, the data collected by the user-driven systems can be used to train a neural network in the autonomous systems that can control the utility robot's interaction with humans. In some configurations, to avoid obstacles such as humans and vehicles when crossing a street, RADAR and/or LIDAR, combined with stereo cameras, can be used for long distance viewing and to reliably identify the obstacles and create a crossing strategy. In some configurations, the utility robot of the present teachings can communicate wirelessly with available electronic sources such as elevators and pedestrian crosswalks. Smart beacons can be used for this purpose. When obstacles such as construction zones are encountered, the utility robot of the present teachings can purposefully navigate the construction zone, and can inform other fleet members of the extent of the obstacle, giving the other fleet members an opportunity to avoid the obstacle. A neural network executing in the utility robot can train the utility robot to recognize crossing signals, for example, and to cross when safe.

The utility robot can receive information from smart beacons placed strategically along travel paths. In some configurations, information from the smart beacons can be encrypted, and/or information exchanged between the utility robot of the present teaching and the smart beacon can be encrypted to protect the utility robot from malicious hacking. In some configurations, the smart beacons can include cameras, RADAR, and/or LIDAR that can be used to map the local area. In some configurations, smart beacons can vary in complexity and specialization. For example, smart beacons that can manage network communications can be placed in areas where it is likely that network members will need communication services. Smart beacons that include mapping cameras can be placed in locations where mapping is required, and can be moved from place to place depending on current needs. In some configurations, smart beacons can include data transfer hot spot capability, or other networking capability to enable the fleet network of the present teachings to communicate among fleet members. In some configurations, smart beacons can recognize the travel path and be aware of the next navigation step required for the utility robot to reach its desired destination. Smart beacons can receive at least part of the utility robot's path and/or destination from a server. The smart beacons can identify the utility robots of the present teachings, possibly through the secure wireless exchange of identifying information, possibly through visual and/or audible identification techniques, or other means. Secure exchange of messages can include encryption, for example, and other forms of protection against in-flight message modification, man-in-the-middle threats such as eavesdropping and denial of service, third party application threats, and malicious/erroneous application threats. The utility robot can receive navigation information from the smart beacon, including homing, triangulation, and aiming signals. The utility robot can receive current mapping information including, but not limited to, congestion areas and path closures, from the smart beacon, and the utility robot can send the information it has collected to the smart beacon. The utility robot can make beacon information available to other utility robot fleet members at any time, for example, but not limited to, during a parcel delivery and/or pickup. The utility robot can receive information from the smart beacon that can be used to correct the utility robot's IMU dead reckoning and wheel rotation navigation. In some configurations, the utility robot can navigate entirely through information received from the smart beacon. For example, in a congested area, it is possible that some of the sensors located on the utility robot of the present teachings could be blocked. Sensors, for example, LIDAR sensors, on the smart beacon can provide navigation information to the utility robot of the present teachings that the utility robot could not itself have obtained with its on-board sensors. Sensors located on any of the utility robots of the present teachings, the trucks, and/or the smart beacons can provide current congestion information from cameras and/or thermal imaging to form heat maps. The utility robot can receive instructions from a steerable RF or laser beacon that can be controlled by another member of the fleet, a central control location, or by the utility robot itself. In some configurations, the utility robot can be configured with a minimum number of sensors if data are planned to be collected by other fleet members. The utility robot can receive these sensor data, for example, the heat maps, and recognize the location of groups of obstacles, possibly dynamic obstacles, within potential travel routes. In areas without various types of beacons, exploring utility robots with partial or full complements of sensors, can retrieve navigation and congestion data and make the data accessible to utility robots of the present teachings that are traveling the explored routes to deliver goods and services. The exploring systems can provide their sensor data and analyses to a central service, a cloud-based storage area, a smart beacon, and/or another exploring system, utility robot, and/or truck or other member of the delivery fleet, for example. Beacons can be used to facilitate data communications among the fleet members, and can be used to improve localization accuracy. In some configurations, beacons can include wireless access points generating signals, such as, for example, wifi and RF signals, that can be used to help navigate the utility robot in areas in which global positioning techniques are inadequate.

BRIEF DESCRIPTION OF THE DRAWINGS

The present teachings will be more readily understood by reference to the following description, taken with the accompanying drawings, in which:

FIGS. 20-22 are pictorial representations of object detection and classification of the present teachings;

DETAILED DESCRIPTION

The utility system of the present teachings is discussed in detail herein in relation to commercial services. However, various types of applications may take advantage of the features of the present teachings.

Figure 1:
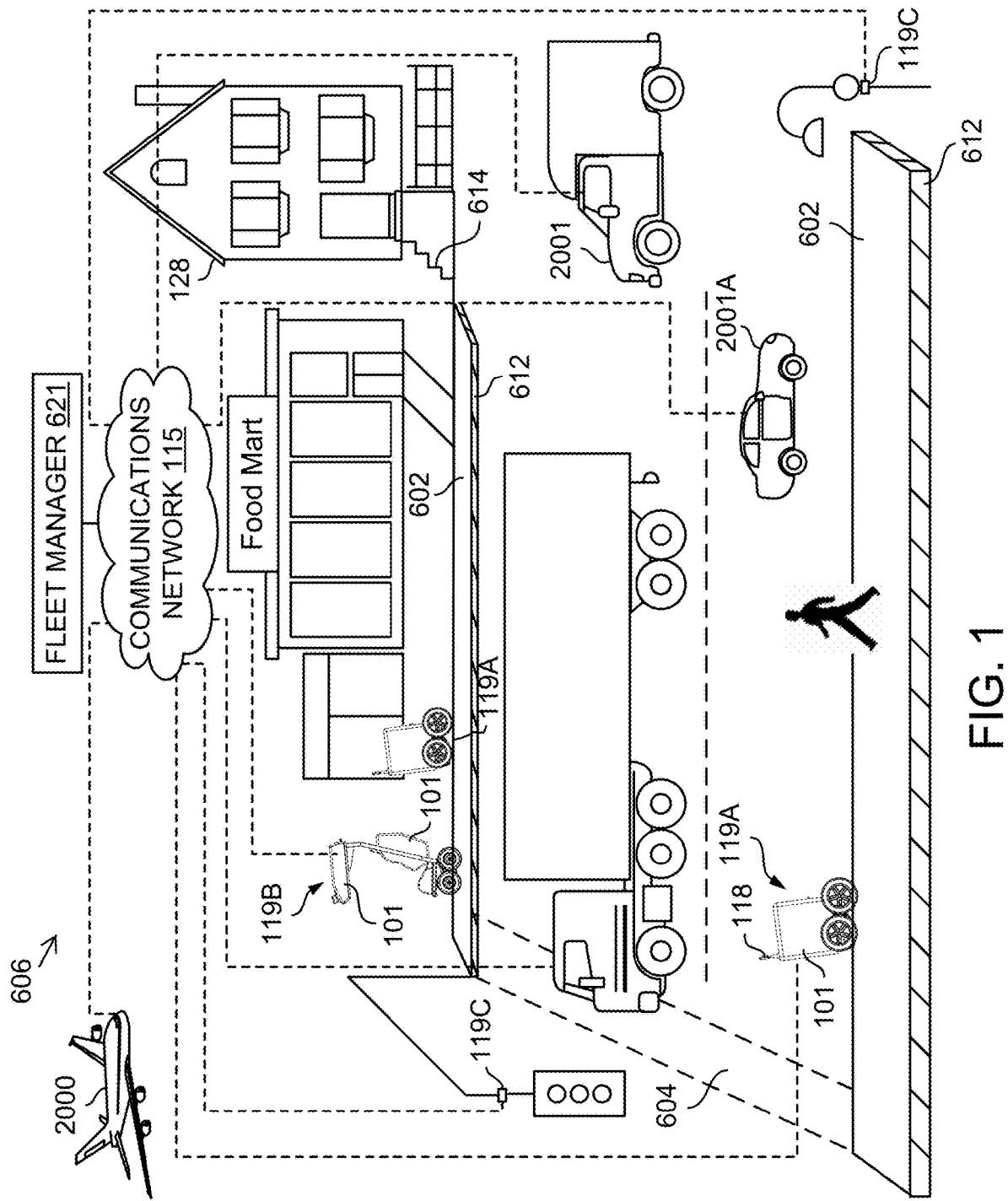
FIG. 1 is a pictorial representation of the fleet network of the present teachings.
Figure 2:
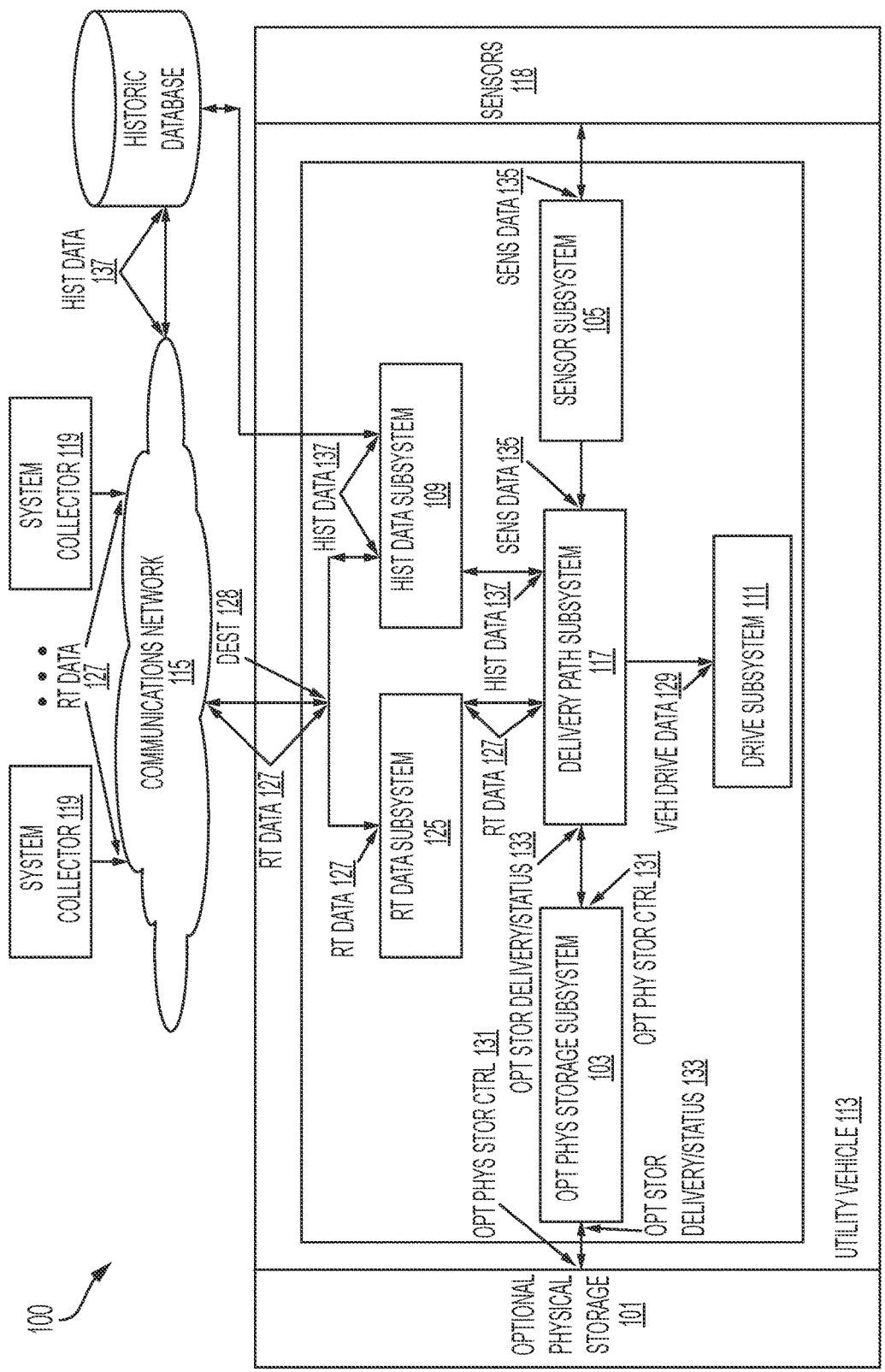
FIG. 2 is a schematic block diagram of the system of the present teachings.

Referring now to FIGS. 1 and 2, system 100 for moving a utility robot from at least one starting point to at least one utility execution point 128 can include, but is not limited to including, system collectors 119 that can form a communications network. System collectors 119 (FIG. 2) can access historic data 137 (FIG. 2) associated with a proposed path between at least one starting point and at least one ending point 128. System collectors 119 can include utility vehicles 113 (FIG. 2). At least one utility vehicle 113 (FIG. 2) can include, but is not limited to including, autonomous utility vehicle 119A (FIG. 1) and semi-autonomous utility vehicle 119B (FIG. 1). In some configurations, at least one utility vehicle 113 (FIG. 2) can include at least one sensor 118 and at least one storage container 101. In some configurations, at least one storage container 101 can house the goods that are to be delivered. Historic data 137 (FIG. 2) can include vehicle data 129 (FIG. 2) previously collected along the proposed path, which can be delivered to drive subsystem 111. Drive subsystem 111 can provide drive commands to utility vehicle 113 processors. System collectors 119 (FIG. 2) can collect real time data 127 (FIG. 2) about the proposed path before and while at least one utility vehicle 113 (FIG. 2) navigates the proposed path. System collectors 119 (FIG. 2) can update the proposed path based at least on vehicle data 129 (FIG. 2), historic data 137 (FIG. 2), and real time data 127 (FIG. 2). System 100 can include at least one processor that can execute in utility vehicle 113 (FIG. 2), and/or in a server such as, for example, fleet manager 601 (FIG. 1) communicating with system collectors 119 (FIG. 2), including utility vehicles 113 (FIG. 2), through communications network 115 (FIG. 2). The processors can continually update—based at least on historic data 137 (FIG. 2), real time data 127 (FIG. 2), and at least one sensor 118—the updated proposed path while utility vehicles 113 (FIG. 2) navigate the updated proposed path from at least one starting point to at least one utility execution point 128. In some configurations, system collectors 119 (FIG. 2) can optionally include airborne vehicles 2000 (FIG. 1) that can transport the goods to, for example, trucks 2001 (FIG. 1). In some configurations, self-driving cars 2001A can be included in the fleet network.

Referring now to FIG. 2, a group of utility vehicles 113 can travel together for several reasons. In some configurations, one member of the group can be "learning" a delivery path and can be "teaching" other members the path. In some configurations, multiple utility vehicles 113 can be required to deliver goods and/or perform services that are too numerous for a single utility vehicle 113 to accomplish. In some configurations, a method for delivering goods from at least one first location to at least one second location can include, but is not limited to including, coupling, by at least one of a plurality of utility vehicles, at least one of the plurality of utility vehicles with another of the plurality of utility vehicles through a communications network. The method can include receiving, by at least one of a plurality of utility vehicles 113, the goods from the at least one first location into at least one of the plurality of utility vehicles 113. The method can include determining, by at least one of a plurality of utility vehicles 113, a proposed path between the at least one first location and the at least one second location, and enabling, by at least one of a plurality of utility vehicles, the at least one of the plurality of utility vehicles 113 to follow the other of the plurality of utility vehicles 113 along the proposed path, and enabling, by at least one of the plurality of utility vehicles 113, the other of the plurality of utility vehicles 113 to deliver the goods at the second location. The method can optionally include (a) updating, by at least one of a plurality of utility vehicles 113 (FIG. 2), the proposed path based at least on information received in real time from the one at least one utility vehicle 113 and the other at least one utility vehicle 113, (b) enabling, by at least one of a plurality of utility vehicles 113, the one at least one utility vehicle 113 to proceed along the updated proposed path, and (c) repeating (a) and (b) until the one at least one utility vehicle 113 reaches the at least one second location. The coupling can optionally include a physical and/or an electronic coupling.

Continuing to refer to FIG. 2, a group of utility vehicles 113 can include at least one semi-autonomous utility vehicle 119B (FIG. 1) and/or at least one autonomous utility vehicle 119A (FIG. 1). At least one of utility vehicles 113 can optionally follow a different path from the rest of the group. At least one diverted utility vehicle 113 can provide services at a different location from the rest of the group, for example, or may have experienced mechanical or electronic problems and can seek help, or may have been summoned by a customer needing help with a package or a safe escort. Any members of the group can optionally update the fleet network with path and status information, for example, through communication network 115 (FIG. 1). In some configurations, when a customer at the first location needs assistance, the customer can summon a nearby one of utility vehicles 113 through, for example, fleet manager 621 (FIG. 1), or through, for example, direct communications with utility vehicle 113. Utility vehicle 113 can optionally be directed to a mobile destination or a fixed destination, or a destination that had been fixed but became mobile, for example, a parked vehicle that starts and moves or a pedestrian who is walking. In some configurations, one member of the group can be "learning" a travel path and "teach" other members the path. In some configurations, semi-autonomous utility vehicle 119B (FIG. 1) can create an electronic record of a traversed path based on sensor data 118. Autonomous vehicle 119A (FIG. 1) can follow the traversed path by steering according to the electronic record. In some configurations, utility vehicle 113 can transport goods. In some configurations, system 100 can include optional physical storage 101, and optional physical storage subsystem 103 that can provide optional physical storage control commands 131 to optional physical storage 101. Optional physical storage 101 can include at least one processor, for example, that can receive commands and respond to the commands. Optional physical storage subsystem can provide receive and send optional physical storage status 133 from/to delivery path subsystem 117 which can be tracking the status of the goods contained in optional physical storage 101.

Figure 3:
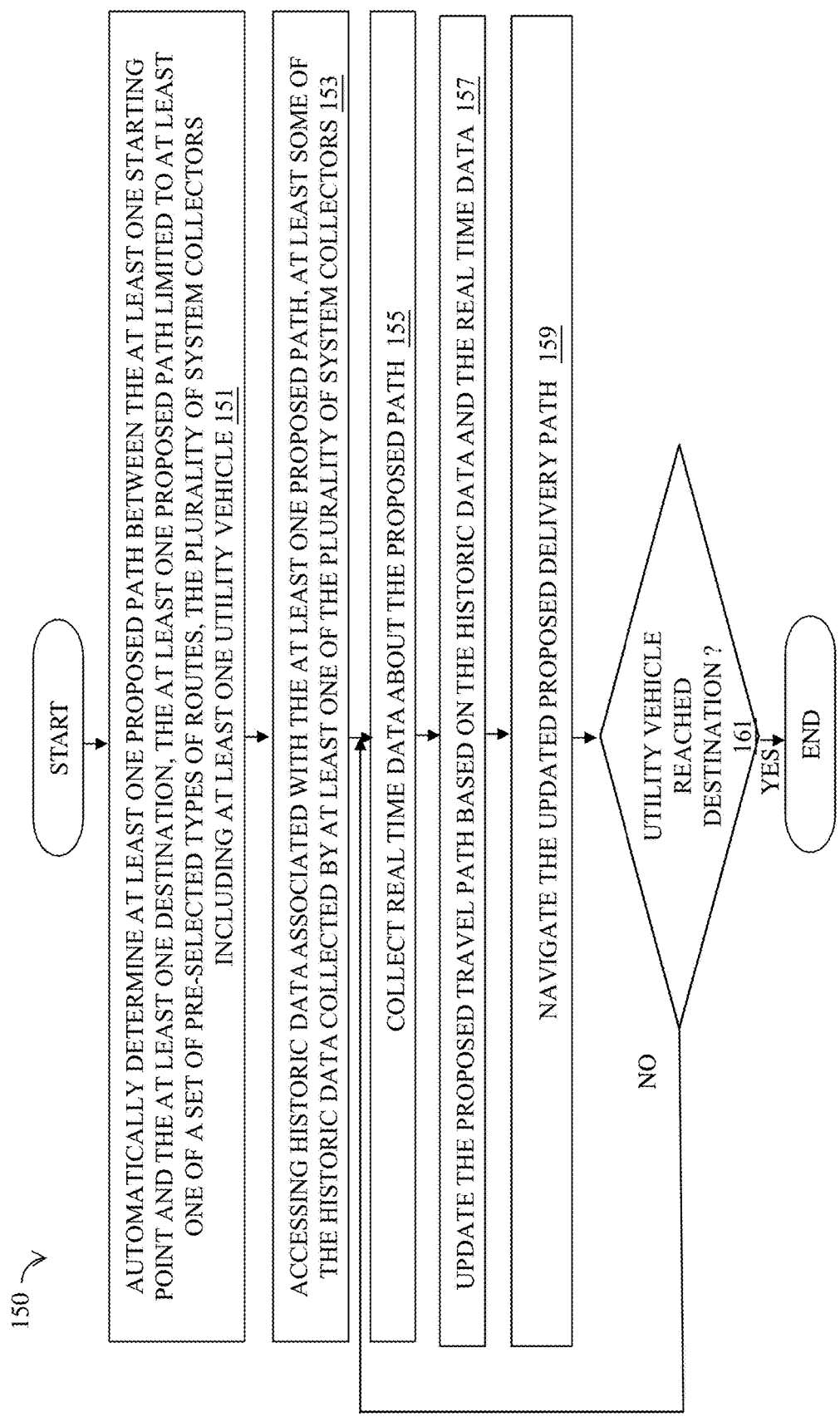
FIG. 3 is a flowchart of the method of robot path processing of the present teachings.

Referring now to FIG. 3, method 150 of the present teachings for establishing a path for moving utility vehicle 113 (FIG. 2) from at least one starting point to at least one destination 128 (FIG. 2) can include, but is not limited to including (a) automatically determining 151, by fleet network 606 (FIG. 1) including system collectors 119 (FIG. 2), at least one proposed path between the at least one starting point and at least one destination 128 (FIG. 2). The proposed path can be selected from a set of pre-selected types of routes. In some configurations, the proposed path can include pedestrian route 602 (FIG. 1) including street crossings 604 (FIG. 1). System collectors 119 (FIG. 2) can include utility vehicles 113 (FIG. 2). Method 150 can include (b) accessing 153, by utility vehicle 113 (FIG. 2), historic data 137 (FIG. 2) associated with the proposed path. At least some of historic data 137 (FIG. 2) can be collected by at least one of system collectors 119 (FIG. 2). Method 150 can include (c) collecting 155, by at least one of system collectors 119 (FIG. 2), real time data 127 (FIG. 2) about the proposed path, and (d) updating 157, by fleet network 606 (FIG. 1), the proposed path based on historic data 137 (FIG. 2) from historical data subsystem 109 (FIG. 2) and collected real time data 127 (FIG. 2) from real time data subsystem 125 (FIG. 2). Method 150 can include (e) navigating 159, by utility vehicle 113 (FIG. 2), the updated proposed path, and (f) repeating 161 (*c*)-(*e*) until utility vehicle 113 (FIG. 2) reaches the at least one destination 128 (FIG. 2). Method 150 can optionally include authenticating and annotating the updated proposed path, by utility vehicle 113 (FIG. 2), as utility vehicle 113 (FIG. 2) navigates the updated proposed path, and providing, by utility vehicle 113 (FIG. 2), the authenticated, annotated, updated proposed path to fleet network 606 (FIG. 1). Method 150 can optionally include forming communications network 115 (FIG. 2) including system collectors 119 (FIG. 2), and sharing, by system collectors 119 (FIG. 2), historic data 137 (FIG. 2) and real time data 127 (FIG. 2) through communications network 115 (FIG. 2). Authenticating and annotating can include receiving, by utility vehicle 113 (FIG. 2), visually-collected information from a driver of utility vehicle 113 (FIG. 2). Historic data 137 (FIG. 2) can include, but is not limited to including, data from a plurality of sources. Fleet network 606 (FIG. 1) can include, but is not limited to including at least one server. Method 150 can include maintaining, by the at least one server, historic data 137 (FIG. 2) and the updated proposed path.

Figure 4:
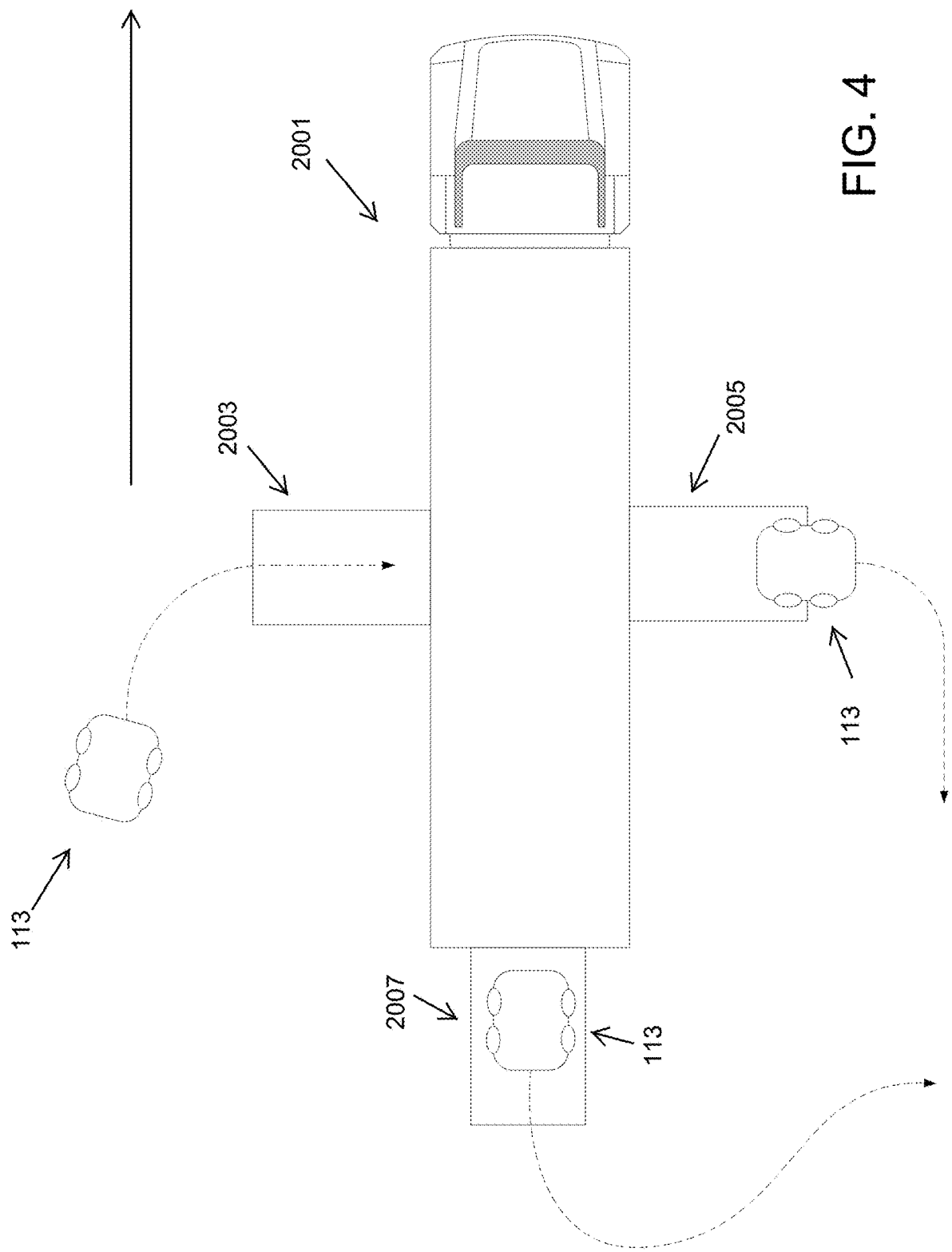
FIG. 4 is a pictorial representation of the truck and autonomous vehicles of the present teachings.
Figure 5:
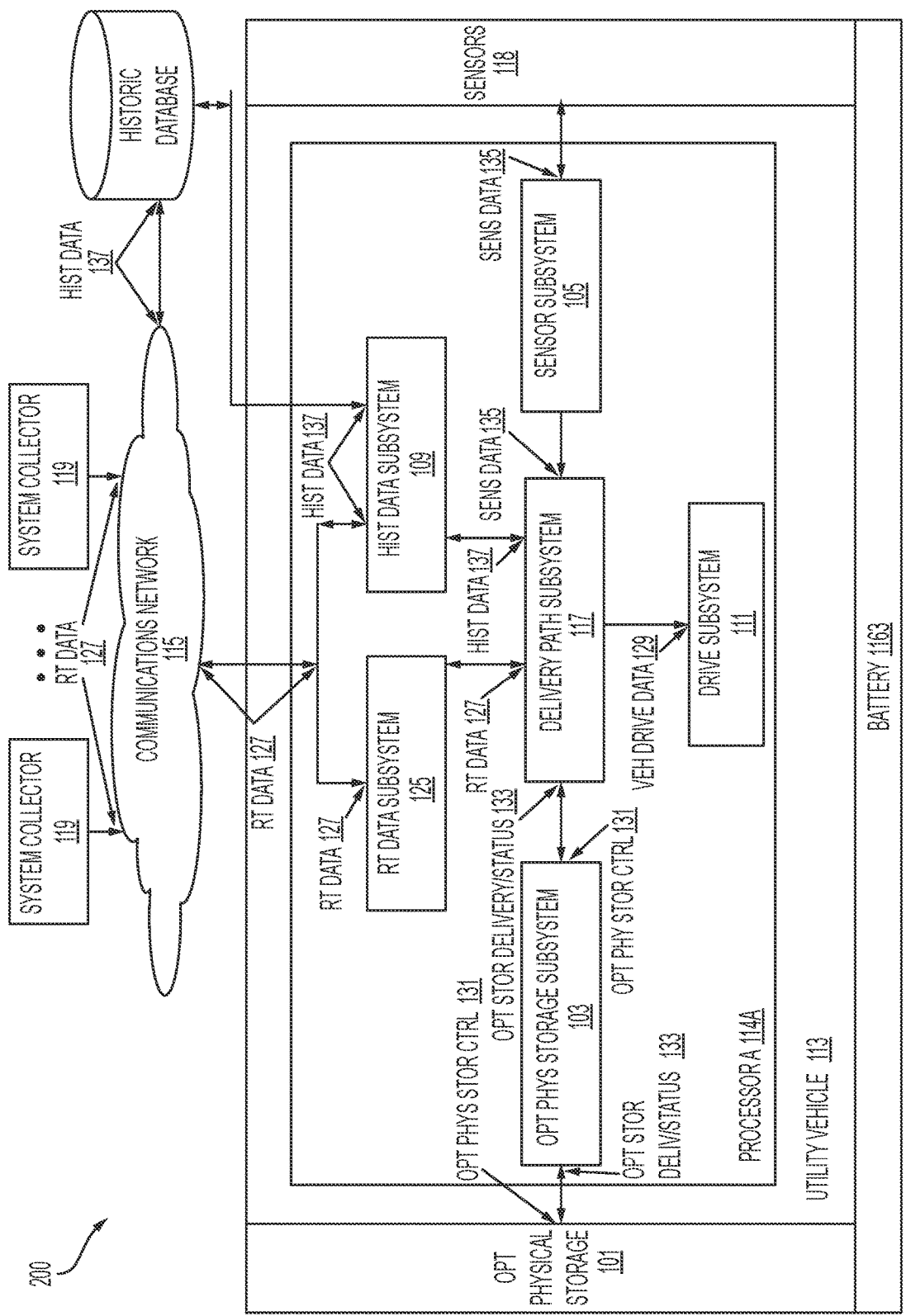
FIG. 5 is a schematic block diagram of a second configuration of the system of the present teachings.

Referring now to FIG. 4, system collectors 119 (FIG. 2) can include trucks 2001 that can, for example transport goods to utility vehicles 113, and can transport utility vehicles 113 to the vicinity of delivery locations 128 (FIG. 1). Trucks 2001 can enable exchanging of spent batteries 1163 (FIG. 5) with charged batteries 1163 (FIG. 5) in utility vehicles 113. Trucks 2001 can include battery charging features that can charge spent batteries 1163 (FIG. 5). Trucks 2001 can include lift mechanisms that can enable ingress and egress of utility vehicles 113. Trucks 2001 can optionally include in-lift features 2003 and out-lift features 2005/2007 such as, for example, but not limited to, ramps, that can enable ingress and egress of utility vehicles 113 to/from trucks 2001. In some configurations, trucks 2001 can be moving while utility vehicles 113 enter and leave trucks 2001. In some configurations, utility vehicles 113 can receive packages from trucks 2001, and can drop packages such as, but not limited to, undeliverable packages, into trucks 2001.

Figure 6:
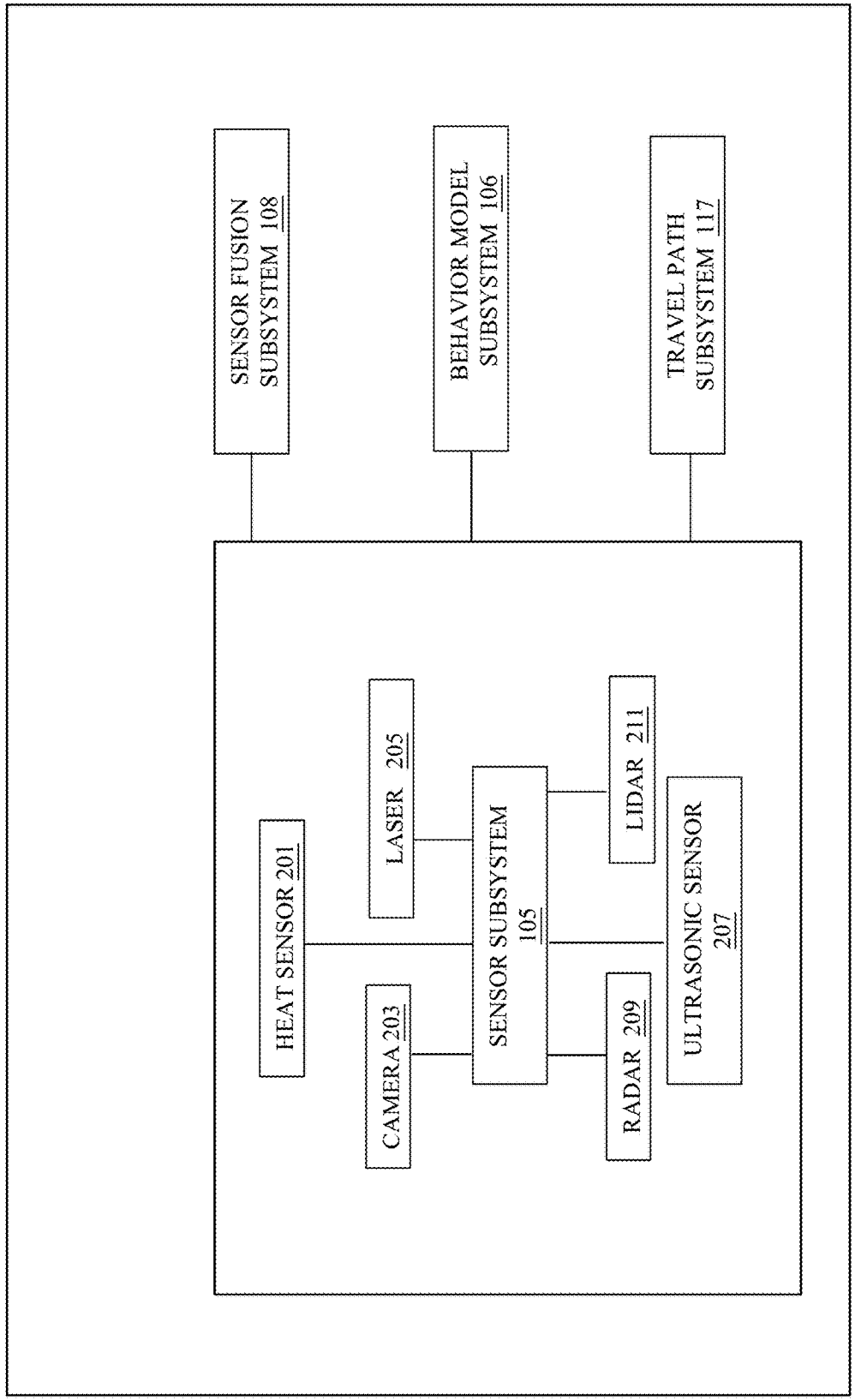
FIG. 6 is a schematic block diagram of the sensor system of the present teachings.

Referring now to FIGS. 5 and 6, in some configurations, utility execution system 200 (FIG. 5) for moving utility vehicles from at least one first location to at least one second location can include, but is not limited to including, a network of system collectors 119 (FIG. 5) including at least one utility vehicle 113 (FIG. 5). Utility execution system 200 (FIG. 5) can include at least one processor A 114A. Utility vehicle 113 (FIG. 5) can optionally include sensor subsystem 105 (FIG. 5) that can process data from sensors 118 (FIG. 5). Sensors 118 (FIG. 5) can include, but are not limited to including, infrared (IR) sensors 201 (FIG. 6) that can sense, for example, pedestrians, cameras 203 (FIG. 6) that can sense object depth, and lasers 205 (FIG. 6) that can provide a point cloud representation of an object and distance measurements. Sensors 118 (FIG. 5) can include ultrasonic sensors 207 (FIG. 6) that can sense the distance to an object, radar 209 (FIG. 6) that can sense the speed of an object, as well as weather and traffic proximate to utility vehicle 113 (FIG. 5), and LIDAR 211 (FIG. 6) that can, for example, but not limited to, provide point cloud data. Sensor subsystem 105 (FIG. 5) can optionally include sensor fusion subsystem 108 (FIG. 6) that can integrate data from a plurality of sensors 118 (FIG. 5). Sensor fusion subsystem 108 (FIG. 6) can classify obstacles encountered by utility vehicle 113 (FIG. 6), and can validate the observations from unreliable sensors. Sensor subsystem 105 (FIG. 5) can optionally include behavior model subsystem 106 (FIG. 6) that can predict future positions of the obstacles. Sensor subsystem 105 can optionally expect sensor data 135 to arrive from at least two of sensors 118 (FIG. 5). Utility vehicle 113 (FIG. 5) can optionally include at least one battery 1163 (FIG. 5). Battery 1163 (FIG. 5) can optionally include a quick charge feature and a quick change feature, both of which can reduce non-operational time of utility vehicle 113 (FIG. 5). Battery 1163 (FIG. 5) can optionally include a locking feature that can lock battery 1163 (FIG. 5) to utility vehicle 113 (FIG. 5). The locking feature can include a security feature that can enable removal of battery 1163 (FIG. 5).

Figure 7:
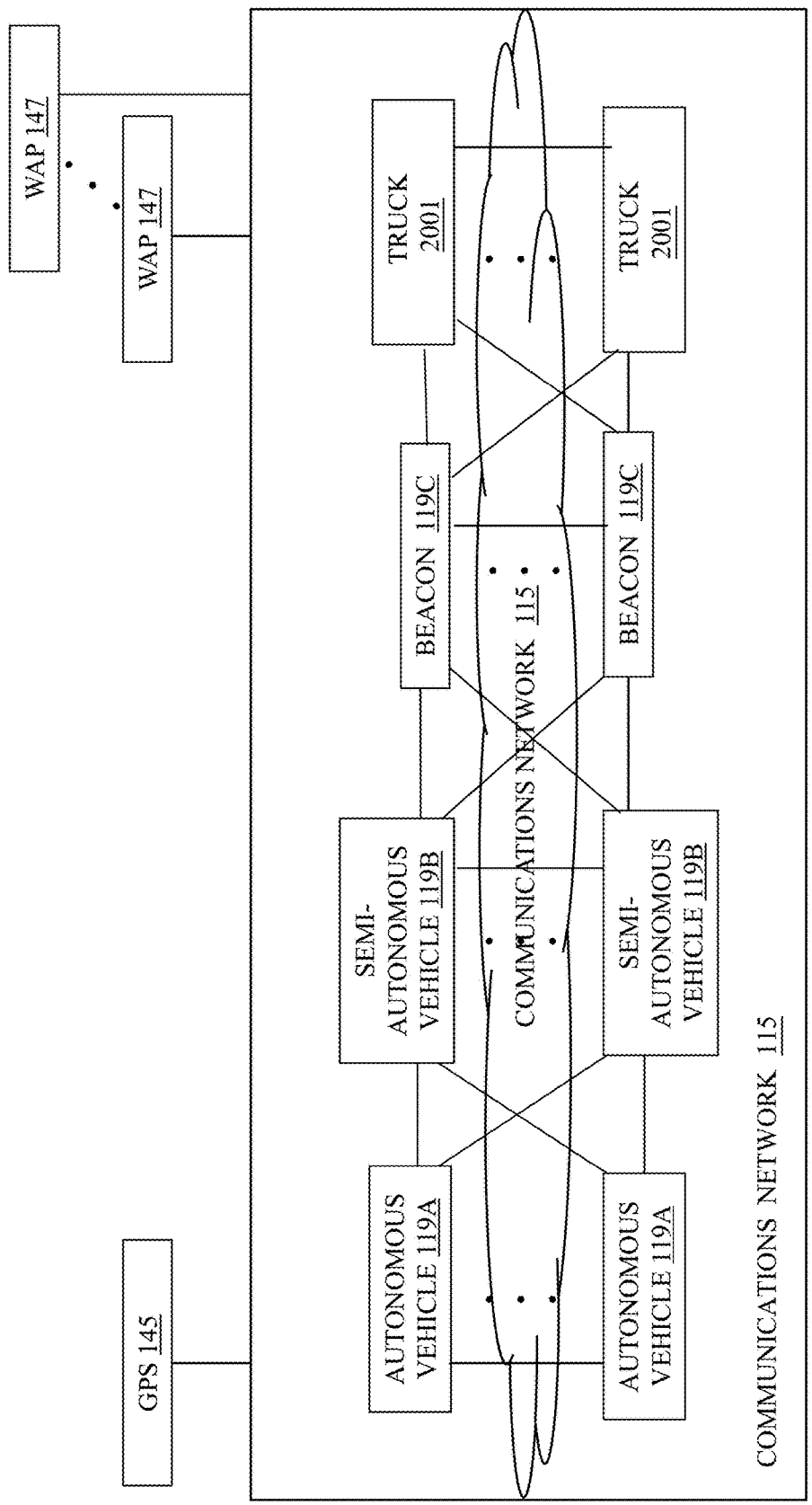
FIG. 7 is a schematic block diagram of the fleet network communications of the present teachings.

Referring now to FIGS. 1 and 7, utility vehicles 113 (FIG. 2) can optionally include at least one autonomous vehicle 119A and/or at least one semi-autonomous vehicle 119B. Autonomous vehicles 119A of the present teachings can include vehicles that can navigate with little to no human intervention. Semi-autonomous vehicles 119B of the present teachings can collect information from an operator while traversing terrain either autonomously or under human control or under shared control between the human and an autonomous processor. Autonomous vehicles 119A and semi-autonomous vehicles 119B can operate on, for example, but not limited to, sidewalks 602 (FIG. 1) and other pedestrian pathways that can include, for example, but not limited to, cross-walks 604 (FIG. 1), curbs 612 (FIG. 1), stairs 614 (FIG. 1), and elevators. System collectors 119 (FIG. 2) can optionally include at least one beacon 119C positioned along the updated proposed path. System collectors 119 (FIG. 2) can optionally include beacons 119C positioned along the updated proposed path. Beacons 119C can sense, for example, but not limited to, obstacles, weather, and fiducials and can provide those data to other system collectors 119 (FIG. 2), one or more of which can include utility vehicles 113 (FIG. 2). Beacons 119C can enable communication among system collectors 119 (FIG. 2), and can enable data protection during the exchange of data between beacons 119C and other system collectors 119 (FIG. 2). Beacons 119C, along with all other system collectors 119 (FIG. 2), can receive and transmit data over communications network 115 (FIG. 2), and can provide those data to utility vehicles 113 (FIG. 2), among other recipients. Members of communications network 115 (FIG. 2) can optionally receive GPS navigation information 145 (FIG. 7) and information from wireless devices using, for example, but not limited to, wireless access points (WAP) 147 (FIG. 7). At least one WAP 147 (FIG. 7) can optionally enable fleet communications when communications network 115 (FIG. 2) is inadequate, and location information when GPS 145 (FIG. 7) is inadequate.

Figure 8:
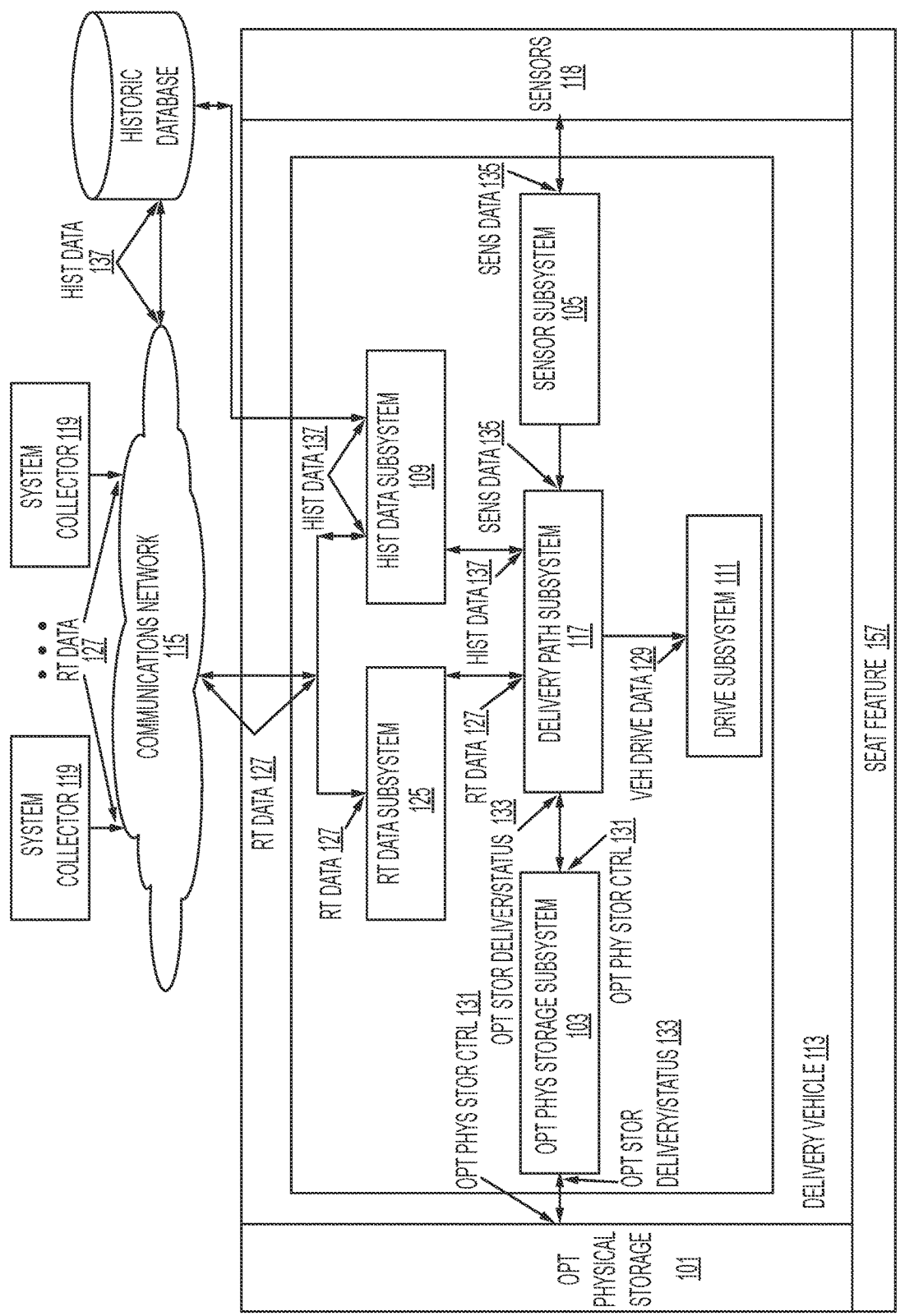
FIG. 8 is a schematic block diagram of a third configuration of the system of the present teachings.

Referring now to FIG. 8, utility vehicle 113 can optionally include seat feature 157 that can accommodate an operator. The operator can control utility vehicle 113, or can partially control utility vehicle 113. In some configurations, semi-autonomous utility vehicle 119B (FIG. 1) can include seat feature 157. In some configurations, semi-autonomous utility vehicle 119B (FIG. 1) can include a wheelchair. In some configurations, semi-autonomous utility vehicle 119B (FIG. 1) can be remotely controlled, with no seating feature 157 and no operator.

Figure 9:
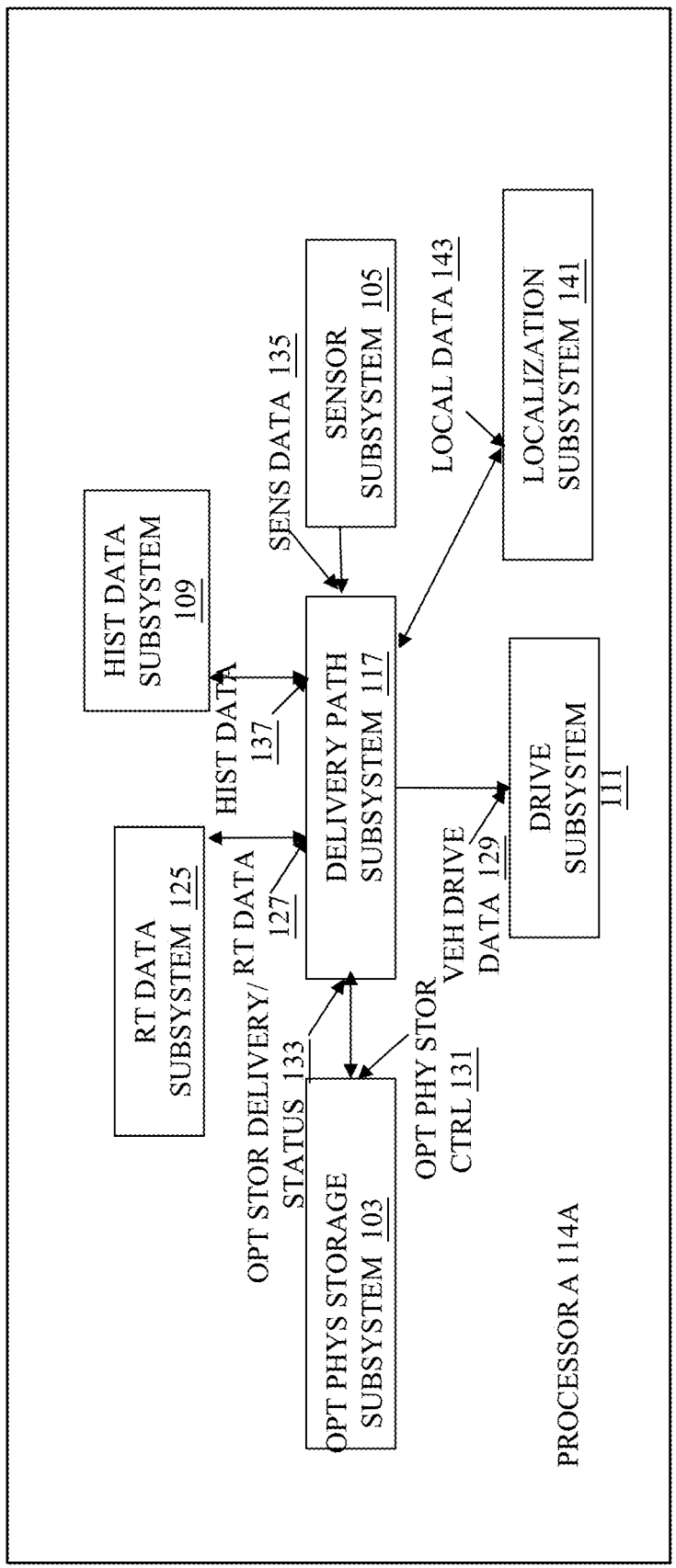
FIG. 9 is a schematic block diagram of a configuration of a vehicle system including a localization subsystem.

Referring now to FIG. 9, utility vehicle 113 (FIG. 2) can optionally include at least one localization subsystem 141 that can localize utility vehicle 113 (FIG. 2) based at least on historic data 137, and/or real time data 127, and/or local data 143, where localization can include, but is not limited to, determining the current location and orientation of utility vehicle 113 (FIG. 2).

Figure 10:
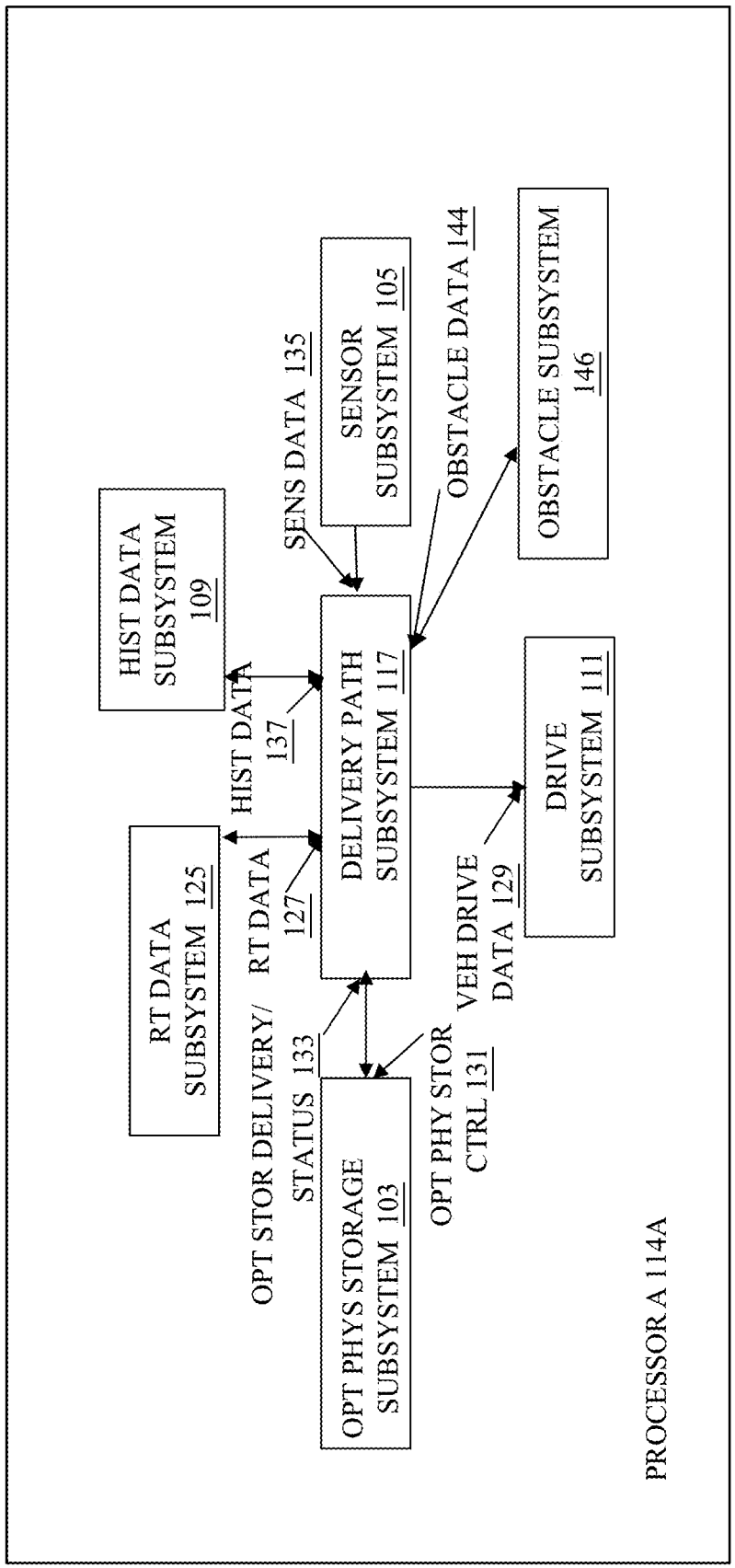
FIG. 10 is a schematic block diagram of a configuration of a vehicle system including an obstacle subsystem.
Figure 11:
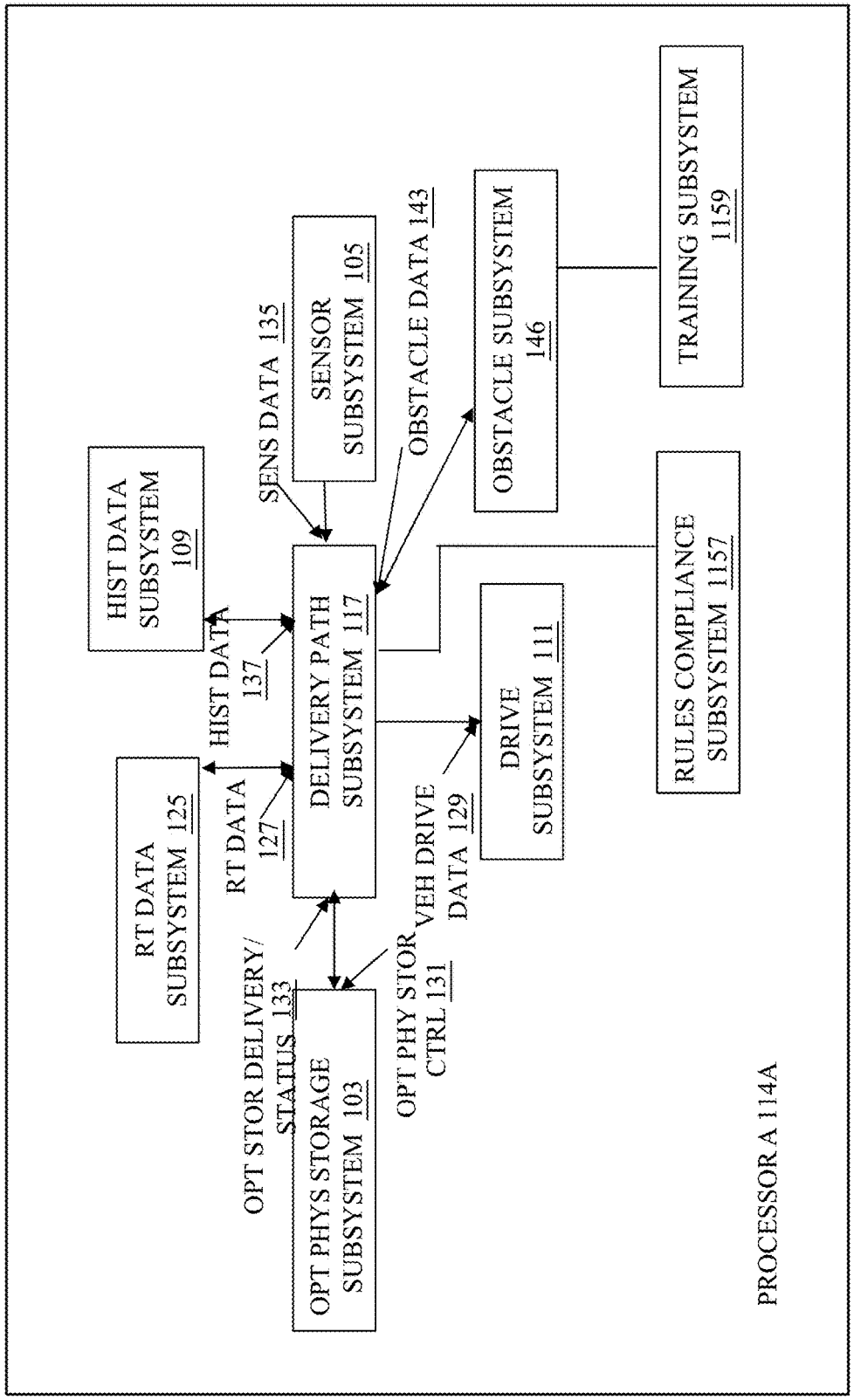
FIG. 11 is a schematic block diagram of a configuration of a vehicle system including training and rules compliance subsystems.

Referring now to FIGS. 10 and 11, utility vehicle 113 (FIG. 2) can optionally include obstacle subsystem 146 that can locate at least one obstacle in the update proposed path. Obstacle subsystem 146 can update the updated proposed path when obstacle data 144 are discovered. Obstacle subsystem 146 can rely upon training subsystem 1159 (FIG. 11) to provide obstacle recognition means. Training subsystem 1159 (FIG. 11) can provide continuous learning of situations encountered by members of the fleet, and can provide those data to obstacle subsystem 146 to improve route planning and execution. Obstacle subsystem 146 can be pre-trained. Training subsystem 1159 (FIG. 11) can include and/or can be based on neural network technology, for example. Training subsystem 1159 (FIG. 11) can operate remotely from processor A 114A. Utility vehicle 113 (FIG. 2) can optionally include rules compliance subsystem 1157 (FIG. 11) that can access navigation rule information from at least one of historic data 137, real time data 127, and sensor data 135. Rules compliance subsystem 1157 (FIG. 11) can command utility vehicle 113 (FIG. 2) to navigate at least according to the navigation rule information.

Figure 12:
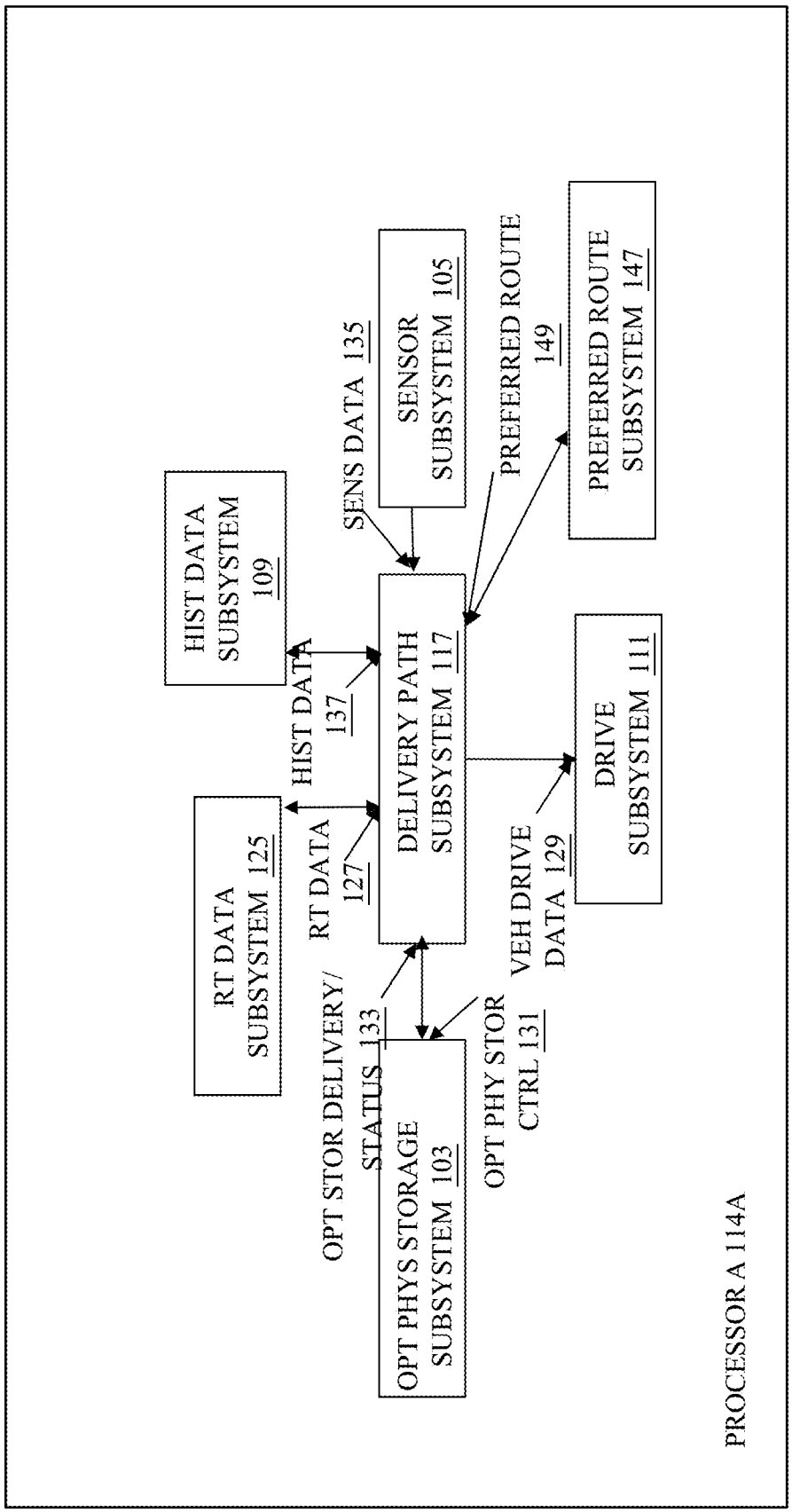
FIG. 12 is a schematic block diagram of a configuration of a vehicle system including a preferred route subsystem.

Referring now to FIG. 12, utility vehicle 113 (FIG. 2) can optionally include preferred route subsystem 147 that can determine at least one preferred route 149 between at least one starting point and at least one destination 128 (FIG. 1). Utility vehicle 113 (FIG. 2) can select at least one preferred route 149 based at least on historic data 137 and real time data 127. Preferred route subsystem 147 can optionally determine at least one path between at least one starting point and at least one destination 128 (FIG. 1) that utility vehicle 113 (FIG. 2) should avoid based at least on the number of obstacles in the updated proposed path.

Figure 13:
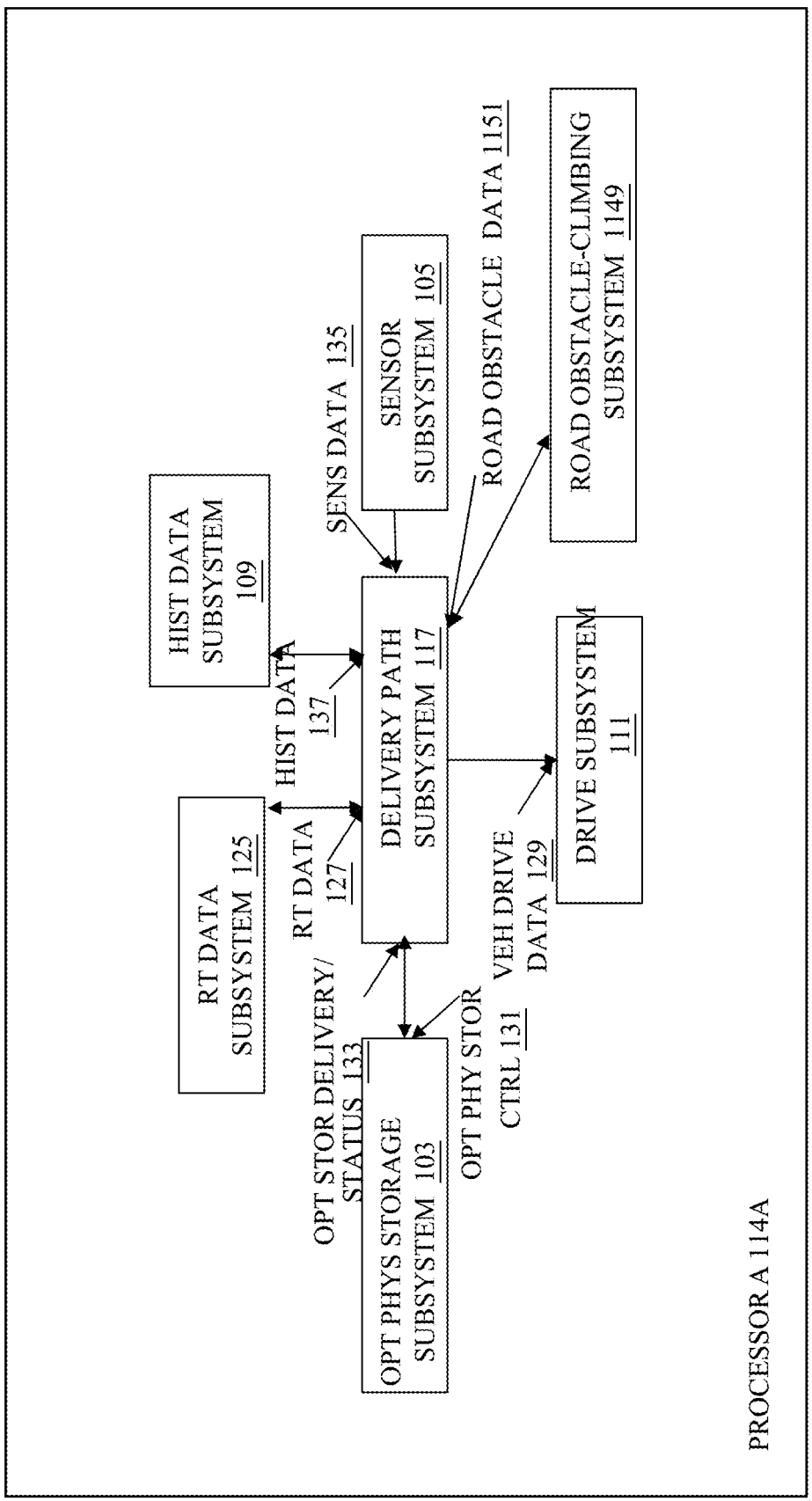
FIG. 13 is a schematic block diagram of a configuration of a vehicle system including a road obstacle-climbing subsystem.

Referring now to FIG. 13, utility vehicle 113 (FIG. 2) can optionally include road obstacle-climbing subsystem 1149 that can detect road obstacles. Road obstacle-climbing subsystem 1149 can send road obstacle data 1151 to delivery path subsystem 117, and command utility vehicle 113 (FIG. 2) to crest the road obstacles, and to maintain balance and stability while traversing the road obstacles. Road obstacles can optionally include curbs 612 (FIG. 1) and steps 614 (FIG. 1).

Figure 14:
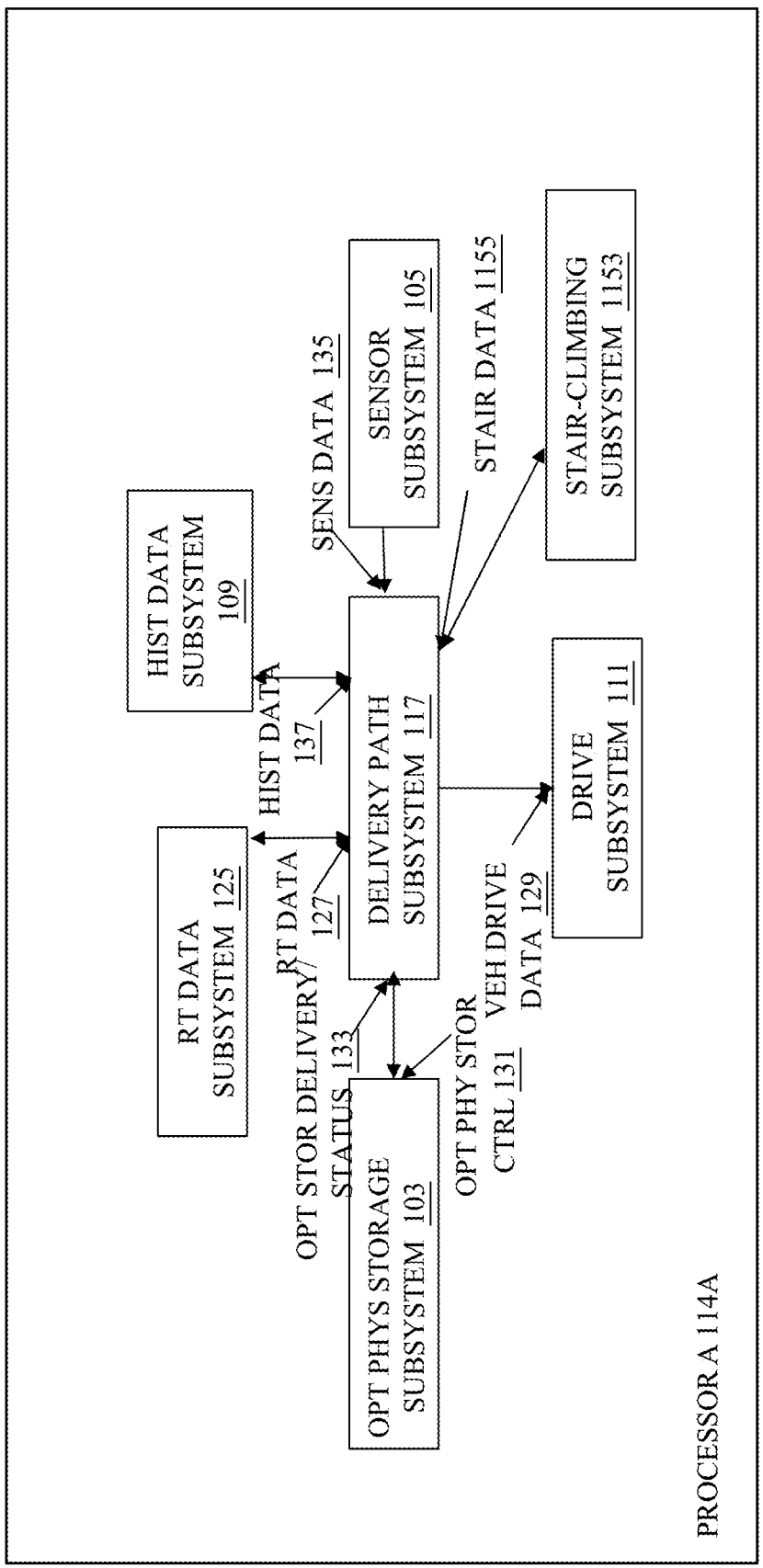
FIG. 14 is a schematic block diagram of a configuration of a vehicle system including a stair-climbing subsystem.

Referring now to FIG. 14, utility vehicle 113 (FIG. 2) can optionally include stair-climbing subsystem 1153 that can detect stairs 614 (FIG. 1), send stair data 1155 to delivery path subsystem 117, and command utility vehicle 113 (FIG. 2) to encounter and traverse stairs 614 (FIG. 1), and command utility vehicle 113 (FIG. 2) to achieve stabilized operation while traversing stairs 614 (FIG. 1).

Figure 15A:
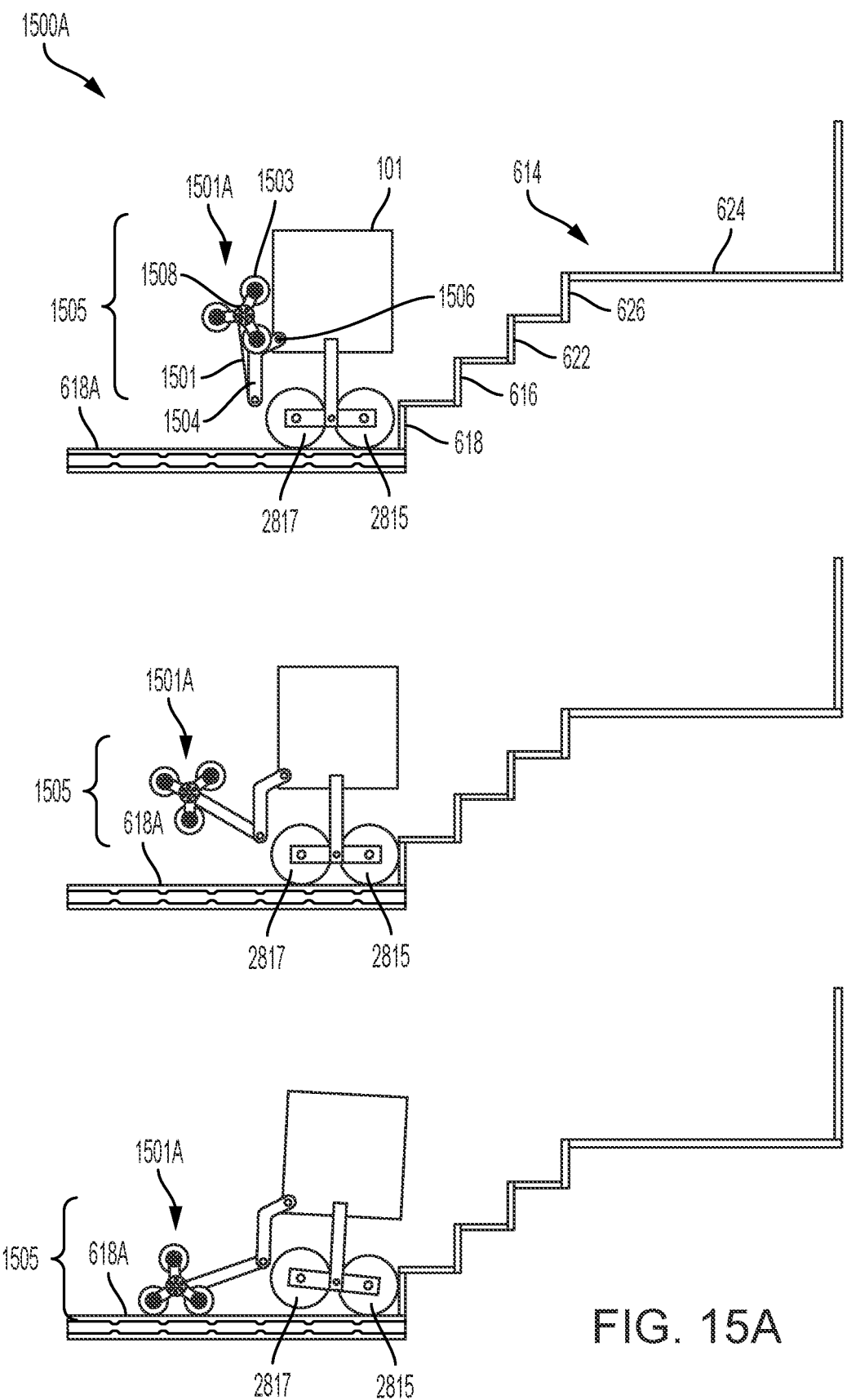
FIGS. 15A-15K are pictorial representations of a stair-climbing autonomous vehicle of the present teachings.
Figure 15B:
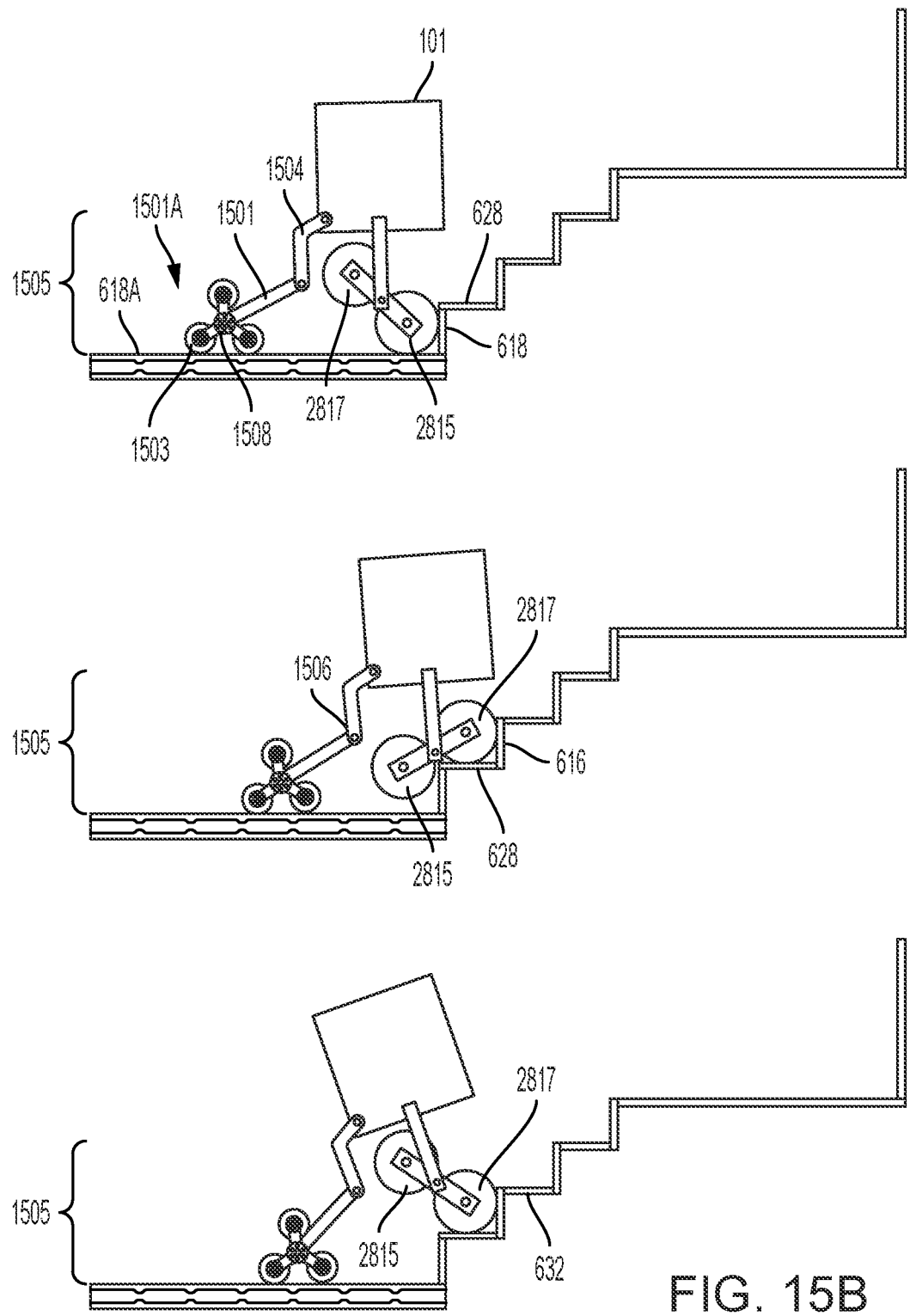
Figure 15C:
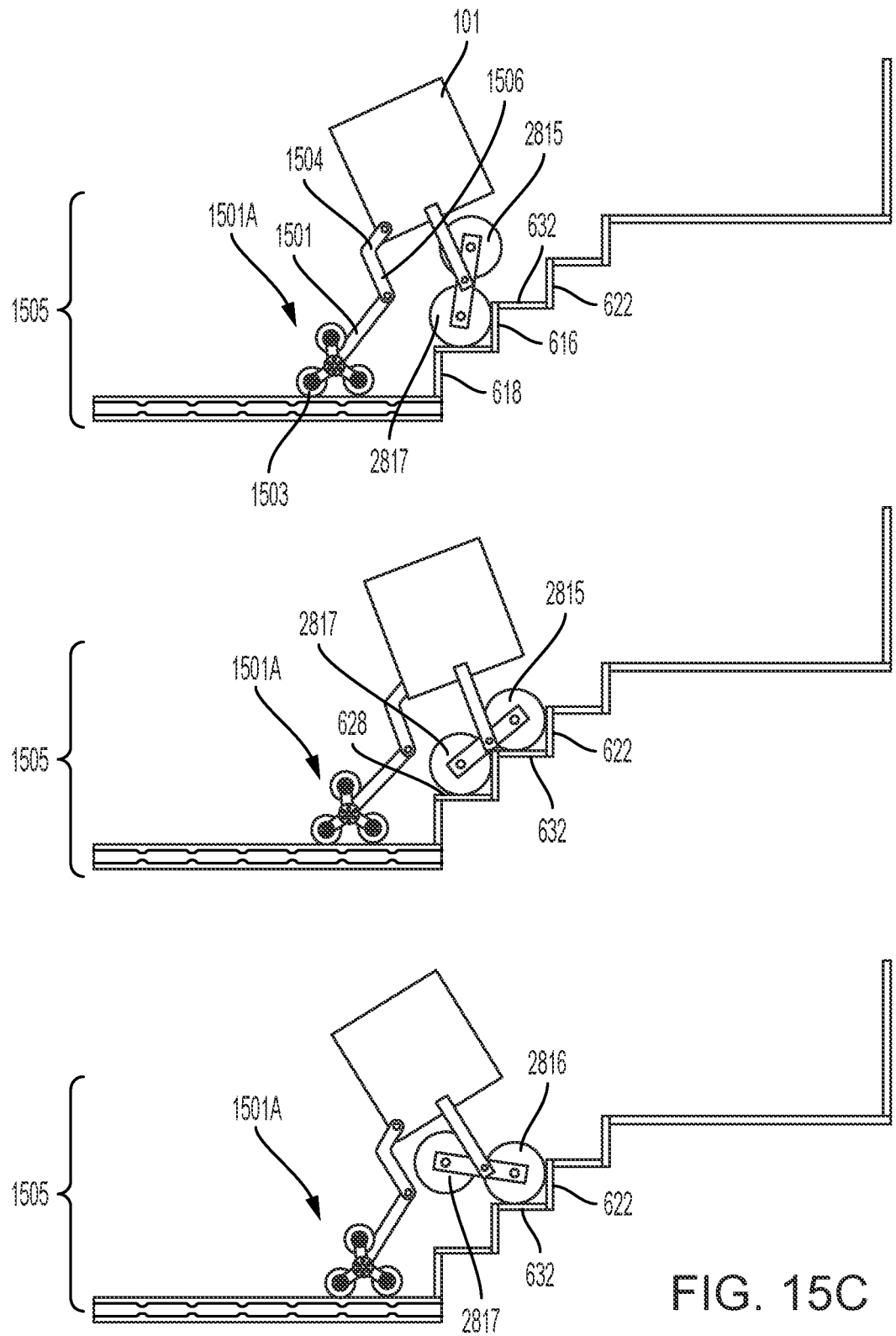
Figure 15D:
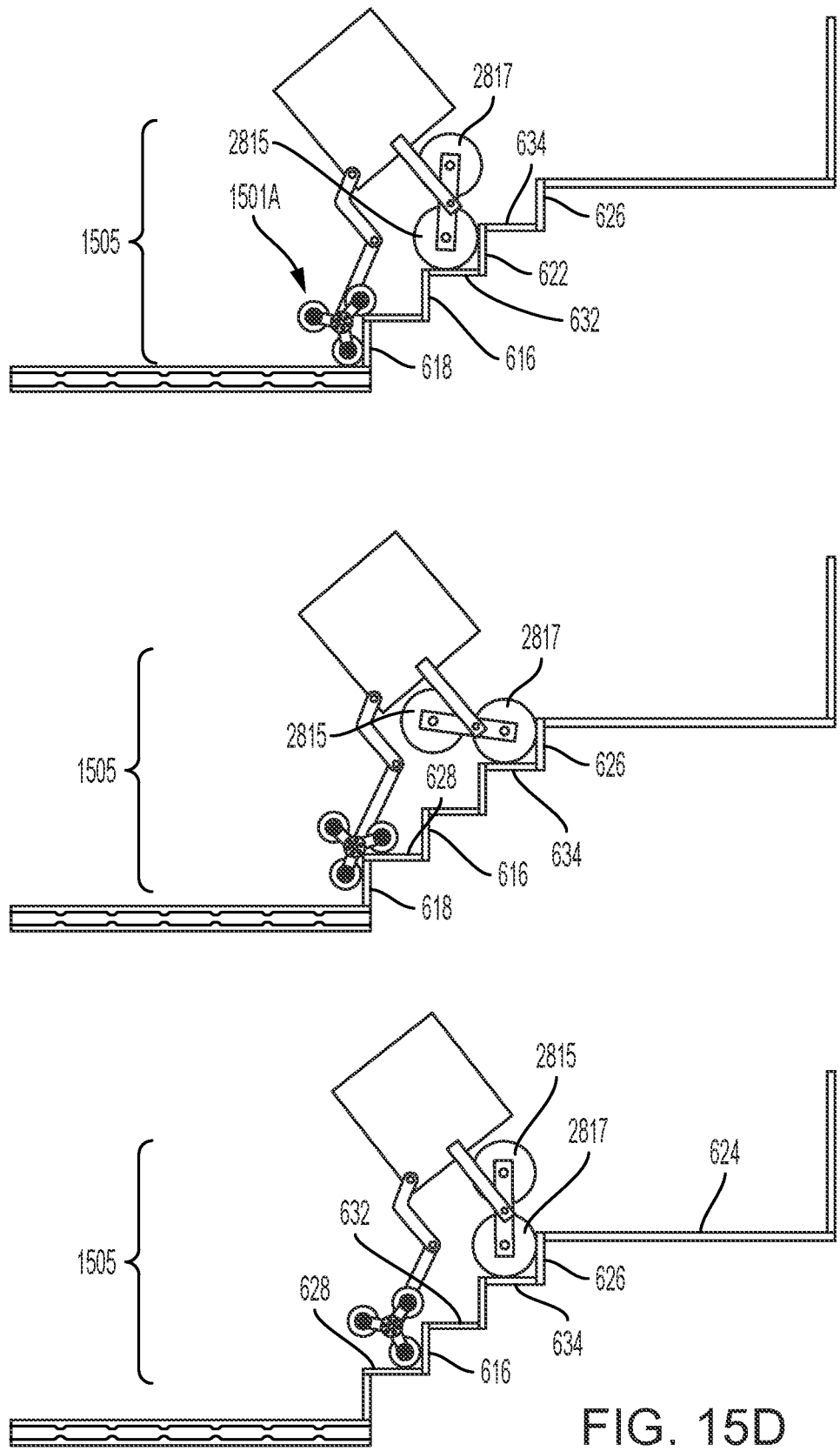
Figure 15E:
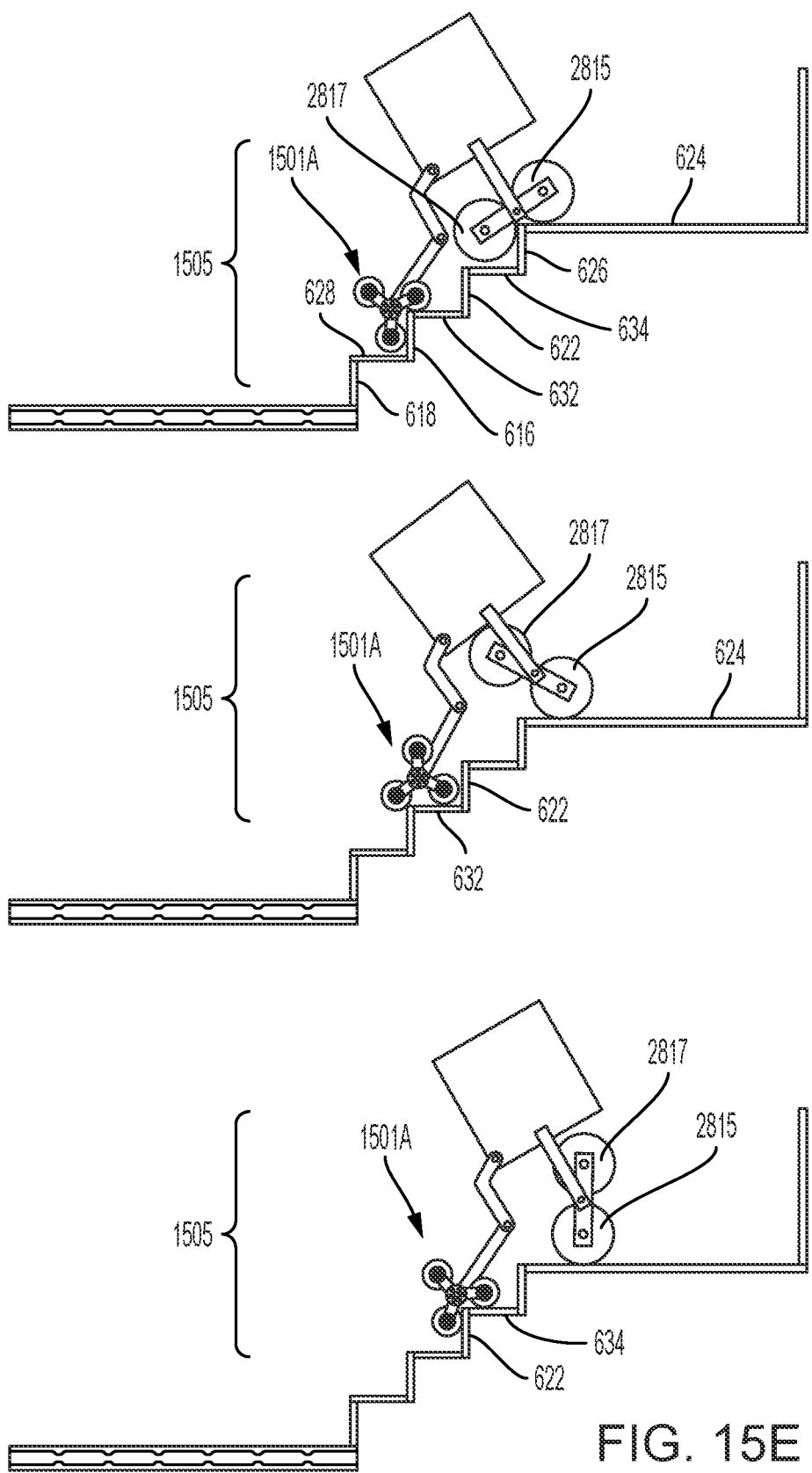
Figure 15F:
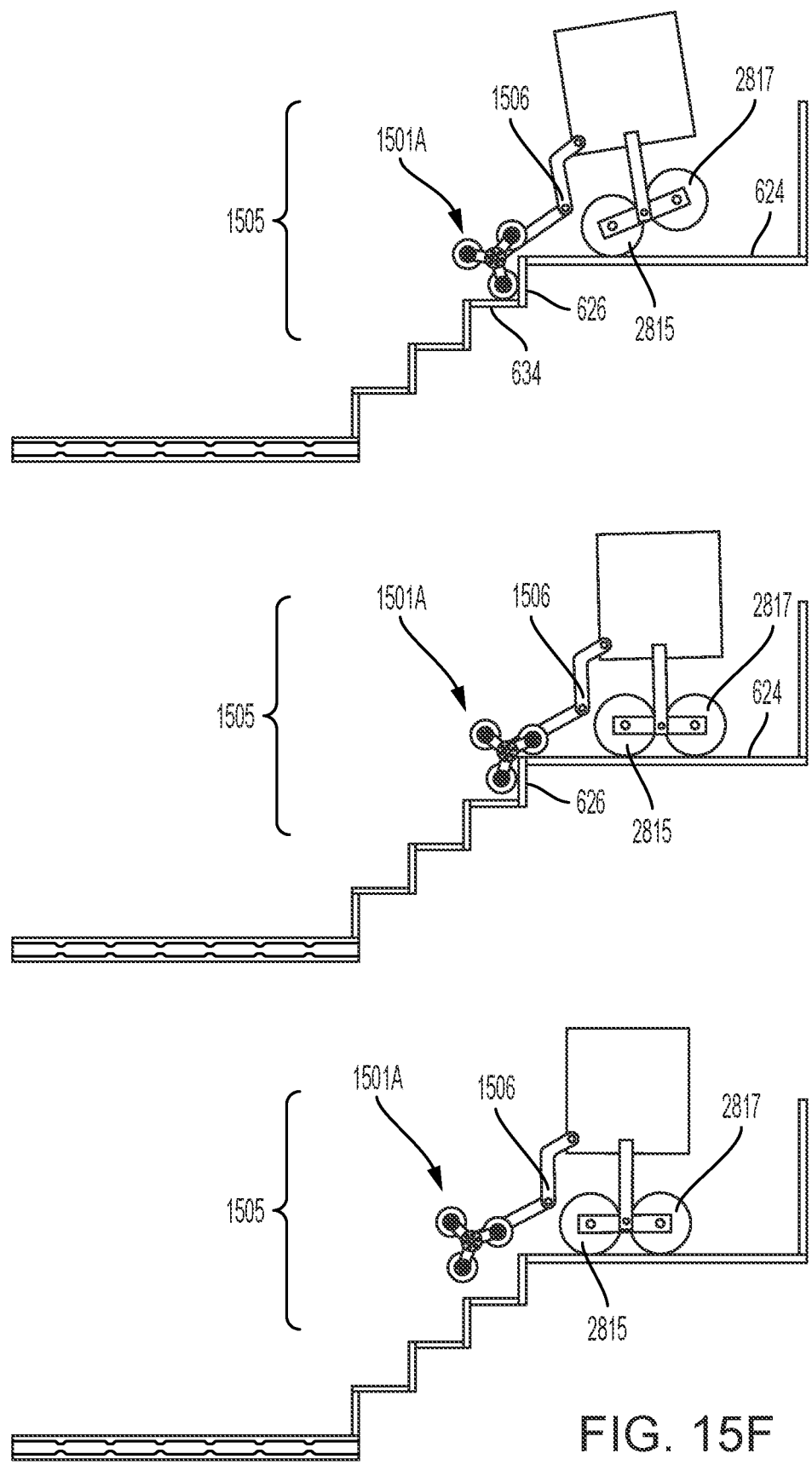
Figure 15G:
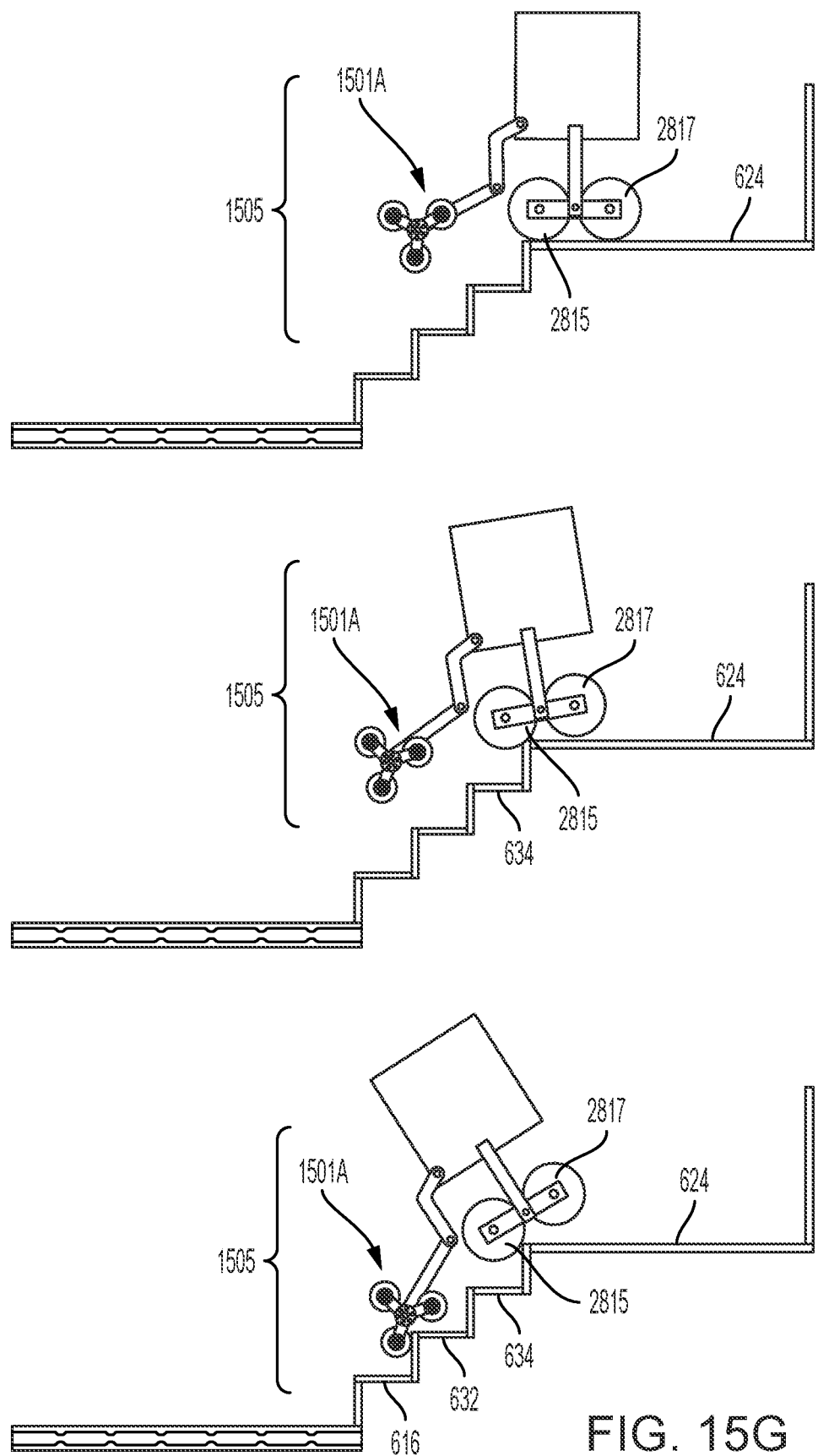
Figure 15H:
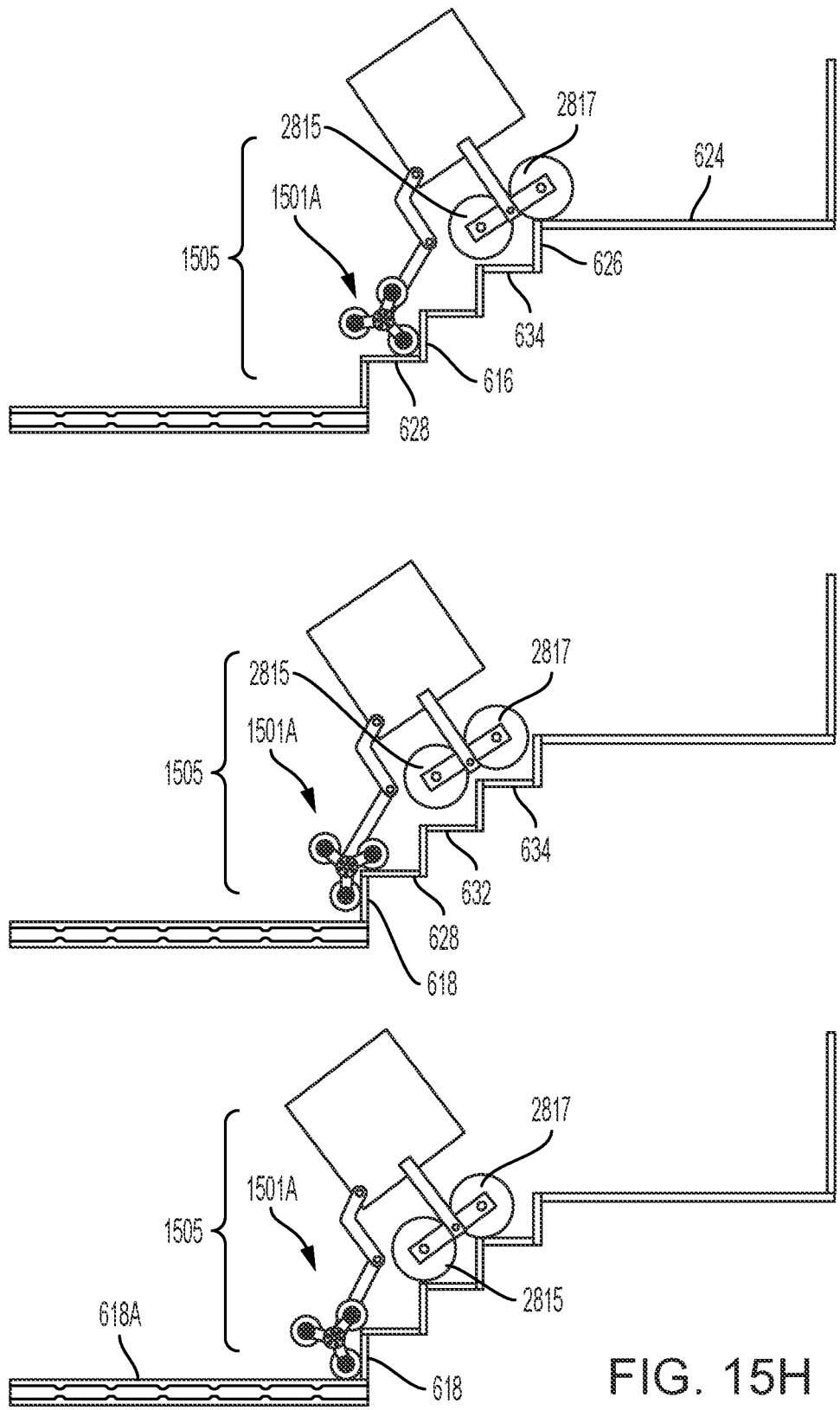
Figure 15I:
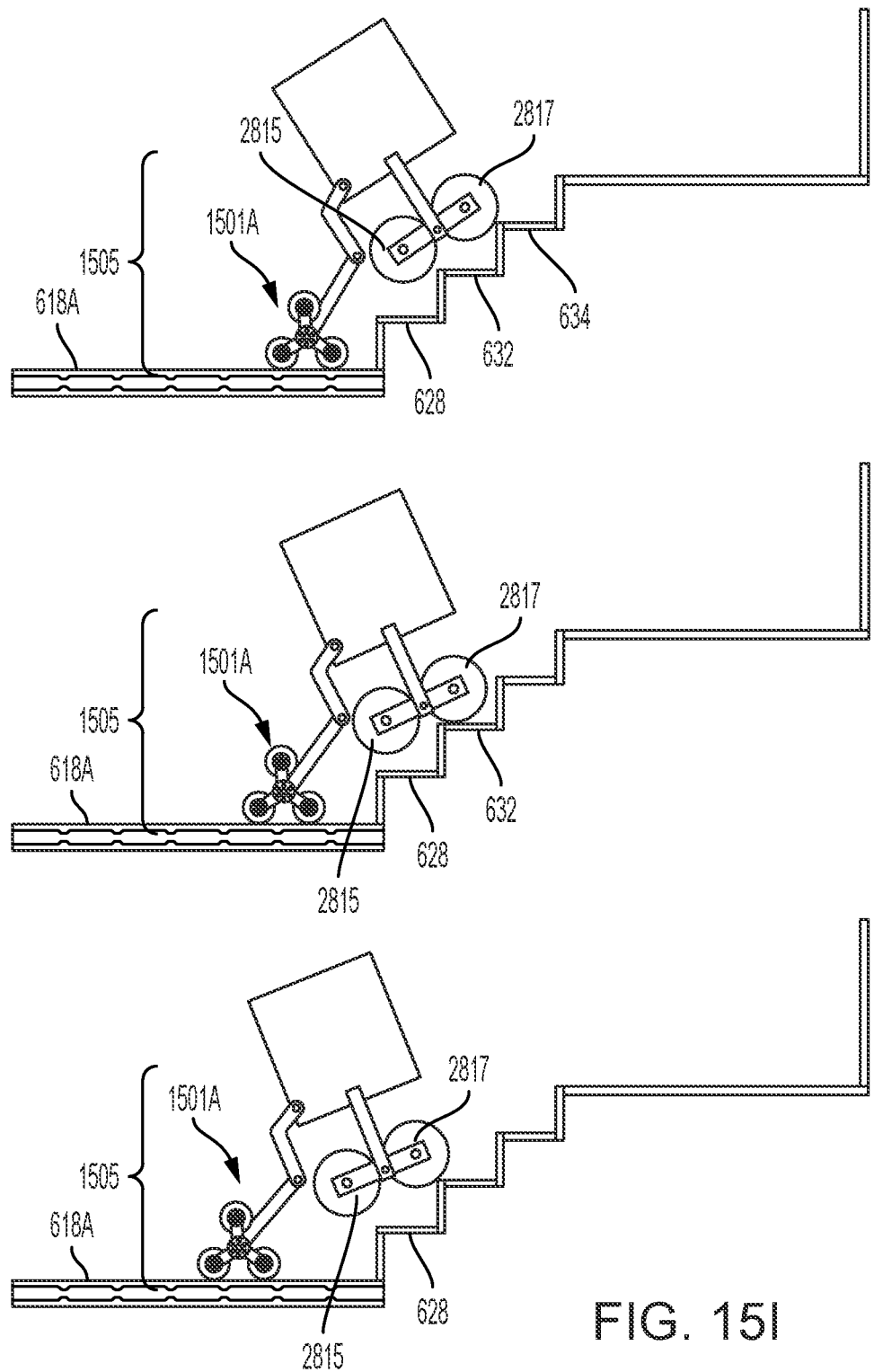
Figure 15J:
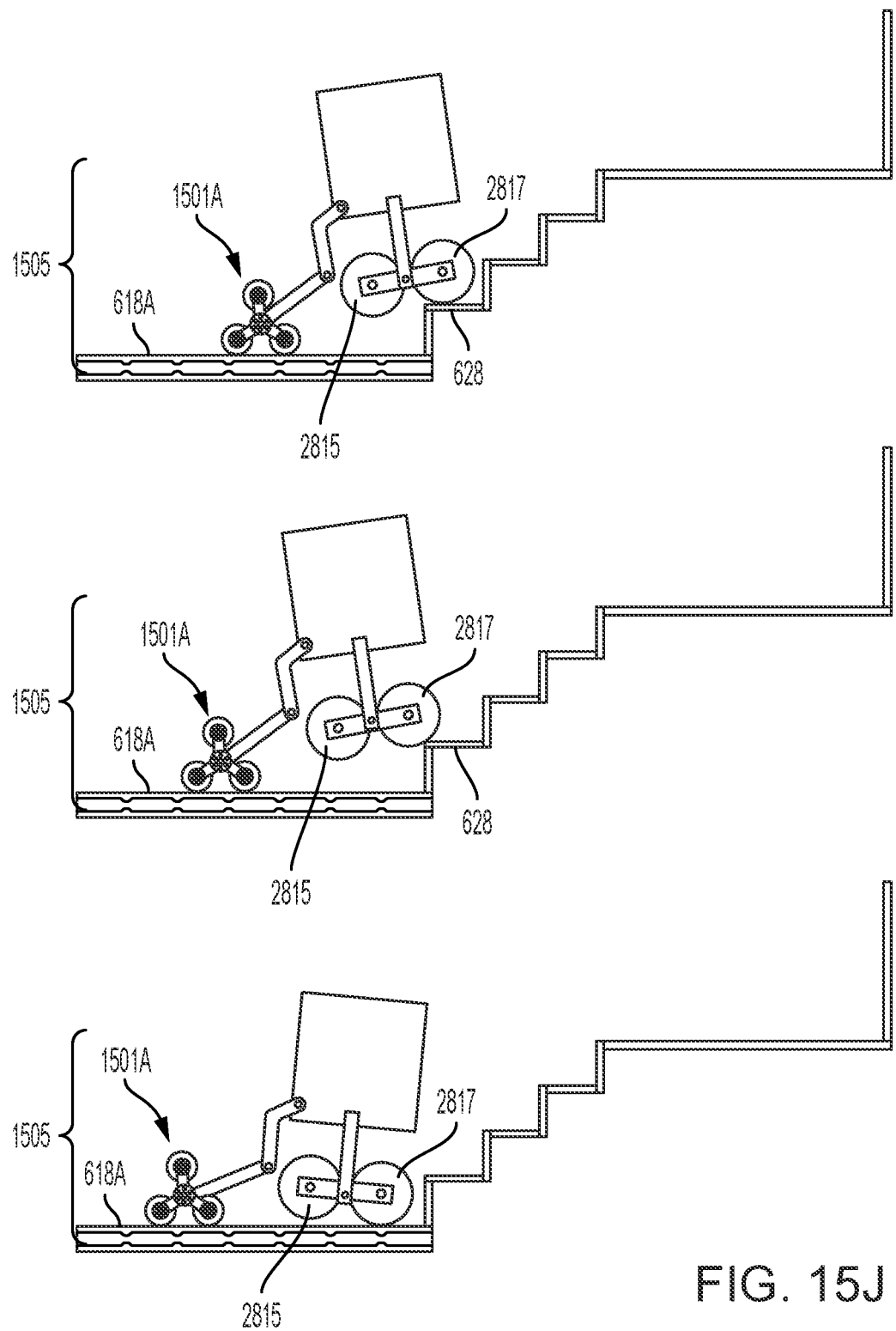
Figure 15K:
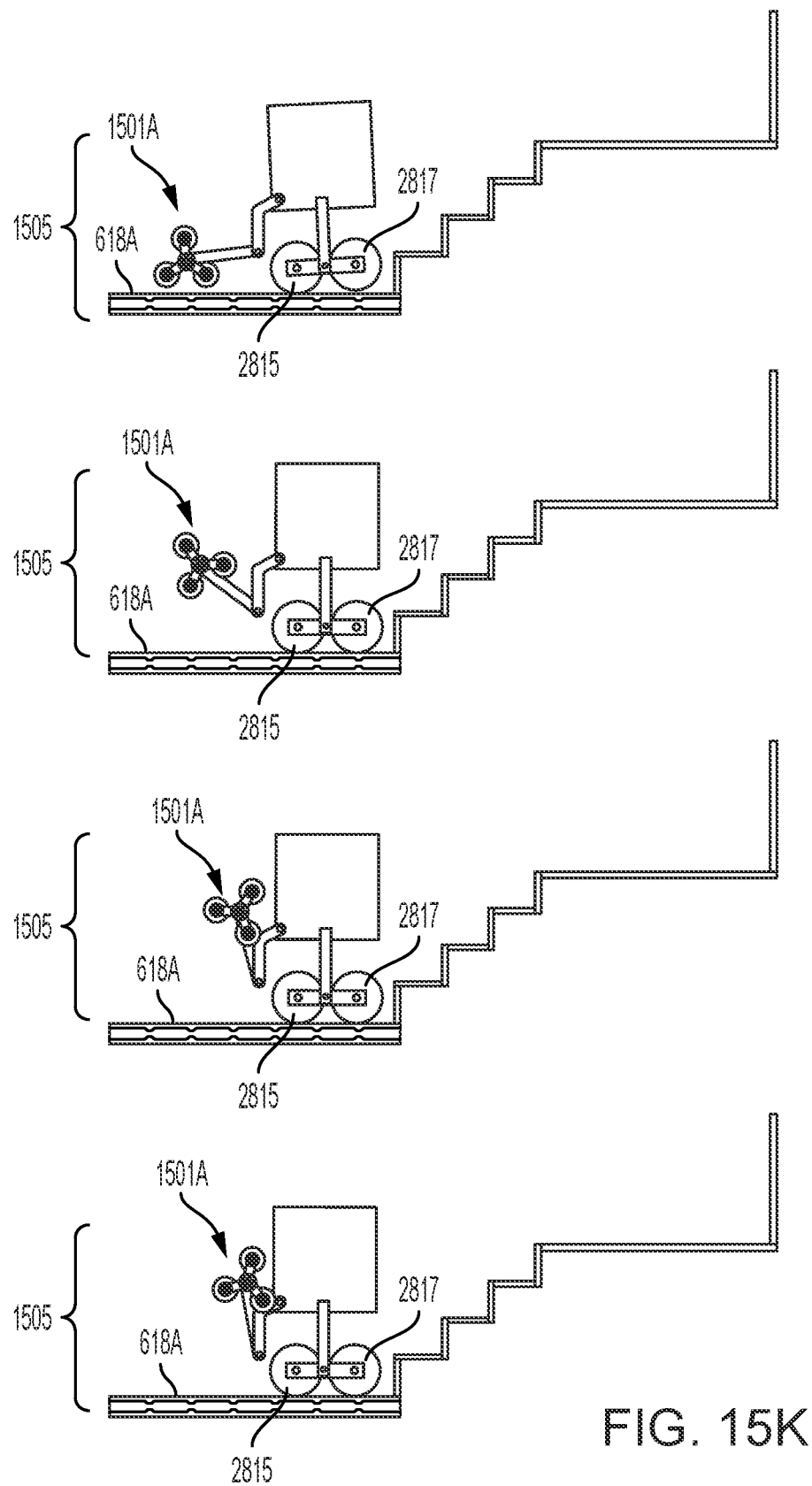

Referring now to FIGS. 15A-15K, balanced and safe autonomous stair-climbing can be accomplished by vehicle wheels clustered together to provide coordinated ascent and descent, in combination with a supporting arm deployed as the vehicle wheels encounter the stairs. Stair-climbing can begin with autonomous movement of autonomous vehicle 1500A from floor 618A towards stairs 614 (FIG. 15A). As autonomous vehicle 1500A approaches stairs 614, supporting arm 1505 is in storage position with arm wheels 1501A adjacent to vehicle storage 101, and segment 1501 folded towards arm 1504. As autonomous vehicle 1500A encounters riser 618 (FIG. 15B), front wheels 2815 sense contact from sensors (not shown), and sensor data can be provided to a powerbase (not shown). The powerbase can initiate the active rotation at pivot point 1506 of arm 1504 by a servo (not shown) based at least one the sensor data. Such active rotation can enable segment 1501 to move towards the ground surface, for example, but not limited to, under the weight of gravity. Stabilizing wheels 1503, which can optionally be powered, operably coupled with segment 1501, can land on the ground, extending supporting arm 1505 and providing support to autonomous vehicle 1500A. Stabilizing wheels 1503 can optionally be replaced by a skid-like feature. The powerbase can issue commands to a cluster motor (not shown) to rotate a cluster, and thus move rear wheels 2817 onto landing 628 (FIG. 15C). As utility vehicle 1500A climbs stairs 614, arm wheel cluster 1501A rotates at axle 1508 as supporting arm 1505 maintains balance and stability of autonomous vehicle 1500A. As rear wheel 2817 encounters riser 616 (FIG. 15C), the cluster can rotate front wheel 2815 to arrive at landing 632 (FIG. 15D), while supporting arm 1505 rolls towards stairs 614 on wheel cluster 1501A to provide balance and support to autonomous vehicle 1500A. As front wheel 2815 encounters riser 622 (FIG. 15D), the cluster can rotate rear wheel 2817 to arrive at landing 624 (FIG. 15E), while supporting arm 1505 rolls onto landing 628 (FIG. 15E) as wheel cluster 1501A reaches riser 616, providing balance and support to autonomous vehicle 1500A. As rear wheel 2817 reaches landing 624 (FIG. 15F), the cluster can rotate front wheel 2815 to arrive at landing 624 (FIG. 15F), while supporting arm 1505 rolls onto landing 634 (FIG. 15F) as wheel cluster 1501A reaches riser 622, providing balance and support to autonomous vehicle 1500A. With no further risers to meet, the cluster can rotate front wheel 2815 to rest on landing 624 (FIG. 15G), as wheel cluster 1501A reaches riser 626 and landing 624 (FIG. 15G), and the servo rotates pivot point 1506 (FIG. 15H) to raise supporting arm 1505 (FIG. 15G) in preparation for either forward motion or descending stairs 614. To descend stair 614, the cluster can rotate front wheel 2815 above rear wheel 2817 as supporting arm 1505 reaches towards stairs 614 to stabilize the downward trip. Wheels 2815/2817 can travel down stairs 614 (FIG. 15I) alternating as described for the upward climb, while arm wheels 1501A roll down stairs 614 from landing to landing. Eventually supporting wheels 1501A (FIG. 15J) make ground contact before the final rotation of the cluster. Rear wheels 2817 (or front wheels 2815, depending on how many risers there are in stairs 614) are rotated to the ground adjacent to riser 618 (FIG. 15J), balanced by supporting arm 1505. One further rotation by the cluster places all of front wheels 2815, rear wheels 2817, and supporting wheels 1501A (FIG. 15K) on the ground. In some configurations, supporting wheels 1501A can be pressure-activated. In some configurations, pivot point 1506 (FIG. 15A) and optionally wheels 1501A (FIG. 15A) can be actuated by motors in power base 531 (FIG. 14). The motors can be connected to pivot point 1506 (FIG. 15A) and optionally wheels 1501A (FIG. 15A) by wires that can run through structures such as tubes that support 1501A (FIG. 15A). In some configurations, one or more of supporting wheels 1501A can be omitted from supporting arm 1505.

Figure 16:
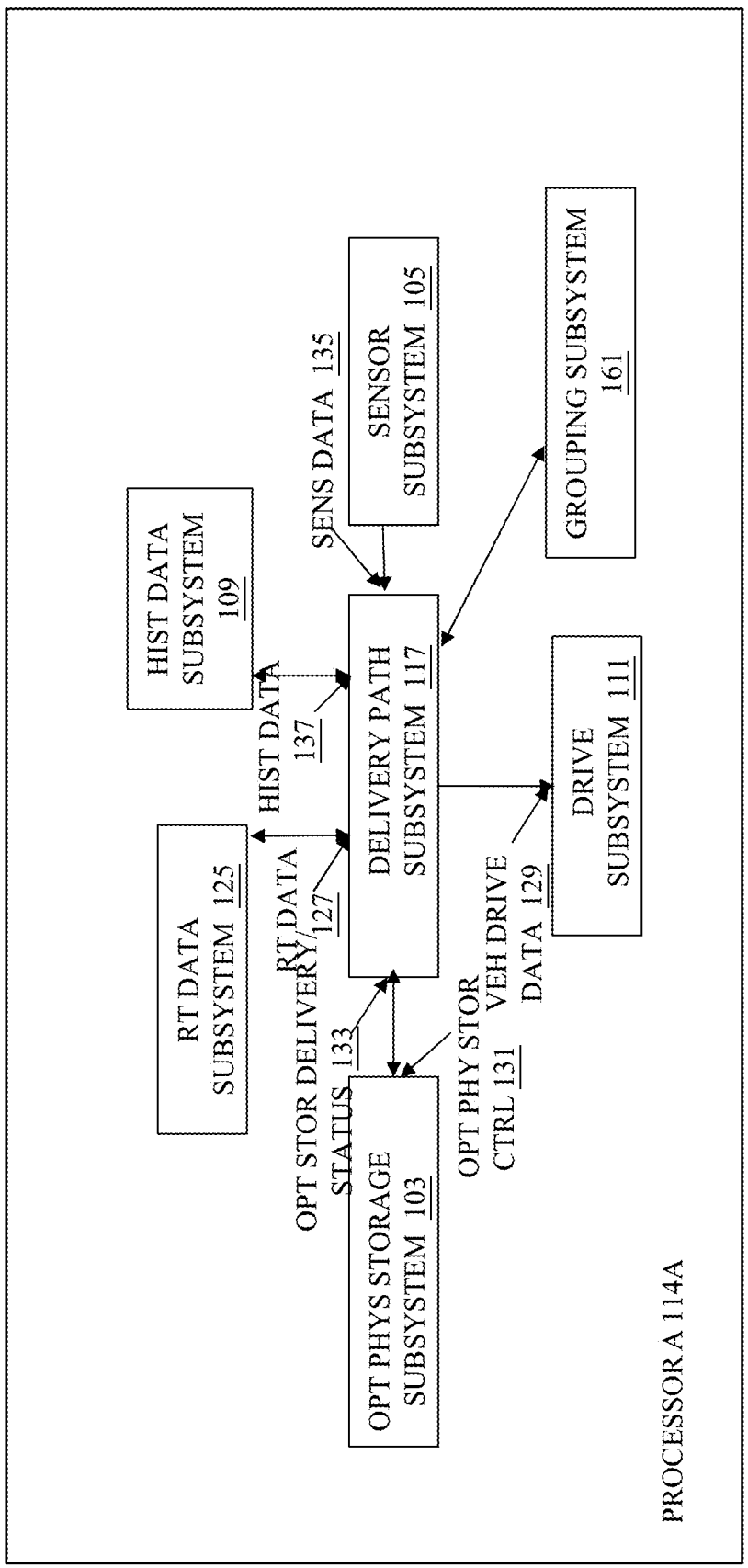
FIG. 16 is a schematic block diagram of a configuration of a vehicle system including a grouping subsystem.

Referring now to FIG. 16, utility vehicle 113 (FIG. 2) can optionally include grouping subsystem 161 that can command one utility vehicle 113 (FIG. 2) to follow another utility vehicle 113 (FIG. 2). Grouping subsystem 161 can maintain a coupling between utility vehicles 113 (FIG. 2). In some configurations, grouping subsystem 161 can enable coupling electronic coupling among utility vehicles 113 (FIG. 2). In some configurations, the coupling can include a physical coupling. In some configurations, grouping subsystem 161 can group several of utility vehicles 113 (FIG. 2) together, and can enable one or more of utility vehicles 113 (FIG. 2) to collect navigational path data and provide the data to the utility network. In some configurations, grouping subsystem 161 can enable groups of utility vehicles (FIG. 2) to travel together until one of more of utility vehicles 113 (FIG. 2) achieves a destination and moves out of the group to perform services.

Figure 17:
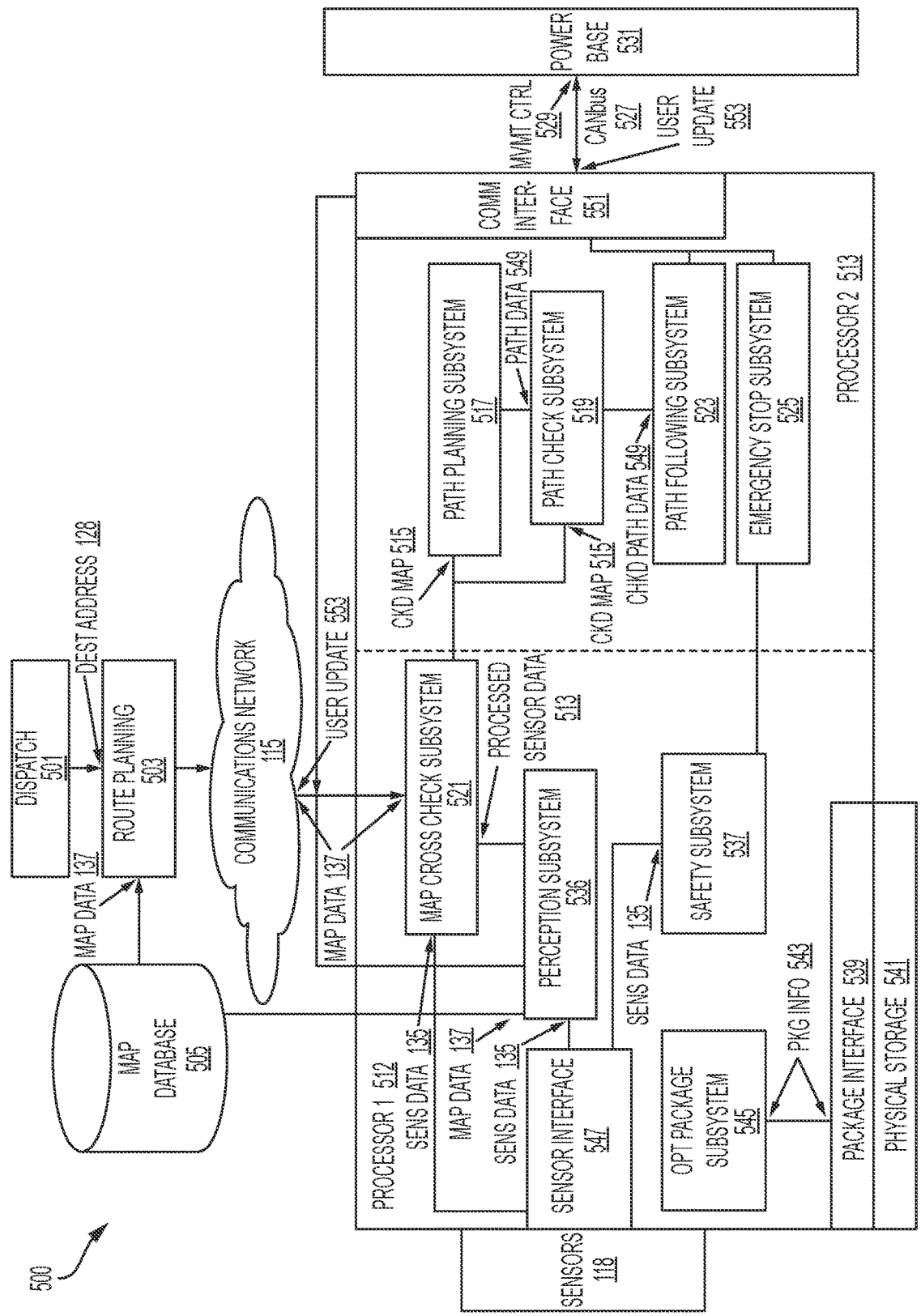
FIG. 17 is a schematic block diagram of a fourth configuration of the system of the present teachings.

Referring now to FIG. 17, system 500 for moving utility vehicle 113 from at least one first location to at least one second location, another configuration of system 100 (FIG. 2), can include, but is not limited to including, at least one processor, including, but not limited to, processor 1 512 and processor 2 513. Processor 1 512 is also referred to herein as receiving processor 512. Processor 2 513 is also referred to herein as executing processor 513. Receiving processor 512 can receive at least one request from the at least one first location to perform services at the at least one second location. Receiving processor 512 can choose at least one optimum utility vehicle from utility vehicles 113 (FIG. 4), and the choice can be based at least on the status of at least one utility vehicle 113 (FIG. 4). Receiving processor 512 can direct executing processor 513 associated with the at least one optimum utility vehicle to command the optimum utility vehicle to the at least one first location to receive the goods. Executing processor 513 can associate at least one security means with the goods as the goods are stored in the at least one optimum utility vehicle. The at least one security means can require security information before the services are executed. Executing processor 513 can determine a proposed path between the at least one first location and the at least one second location based at least on historic information 137 received from the network of system collectors 119 (FIG. 4) and map database 505. Executing processor 513 can enable the at least one optimum utility vehicle to proceed along the proposed path, and can proceed until the at least one optimum utility vehicle reaches the at least one second location. Executing processor 513 can verify the security information and release the goods at the location of utility vehicle 113 (FIG. 2). Executing processor 513 can optionally (a) update the proposed path based at least on information received in real time from the network of system collectors 119 (FIG. 2), (b) enable the at least one optimum utility vehicle to proceed along the updated proposed path, and can (c) repeat (a) and (b) until the at least one optimum utility vehicle reaches the at least one second location. Truck 2001 (FIG. 4) can optionally transport utility vehicle 113 (FIG. 4) to the at least one first location, then on to the vicinity of the at least one second location. System 500 can include dispatch mechanism 501 that can coordinate activities among members of the network. In some configurations, dispatch mechanism 501 can couple trucks 2001 (FIG. 4) with utility vehicles 113 (FIG. 4). In some configurations, dispatch mechanism 501 can track battery life in utility vehicles 113 (FIG. 4). In some configurations, dispatch mechanism 501 can enable utility vehicle 113 (FIG. 4) to respond to a summons. Dispatch mechanism 501 can enable utility vehicle 113 (FIG. 4) to respond to a summons by receiving the summons from system collectors 119 (FIG. 2) and transmitting the summons to utility vehicle 113 (FIG. 4). Processor 2 513 can communicate movement control commands 551 that can include path data 549 to power base 531 through CANbus 527. Powerbase 2 531 can communicate user update information 553 through communications interface 551 to processor 2 513. In some configurations, packages can be delivered from one location to another using utility vehicle 113 (FIG. 4). Optional package subsystem 545 can interface with physical storage 541 through package interface 539 to receive and discharge the contents of optional physical storage 541. Optional physical storage 541 can provide and receive package information 543 concerning the status of the contents of optional physical storage 541.

Figure 18A:
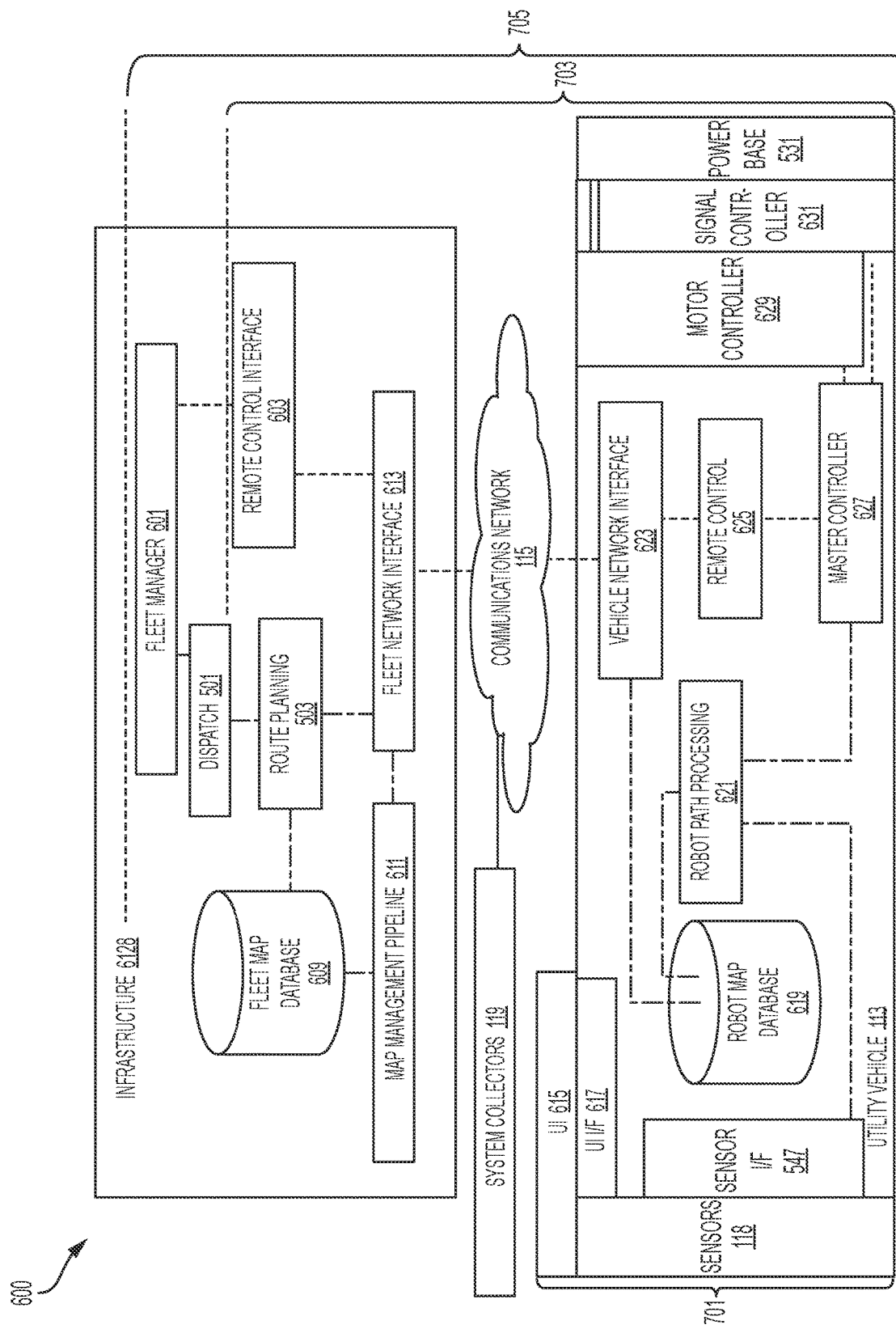
FIG. 18A is a schematic block diagram of the infrastructure of the system of the present teachings.

Referring now to FIG. 18A, system 600 for moving utility vehicle 113 from at least one first location to at least one second location, another configuration of system 100 (FIG. 2), can include, but is not limited to including, at least one layer. In some configurations, the at least one layer can include autonomous layer 701, supervisory autonomous layer 703, and human autonomous layer 705. Autonomous layer 701 can enable autonomous control of utility vehicle 113, whether or not utility vehicle 113 is manned or unmanned. In some configurations, utility vehicle 113 can send, for example, video signals to fleet manager 601, and fleet manager 601 and respond with commands to utility vehicle that can travel on a message bus to power base 531. In some configurations, the commands can be made to mimic joystick commands. Utility vehicle 113 can measure the latency of the connection between utility vehicle 113 and fleet manager 601, and can adjust the speed of utility vehicle 113 accordingly. If the latency is greater than a pre-selected threshold, utility vehicle 113 can be placed in a semi-autonomous mode. Supervisory autonomous layer 703 can enable remote control of utility vehicle 113. Remote control of utility vehicle 113 can occur as a result of, for example, but not limited to, an unexpected event, pre-selected sensor and processor configurations, and delivery optimization concerns. Human autonomous layer 705 can enable remote event management requiring some form of human intervention. Connections between elements of system 600 indicate functionality groups such as, for example, but not limited to:

| Function group | Line format |
| --- | --- |
| Remote control | ------ |
| Mapping/routing | –..–..–..– |
| Autonomous driving | –.–.–.–.–. |
| Outputs from autonomous driving | ---------------- |

Continuing to refer to FIG. 18A, in some configurations, autonomous layer 701 can include, but is not limited to including, utility vehicle 113, sensors 118, powerbase 531, and user interface and storage 615. Utility vehicle 113 can create a path based on sensor data and the proposed path, and provide commands to various parts of utility vehicle 113 that enable autonomous behavior of utility vehicle 113. Utility vehicle 113 can follow the created path to a destination, securely execute the services, and securely accept payment for the services. Utility vehicle 113 can respond to sensor data by insuring the safety of pedestrians and other obstacles in and near the created path. For example, if sensors 118 detect an obstacle, utility vehicle 113 can automatically stop and/or change course. Utility vehicle 113 can communicate with sensors 118, user interface/storage 615, motors, signals, and powerbase 531, all of which can be integral parts of utility vehicle 113. Utility vehicle 113 can communicate with remote members of the fleet network through vehicle network interface 623 and communications network 115. Utility vehicle 113 can include robot path processing 621 that can receive a proposed route from infrastructure 6128 through the communications route, and can create a travel path based on the proposed route and data received from sensors 118 through sensor interface 547. Sensors 118 can include, but are not limited to including, close range robust sensors that can enable emergency stop detection by emergency stop subsystem 525 that can direct motor controller 629 to stop utility vehicle 113 through safety subsystem 537 (FIG. 17), and long range sensors. Close range sensors can include features such as, for example, but not limited to, (a) detecting obstacles while traveling at up to a certain pre-selected speed, (b) identifying an obstacles envelope location to within a pre-selected distance, (c) detecting small obstacles on and holes in driving surfaces at least a pre-selected distance away, a pre-selected width, and a pre-selected width, (d) detecting large obstacles on and holes in driving surfaces at least a pre-selected distance away, a pre-selected depth, a pre-selected distance perpendicular to the direction of travel, and a pre-selected length, (e) detecting obstacles at least a pre-selected distance away where the obstacles are a pre-selected height/depth, width (as measured perpendicular to the direction of travel of utility vehicle 113), and length (as measured parallel to the direction of travel of utility vehicle 113), and (f) detecting obstacles no less than a pre-selected distance away under environmental conditions such as, for example, but not limited to, indoors, outdoors, direct sunlight, at night without external illumination, in rain, in snow, and during times of reduced visibility due to fog, smog, and dust. Long range sensors can include characteristics such as, for example, but not limited to, (a) detecting obstacles when utility vehicle 113 is traveling at up to a pre-selected speed, (b) locating obstacles that are moving at up to a pre-selected speed for within a pre-selected distance, (c) estimating the velocity of obstacles moving at up to a pre-selected speed to within a pre-selected tolerance, (d) estimating the direction of obstacles that are moving up to a pre-selected speed to within a pre-selected tolerance and faster than a pre-selected speed to within a pre-selected tolerance, (e) identifying obstacles that move faster than a pre-selected speed, (f) detecting obstacles under pre-selected environmental conditions such as, for example, indoors, outdoors, direct sunlight, and at night without external illumination, and (g) estimating a sensing range in compromised environmental conditions with a pre-selected accuracy, where the environmental conditions can include, but are not limited to including rain up to a pre-selected rate, snow up to a pre-selected rate, reduced visibility due to pre-selected conditions to no less than a pre-selected distance. Long range sensors can detect large obstacles such as, for example, but not limited to, cars, motorcycles, bicycles, fast-moving animals, and pedestrians. Robot path processing 621 can access robot map database 619, that can include local storage for fleet map database 609, and use those data to create a new proposed route, if robot path processing 621 determines that the proposed route is suboptimal. Robot path processing 621 can control, through master controller 627, the direction, based on the created travel path, and speed of utility vehicle 113 through motor controller 629, and can control signaling, through signal controller 631, that can indicate to nearby pedestrians the travel path and speed of utility vehicle 113. Remote control 625 can augment sensor data with data received from infrastructure 6128. Utility vehicle 113 can receive requests to execute services from UI 615 through UI interface 617.

Figure 18B:
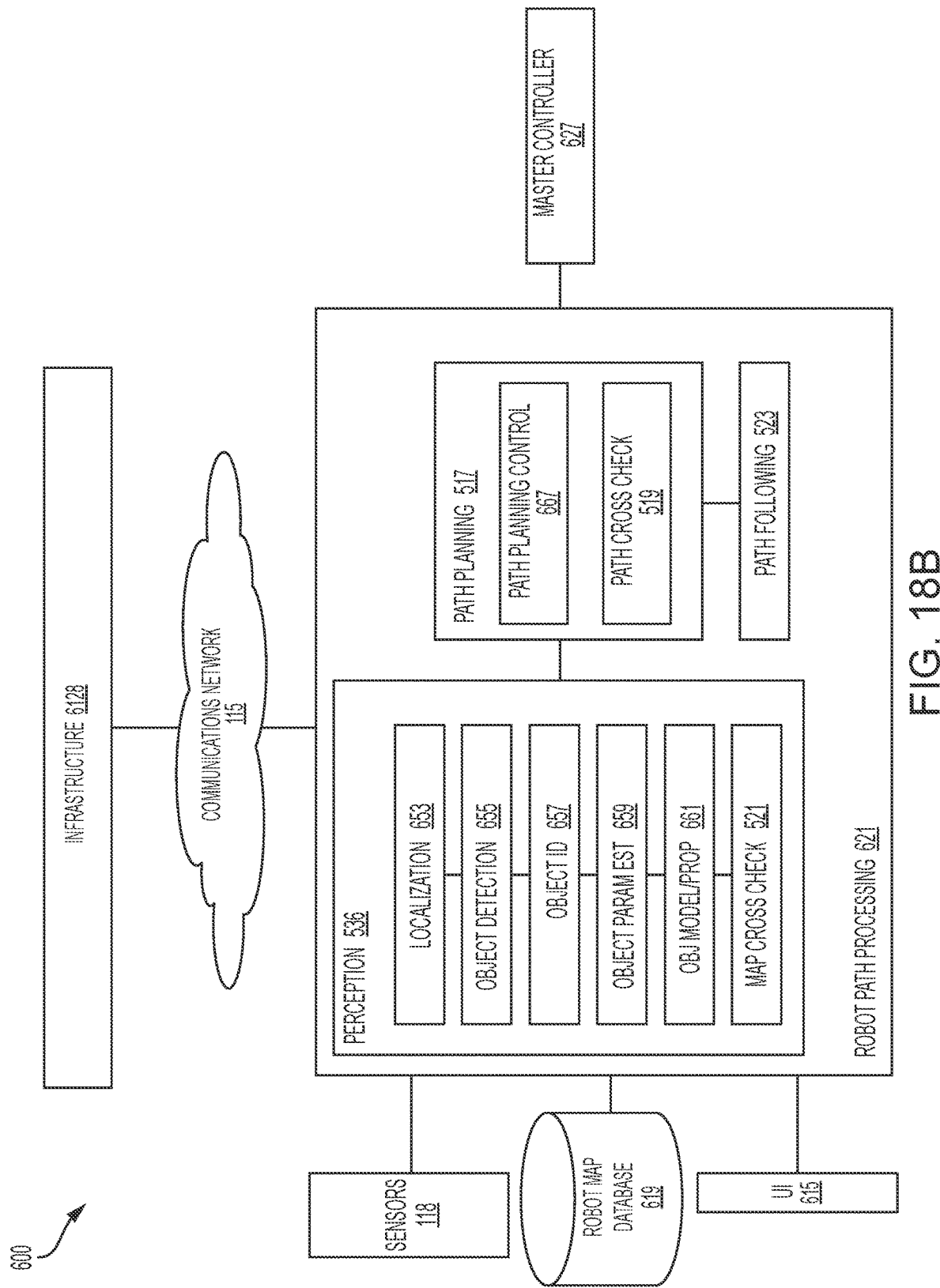
FIG. 18B is a schematic block diagram of robot path processing of the system of the present teachings.

Referring now to FIG. 18B, robot path processing 621 can use sensor information and map data to dynamically plan a path for utility vehicle 113 (FIG. 18A). The goal of robot path processing 621 is to create a substantially obstacle-free path for utility vehicle 113 (FIG. 18A). Map data can include drivable surfaces that can meet certain criteria such as, for example, but not limited to, the surface is within a pre-selected number of degrees of horizontal, at least a pre selected width and length, reachable by driving over curbs no higher than a pre-selected height, and reachable by traversing stairs. Driving surfaces can be classified by type. Types can include, but are not limited to including, road lanes on carriage ways, concrete/asphalt side walks, dirt/grass side walks, bike lanes, road crossings, stair landings, corridors, and interior rooms. Map data can include the location, orientation, and height of the curbs. Map data can include the location, orientation, and intent of traffic signs and signals along the drivable surfaces. Map data can include the relationships between the traffic signs and signals and the drivable surfaces. Map data can include any required activation mechanism for the traffic signals. Map data can include the location, orientation, and activation mechanism for gates, doors, and other pedestrian traffic barriers, as well as the location, orientation, and number of stairs in stair cases. Map data can include the location, orientation, and activation mechanisms for elevators. Map data can include localization features for the drivable surfaces, and can include LIDAR and image data to facilitate localization of utility vehicle 113 (FIG. 18A). Map data can include an association between street addresses and the entrances to premises. Map data can include elevation expressed, but is not limited to being expressed, as floors above ground and height, for example, in meters.

Continuing to refer to FIG. 18B, robot path processing 621 can begin with a proposed route that can be locally-determined or provided by, for example, but not limited to, route planning 503 (FIG. 18A), between the starting location and the destination. Robot path processing 621 can include, but is not limited to including, perception subsystem 536, path planning subsystem 517, and path following subsystem 523. Perception subsystem 536 can include, but is not limited to including, processes such as localization process 653 that can determine the location and orientation of utility vehicle 113 (FIG. 18A). Perception subsystem 536 can include object detection process 655 that can detect objects and obstacles based at least on sensor data, and object identification process 657 that can identify the detected objects and obstacles based at least on systems trained to identify objects. Perception subsystem 536 can include object parameter estimator process 659 that can estimate a measurement of parameters that can be associated with the identified objects, for example, but not limited to size, shape, speed, and acceleration based at least on systems trained to associate the measurements with the identified objects. Perception subsystem 536 can include object modeling process 661 that can, based at least on object identification and object parameter estimation, create a model, based at least on training system data, of how the object or obstacle will behave, and propagate the behavior of the object or obstacle into the future to determine possible interaction, if any, between the object or obstacle and utility vehicle 113 (FIG. 18A). Perception subsystem 536 can include dynamic map cross check 521 that can perform an estimate of the free space available for utility vehicle 113 (FIG. 18A) to navigate, and will use that estimate to cross-check the route map that is created by route planning 503 (FIG. 18A). The estimate is based at least on, for example, but not limited to, the data derived from image segmentation or point cloud segmentation. Free space is the obstacle-free drivable space around utility vehicle 113 (FIG. 18A). Map cross check 521 can access data along the proposed route from robot map database 619 and check the planned travel path against map updates and further sensor data. Robot map database 619 can receive updates from fleet map database 609 through the communications route. Fleet map database 609 can be updated under conditions such as, for example, but not limited it, if an obstacle has been detected for a pre-selected period of time. The combination of perception subsystem 536 and map cross check process 521 can produce a travel path, checked map 515, for utility vehicle 113 (FIG. 18A) that can be provided to path planning subsystem 517. Path planning subsystem 517 can include, but is not limited to including, path planning control process 667 and path cross check process 519. Path planning control process 667 can translate the travel path into commands that can be understood by master controller 627. The commands can direct utility vehicle 113 (FIG. 18A) to the starting location, and then to the destination where the services are executed. Path cross check process 519 can update the travel path based on sensor data, if necessary. Path planning subsystem 517 can provide the updated (if necessary) travel path to path following process 523. Path following process 523 can provide the commands to master controller 627. Master controller 627 can use the commands to control utility vehicle 113 (FIG. 18A) and signaling that can alert pedestrians of the movement of utility vehicle 113 (FIG. 18A). Close range robust sensors 116 can enable master controller 627 to stop utility vehicle 113 (FIG. 18A).

Figure 19:
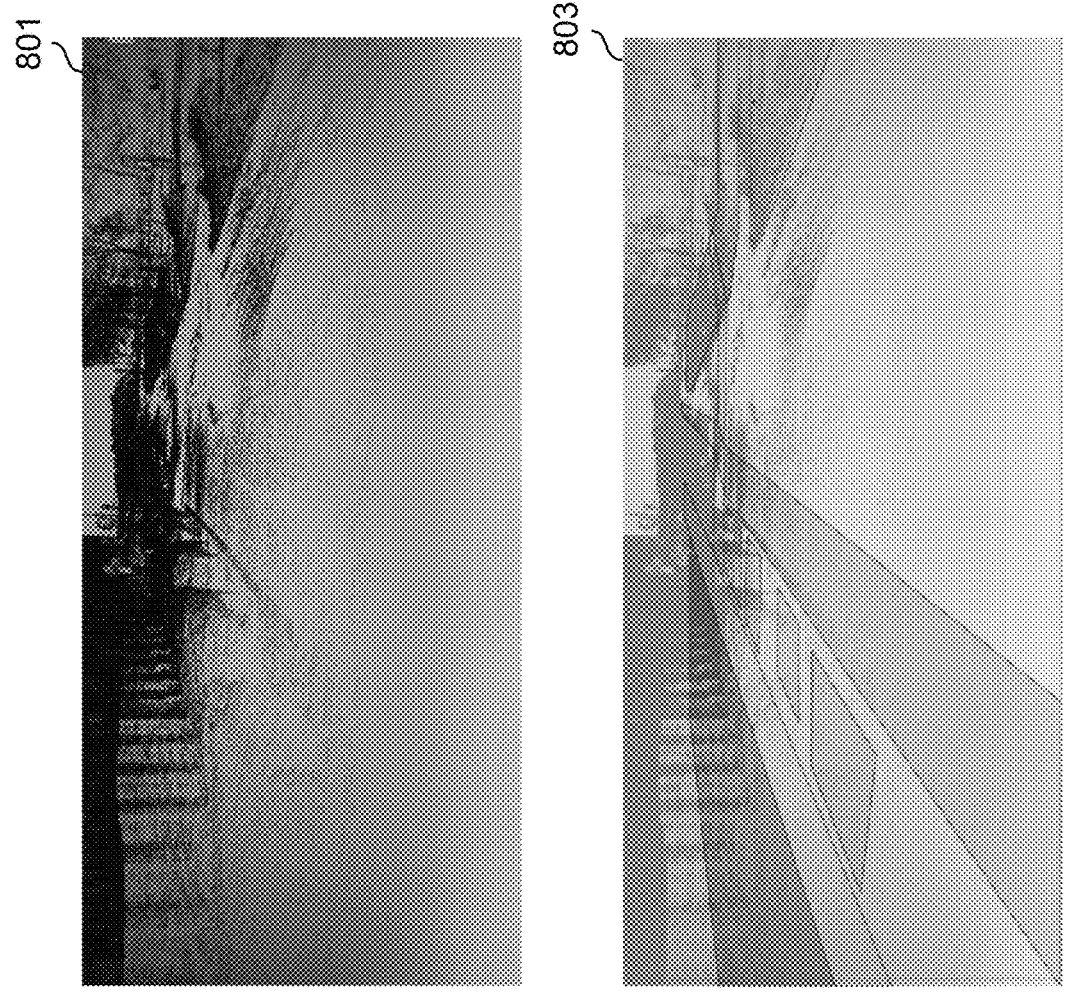
FIG. 19 is a pictorial representation of perception processing of the present teachings.

Referring now to FIG. 19, perception subsystem 536 (FIG. 18B) can include localization process 653 that can locate utility vehicle 113 (FIG. 1) on map 751 (FIG. 30) and determine the orientation of utility vehicle 113 (FIG. 1). Sensors 118 (FIG. 18B) can include cameras that can provide visual odometry 801 at high frequency and low fidelity. The cameras can estimate the motion of objects 757 (FIG. 29), and can recognize previously seen corners. The cameras can update, at high frequency, data about utility vehicle 113 (FIG. 1) according to the corners. Sensors 118 (FIG. 18B) can include LIDAR devices that can provide LIDAR odometry 803 at low frequency. The LIDAR data can refine the motion estimate and remove distortion from point clouds. The LIDAR data can be used to recognize previously-seen surfaces and lines, to triangulate from them, and to update data about utility vehicle 113 (FIG. 1) according to the surfaces and lines.

Figure 20:
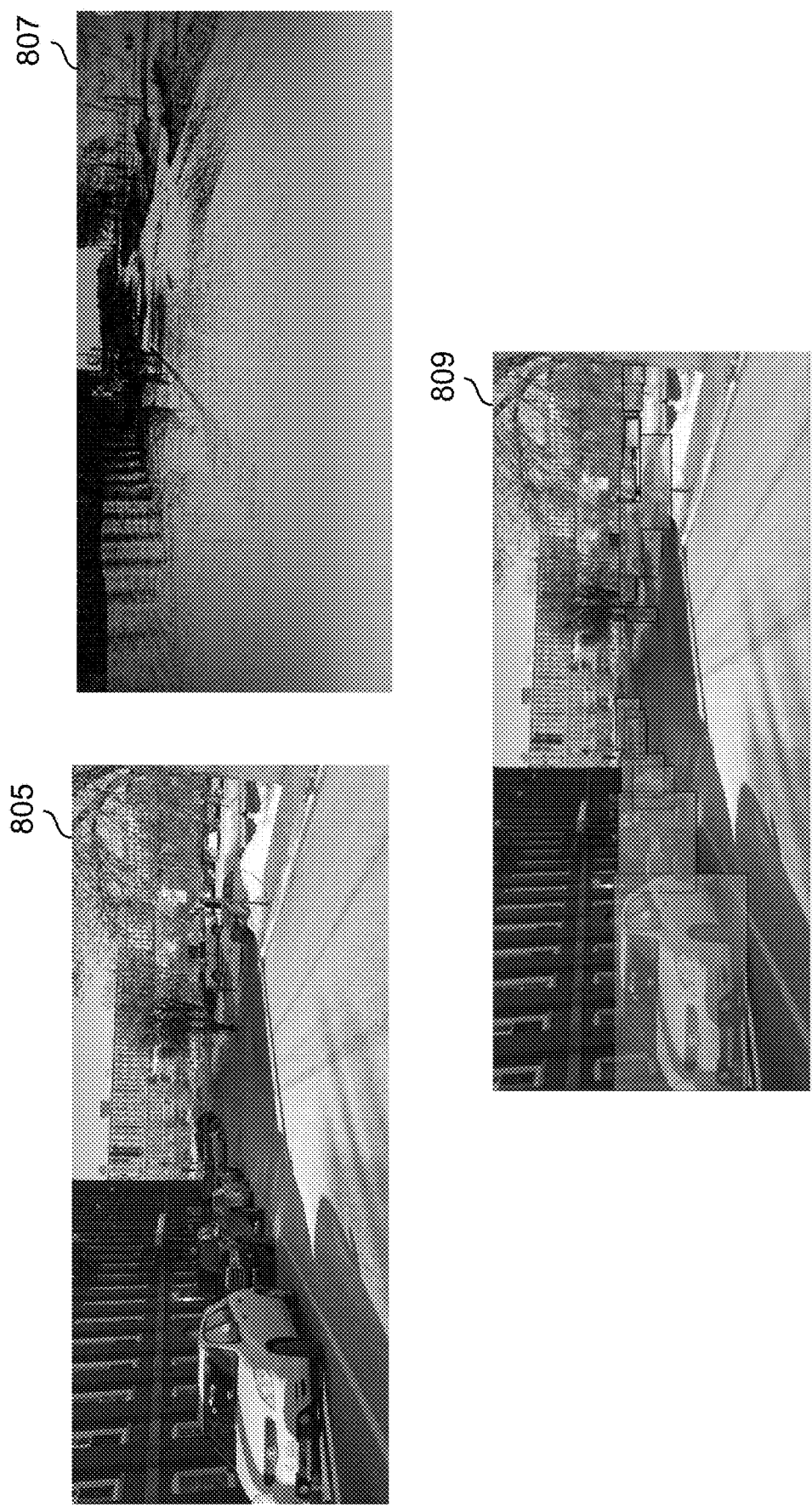
Figure 21:
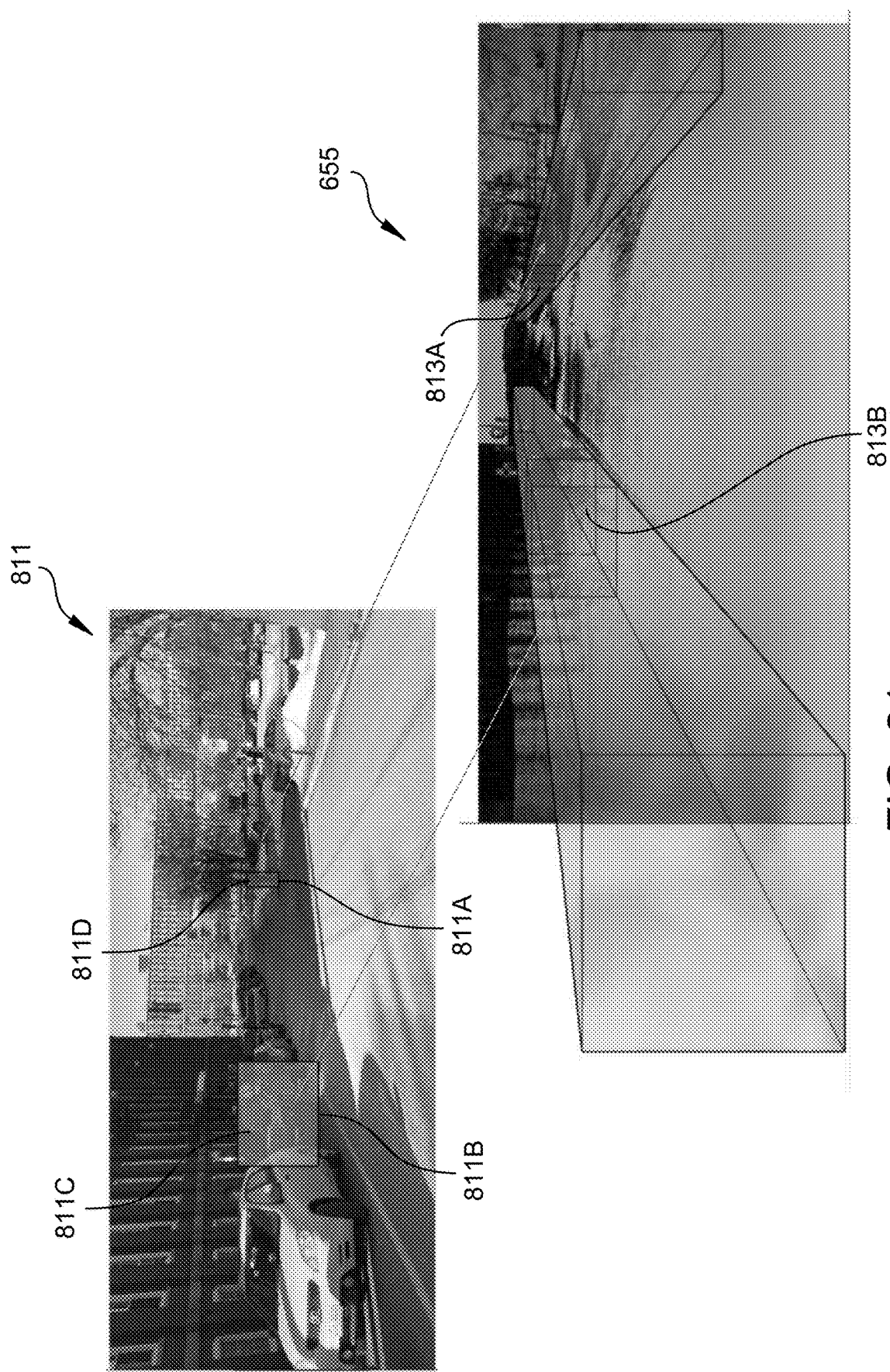

Referring now to FIGS. 20 and 21, perception subsystem 536 (FIG. 18B) and map management pipeline process 611 (FIG. 18A) can include object detection process 655 and object detection/classification process 6551 (FIG. 26) that can access image information 805 (FIG. 20) and/or depth information 807 (FIG. 20), and can classify objects. In some configurations, images can be inspected to find/classify objects, objects can be correlated to depth data, and bounding boxes can be drawn around objects in the depth data with classification. In some configurations, depth data can be inspected for objects, an image region of interest can be created to classify the objects, and bounding boxes can be drawn around objects in the depth data with classification. In some configurations, region-based convolutional neural networks can be used for visual object detection. In some configurations, stereo matching with stixel representation can be used to segment a scene into static background/infrastructure and moving objects. Object detection process 655 (FIG. 18B) and object detection/classification process 6551 (FIG. 26) can generate 2*d* bounding boxes 809 (FIG. 20) around the classified objects using conventional convolution neural networks. For example, vehicle 2*d* bounding box 811B (FIG. 21) can surround vehicle 811C in image 811. Pedestrian 2*d* bounding box 811A (FIG. 21) can surround pedestrian 811D in image 811. Object detection process 655 (FIG. 18B) and object detection/classification process 6551 (FIG. 26) can lift 2*d* bounding boxes to frustra, creating 3d bounding boxes. For example, vehicle 3*d* bounding box 813B (FIG. 21) can include vehicle 811C (FIG. 21), and pedestrian 3*d* bounding box 813A (FIG. 21) can include pedestrian 811D (FIG. 21). The front and back ends of 3*d* bounding boxes can be detected from a database of point cloud depth data. Raw point cloud data can also be used to provide data to a feature learning network, the feature learning network can partition the space into voxels, and can transform the points within each voxel to a vector representation characterizing the shape information.

Referring now to FIG. 22, object detection process 655 (FIG. 18B) and object detection/classification process 6551 (FIG. 26) can extract points from a bounding box that are associated with the object that has been identified within the bounding box. An associated 2*d* object classification can be used along with the extracted points to improve the 3*d* bounding box, i.e. modify the 3*d* bounding box so that it follows more closely the contours of the object within the 3*d* bounding box. For example, vehicle 811C (FIG. 21) within vehicle 3*d* bounding box 813B can be represented by vehicle points 815B, and pedestrian 811D (FIG. 21) within pedestrian 3*d* bounding box 813A can be represented by pedestrian points 815A. Object parameter estimation process 659 (FIG. 18B) can track bounding boxes in subsequent frames and combine these data with sensor data, such as, for example, but not limited to, radar data, to estimate parameters associated with objects. The parameters can include, but are not limited to including, velocity and acceleration. For example, when pedestrian 811D (FIG. 21) moves, pedestrian points 815A bounded by pedestrian 3*d* bounding box 813A can move to updated pedestrian 3*d* bounding box 817A, and can be associated with updated pedestrian points 817B.

Figure 23:
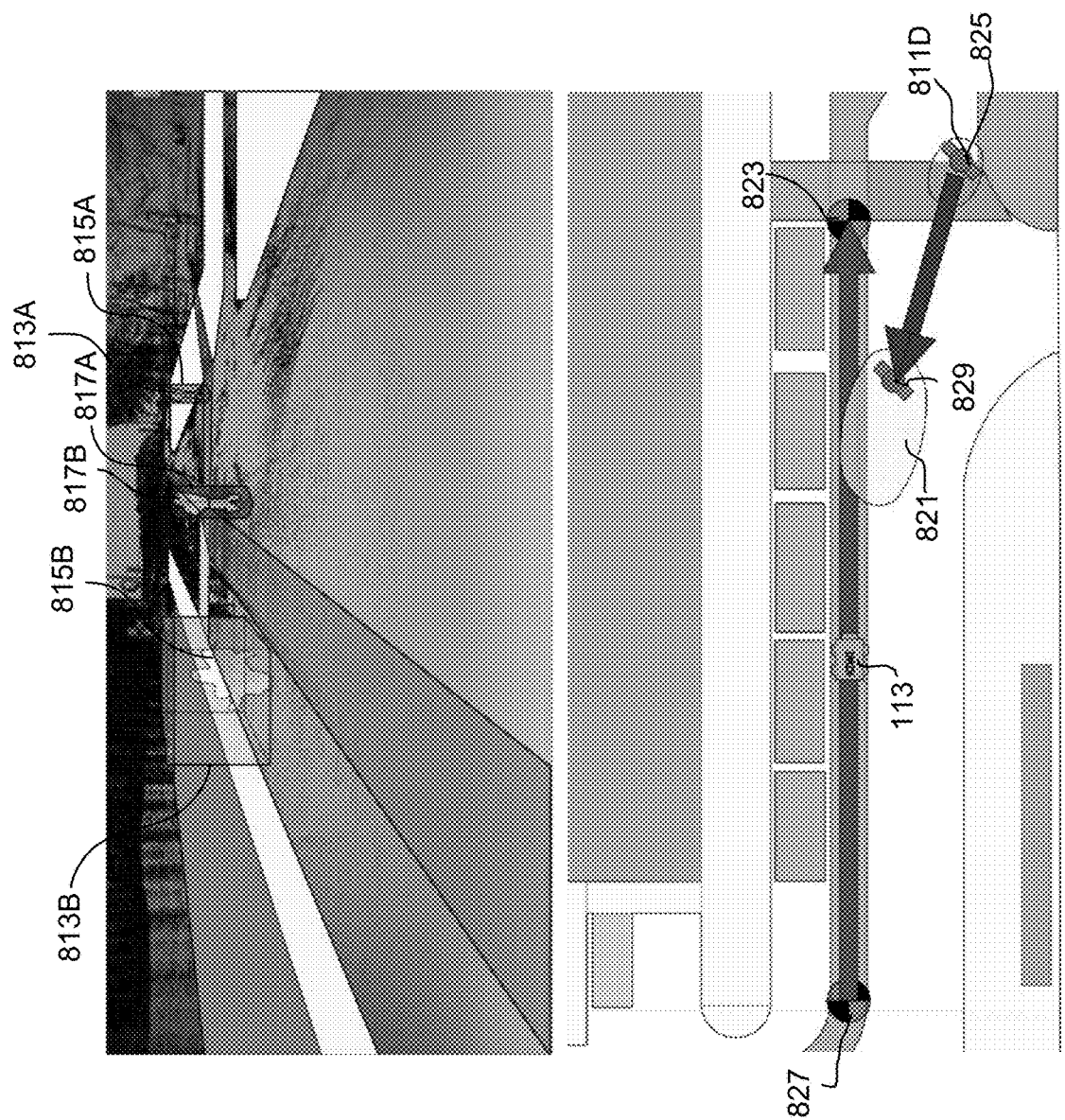
FIG. 23 is a pictorial representation of object parameter estimation of the present teachings.

Referring now to FIG. 23, object parameter estimation process 659 can combine the updated bounding box and point data with 2*d* classification information to produce a dynamic map scene. Object model/propagation process 661 can predict the movement of the objects in the dynamic map scene according to models associated with the classified objects. For example, pedestrians and moving vehicles can generally follow movement patterns that can enable the prediction of the future locations of these objects. Pedestrian 811D, for example, beginning movement at pedestrian starting location 825, can move at a speed and in a direction that can be estimated based on sensor data, and can be used by object model/propagation process 661 pedestrian model(s) to predict the location of pedestrian 811D at location 829. A measure of uncertainty can be factored into the location prediction based on any number of possible reasons a pedestrian would not follow a standard model. Pedestrian 811D can end up at ending location 829 or anywhere within uncertainty area 821. Utility vehicle 113 can begin travel at starting location 827 and can travel to ending location 823 in an amount of time that can be predicted by models of utility vehicles 113 executed by object model/propagation process 661. Object model/propagation process 661 (FIG. 18B) can estimate whether utility vehicle 113 will encounter obstacles based on the predicted starting and ending locations of utility vehicle 113 and any obstacles that could end up in its path. The proposed route can be modified depending on expected obstacles.

Figure 24:
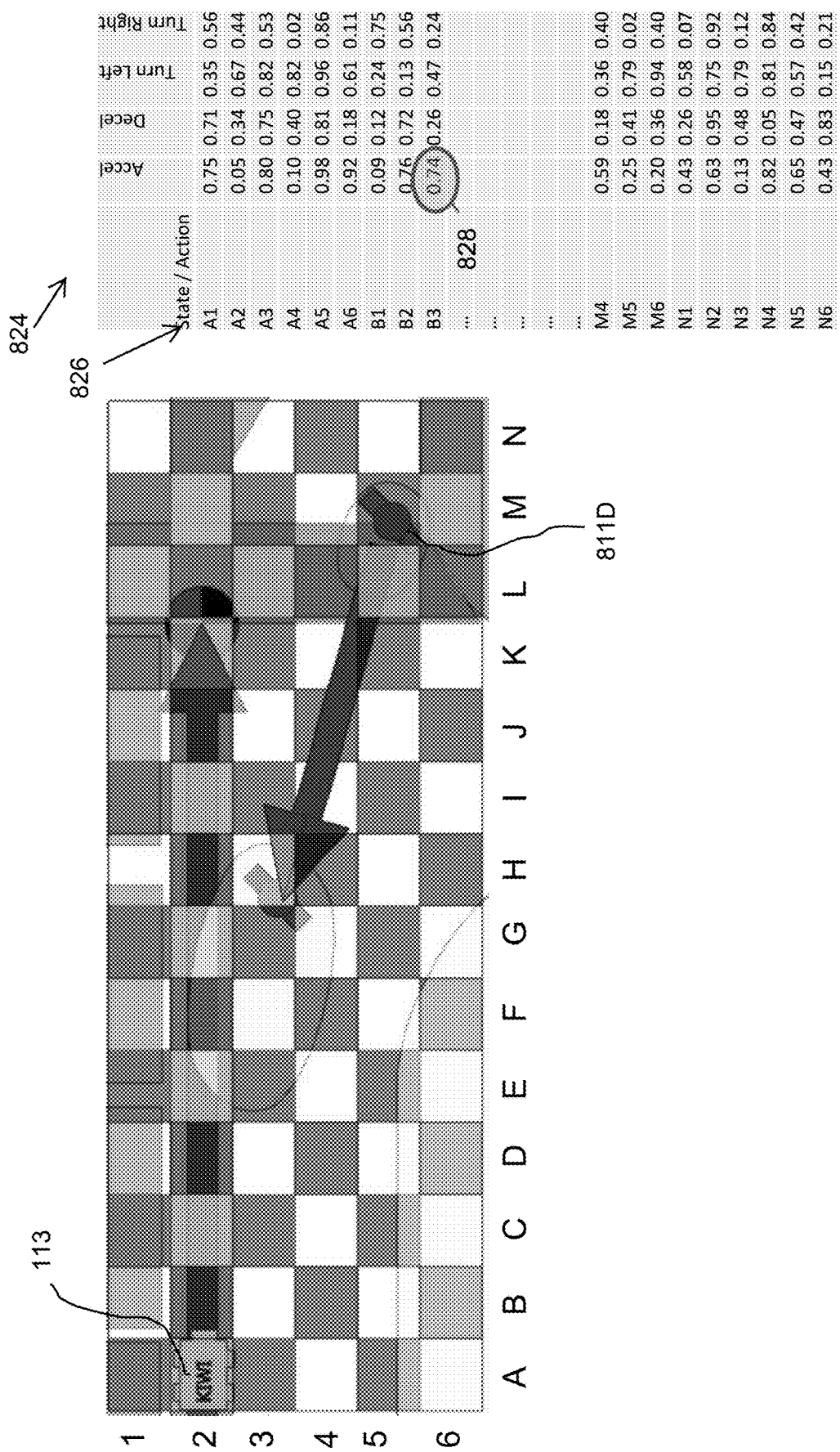
FIG. 24 is a pictorial representation of path planning processing of the present teachings.

Referring now to FIG. 24, path planning subsystem 517 can include, but is not limited to including, path planning control process 667 can include guided policy search that can use differential dynamic programming to generate guiding samples to assist in the policy search by exploring high reward regions. In some configurations, features 824 such as, for example, but not limited to, acceleration, deceleration, turn left, and turn right, and labels 826 such as, for example, state and action can be used to create models for path planning. The relationships between feature values 828 can be used to create the model. In some configurations, when features include actions, feature values 828 can be based at least on the reward for performing the action, the learning rate of the neural network, and the best reward obtainable from the state where the action places the actor. For example, when pedestrian 811D and utility vehicle 113 move, the model executed by path planning control process 667 can determine if/when the path of pedestrian 811D intersects with the path of utility vehicle 113 by predicting the movement of both pedestrian 811D and utility vehicle 113 using the model.

Figure 25:
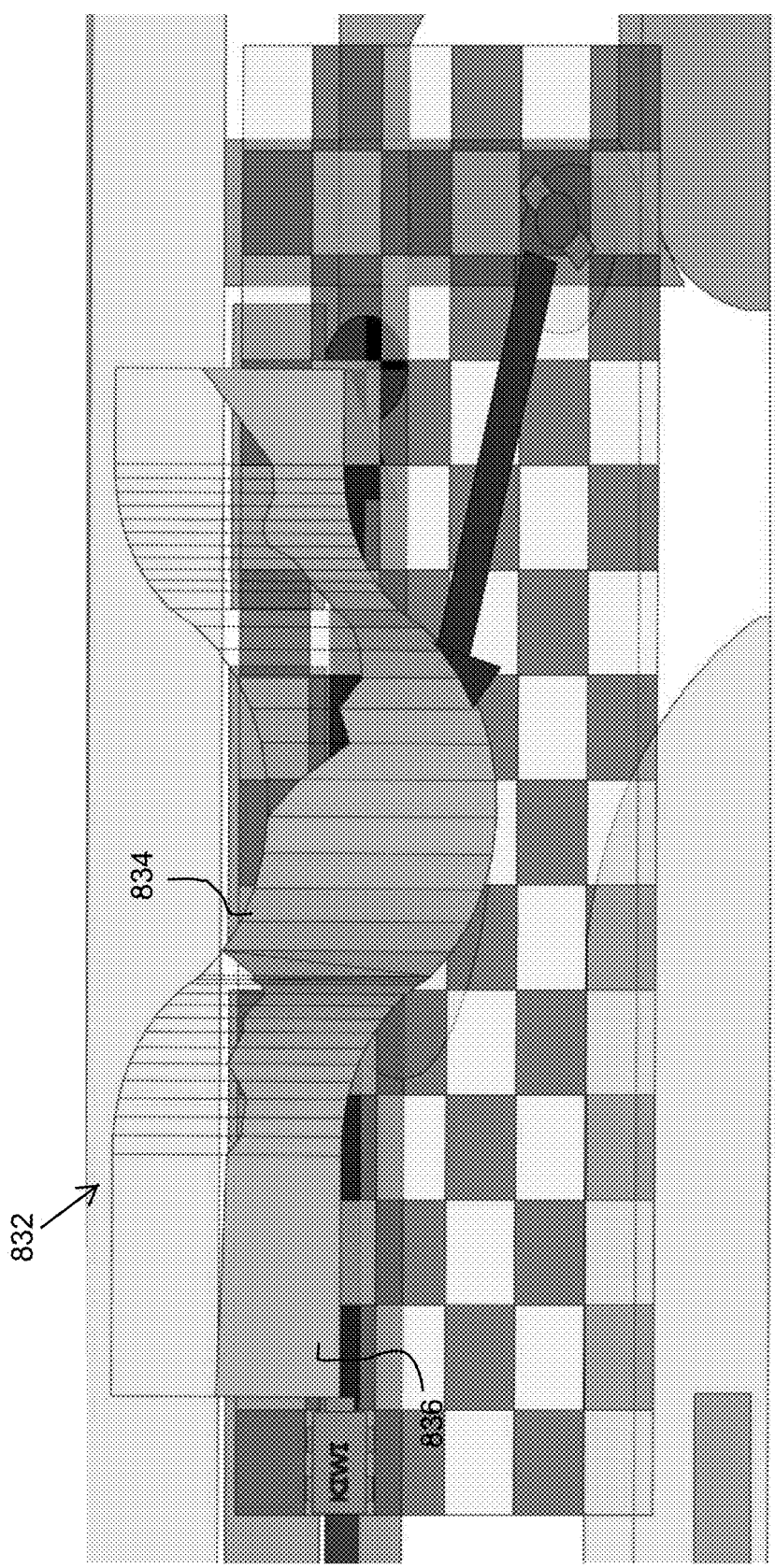
FIG. 25 is a pictorial representation of path following processing of the present teachings.

Referring now to FIG. 25, confidence values 832 can indicate the likelihood that the model predictions accurately predict the path convergence between obstacles. Confidence values 832 can be determined as the model is developed by executing the model in under test conditions. According to the model executed by path planning process 667, the likelihood of path convergence is highest in region 832, lowest in region 836, and moderately high in region 834.

Continuing to still further refer to FIG. 18A, when supervisory autonomous layer 703 is activated, remote control interface 603 can automatically control utility vehicle 113. Remote control interface 603 can, for example, receive data from system collectors 119 such as, for example, but not limited to, beacon 119C (FIG. 1) that can supplement and/or replace data that can be locally received by sensors 118 associated with utility vehicle 113. Beacon 119C (FIG. 1) can, for example, include overhead sensors whose data can be used to automatically update the delivery route being executed by utility vehicle 113. In some configurations, supervisory autonomous layer 703 can include, but is not limited to including, autonomous layer 701, remote control interface 603, fleet network interface 613, route planning 503, fleet map database 609, and map management pipeline 611. Route planning 503 can access fleet map database 609 and can prepare a proposed route between the location of the goods and the goods' destination. Route planning 503 can provide the proposed route to utility vehicle 113 through fleet network interface 613, communications network 115, and vehicle network interface 623 (also referred to herein as the communications route). Remote control interface 603 can automatically control the direction and speed of utility vehicle 113 as utility vehicle 113 travels along the updated delivery route based at least in part on data from system collectors 119. Supervisory autonomous layer 703 can take over control when, for example, but not limited to, utility vehicle 113 recognizes that sensors 118 could be returning faulty or no data. When faulty or no sensor data are available to utility vehicle 113 to continually update its travel route, utility vehicle 113 may request assistance from remote control interface 603.

Figure 26:
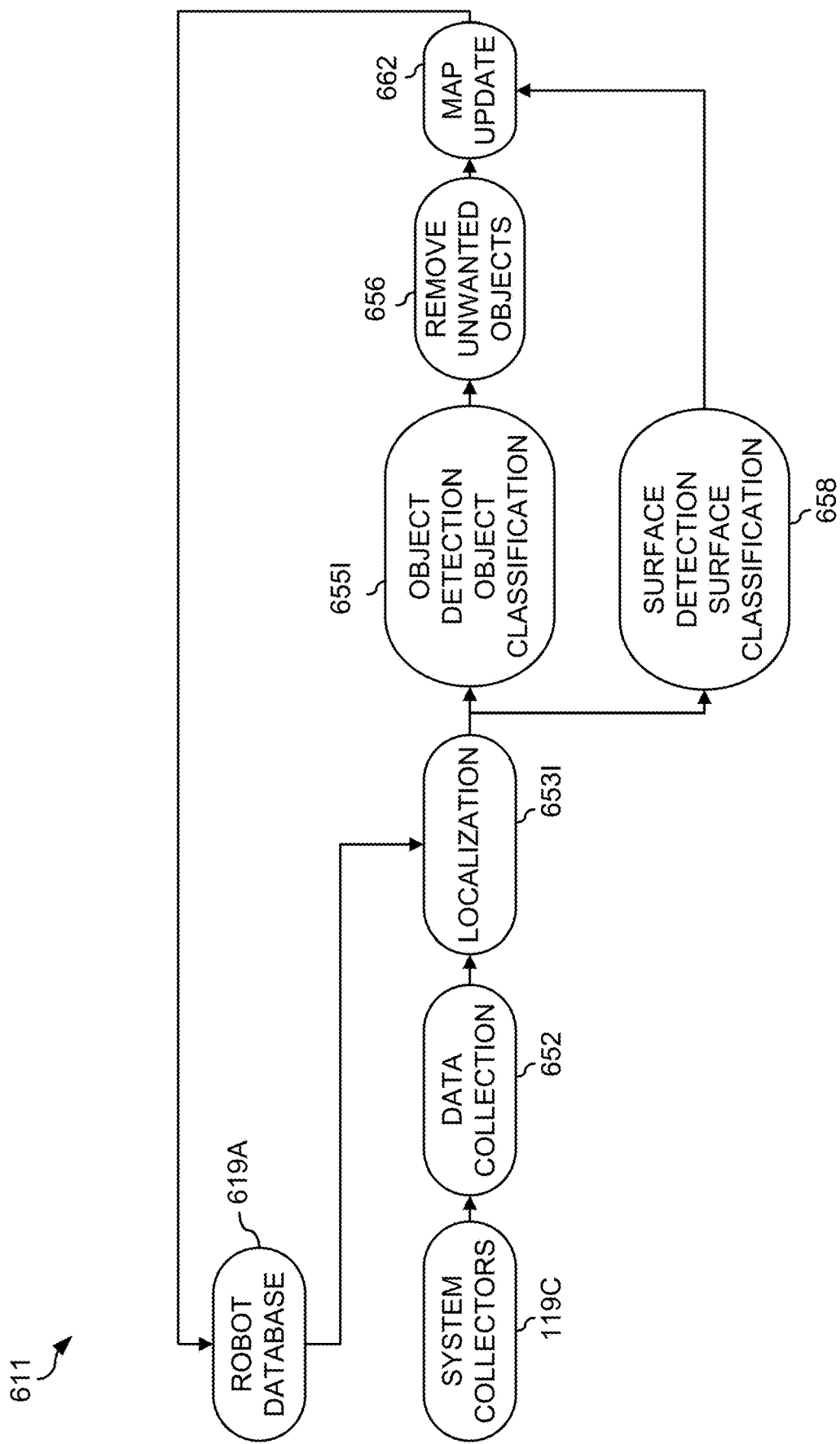
FIG. 26 is a schematic block diagram of the robot path processing with map update.
Figure 29:
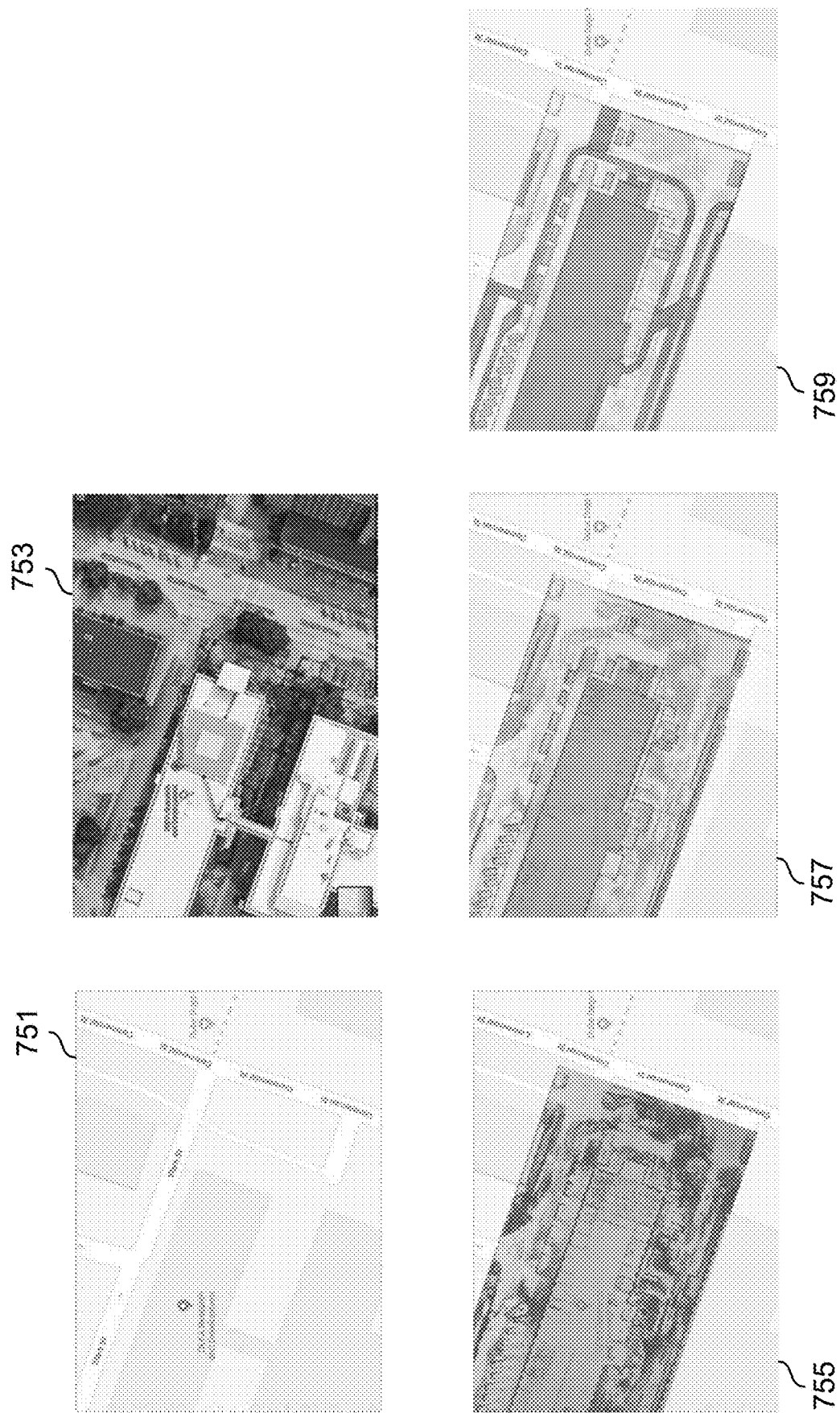
FIG. 29 is a pictorial representation of a subset of the steps involved in robot path processing.

Referring now primarily to FIG. 26, map management pipeline process 611 can provide maps to route planning process 503 (FIG. 18A), and those maps can be provided to utility vehicle 113 through the communications route. To provide maps, map management pipeline process 611 can access current map data 751 (FIG. 29), localize the data, detect and classify objects and surfaces, remove unwanted objects, and update current map data. Map management pipeline process 611 can include, but is not limited to including data collection process 652, route localization process 6531, object detection/classification process 6551, surface detection/classification process 658, object removal process 656, and map update process 662. Data collection process 652 can receive sensor data 753 (FIG. 29) from system collectors 119C and provide the data to localization process 6531. Localization process 6531 can receive sensor data 753 (FIG. 29) and current map data 751 (FIG. 29) from robot map database 619A. Robot map database 619A can include, but is not limited to including, map data as described herein. Other data that can optionally be included are pedestrian traffic densities, pedestrian crossing requirements, traffic signs, sidewalk locations, sidewalk conditions, and non-sidewalk drivable area. Current map data 751 (FIG. 29) can include information about the route between a starting location and a destination. Localization process 653 can create localized data 755 (FIG. 29) from current map data 751 (FIG. 29) and sensor data 753 (FIG. 29). Object detection process 6551 can detect and classify localized objects in current map data 751 (FIG. 29) and sensor data 753 (FIG. 29), and object removal process 656 can remove objects that meet pre-selected criteria from localized data 755 (FIG. 29). Surface detection process 658 can detect and classify localized surfaces in the current map data and the system collector data. Surface detection process 658 can detect solid surfaces such as, for example, but not limited to, brick walls, building corners, and jersey barriers. Surface detection process 658 can locate approximately horizontal surfaces, for example, but not limited to, surfaces that rise no more than a pre-selected number of degrees from horizontal. Surface detection process 658 can create a polygon in point cloud data associated with the delivery area, and match the polygon to an image that is temporally coincident with the point cloud data. The polygon can be projected onto the image, and the image within the polygon can be identified. Once identified, the image can be used to teach surface detection process 548 to identify the image automatically. Object removal process 656 and surface detection process 658 can provide the detected and classified objects 757 (FIG. 29) and surfaces, for example, but not limited to, driving surfaces 759 (FIG. 29), to map update process 662 which can update current map data 751 (FIG. 29) and provide the updated current map data to robot map database 619A.

Referring again to FIG. 18A, supervisory autonomous layer 703 can include remote control interface 603 that can take control of utility vehicle 113 under at least one pre-selected circumstance. Remote control interface 603 can receive sensor data and plan a path for utility vehicle 113 in real time. Remote control interface 603 can include, but is not limited to including, real time multi-robot path planning 503A, object identification and tracking 655A, robot tracking 603C, data receivers from utility vehicle 113, and data receivers for sensor data. Remote control interface 603 can execute in, for example, but not limited to, beacon 120C or any system collector 119C (FIG. 2) in the vicinity of utility vehicle 113. Real time multi-robot path planning 503A can receive data from any source that is in the vicinity of remote control interface 603 and utility vehicle 113. In some configurations, real time multi-robot path planning 503A can receive sensor data from traffic light interface 7122. Traffic light interface 7122 can receive sensor data from sensors mounted on traffic lights and other stationary features. In some configurations, real time multi-robot path planning 503A can receive sensor data from object identification and tracking process 655A. In some configurations, object identification and tracking process 655A can receive and process LIDAR 7124 and camera 7126 data. In some configurations, real time multi-robot path planning 503A can receive telemetry data 603A from vehicle tracking process 603C. Vehicle tracking process 603A can process data from utility vehicle 113 to create telemetry data 603A. Real time multi-robot path planning 503A can use the received data to prepare an obstacle-free path for utility vehicle according to conventional path planning methods. Real time multi-robot path planning 503A can provide the path to vehicle command 603B that can generate movement commands for utility vehicle 113.

Referring again to FIG. 18A, in some configurations, fleet manager 601 can manage dispatcher 501 by insuring that utility vehicles 113 are efficiently allocated, and can monitor deployment. Fleet manager 601 can receive requests for deliveries and decide which utility vehicles 113 are available and/or which utility vehicles 113 can most efficiently perform the requested deliveries. Fleet manager 601 can direct dispatcher 501 to begin the process of providing utility vehicle(s) 113 for a requested delivery. Dispatcher 501 can provide the location of the goods and the destination to which the goods are to be provided to route planning 503.

Figure 27:
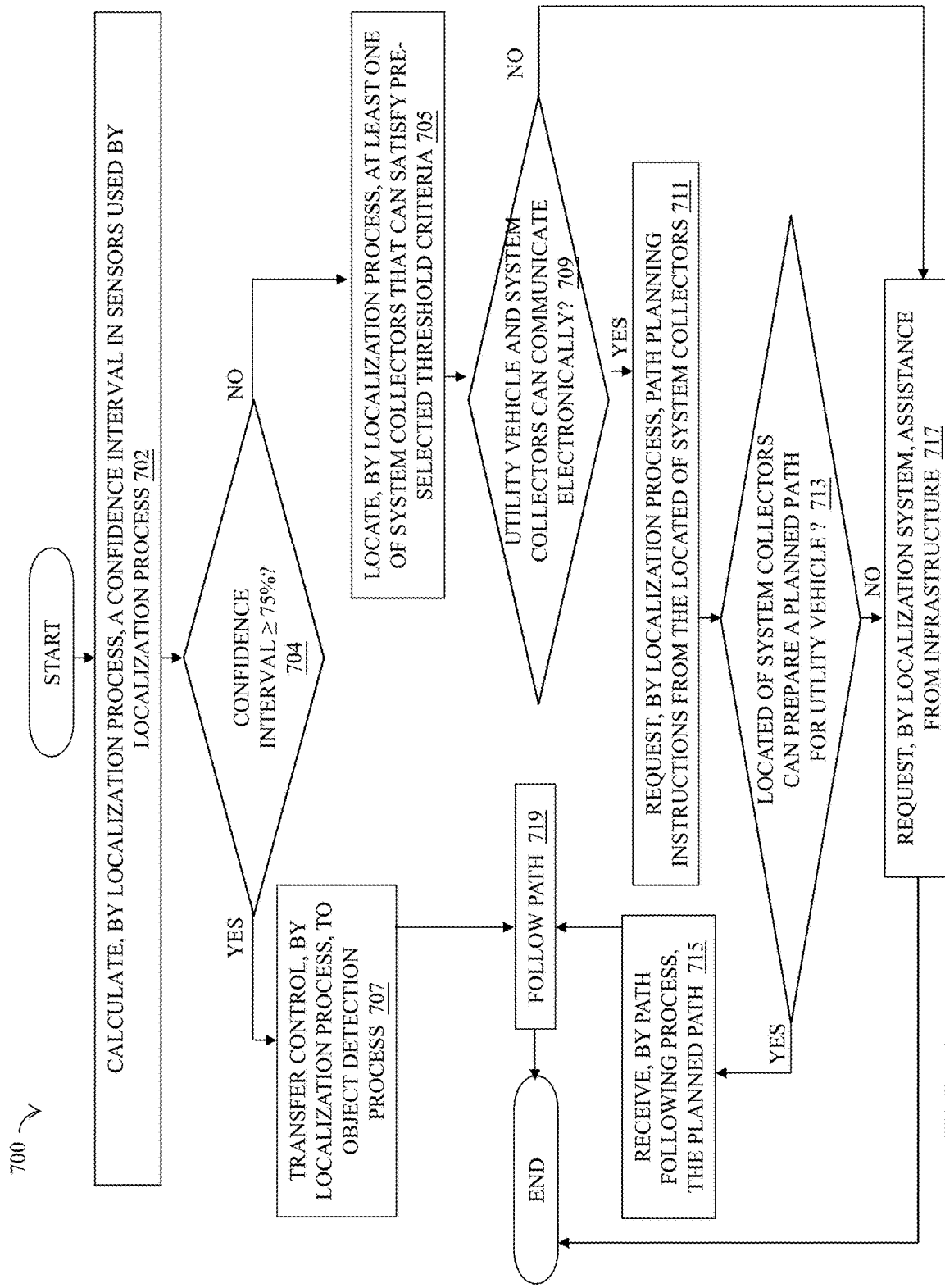
FIG. 27 is a flowchart of the method for managing control of the vehicle of the present teachings.
Figure 28:
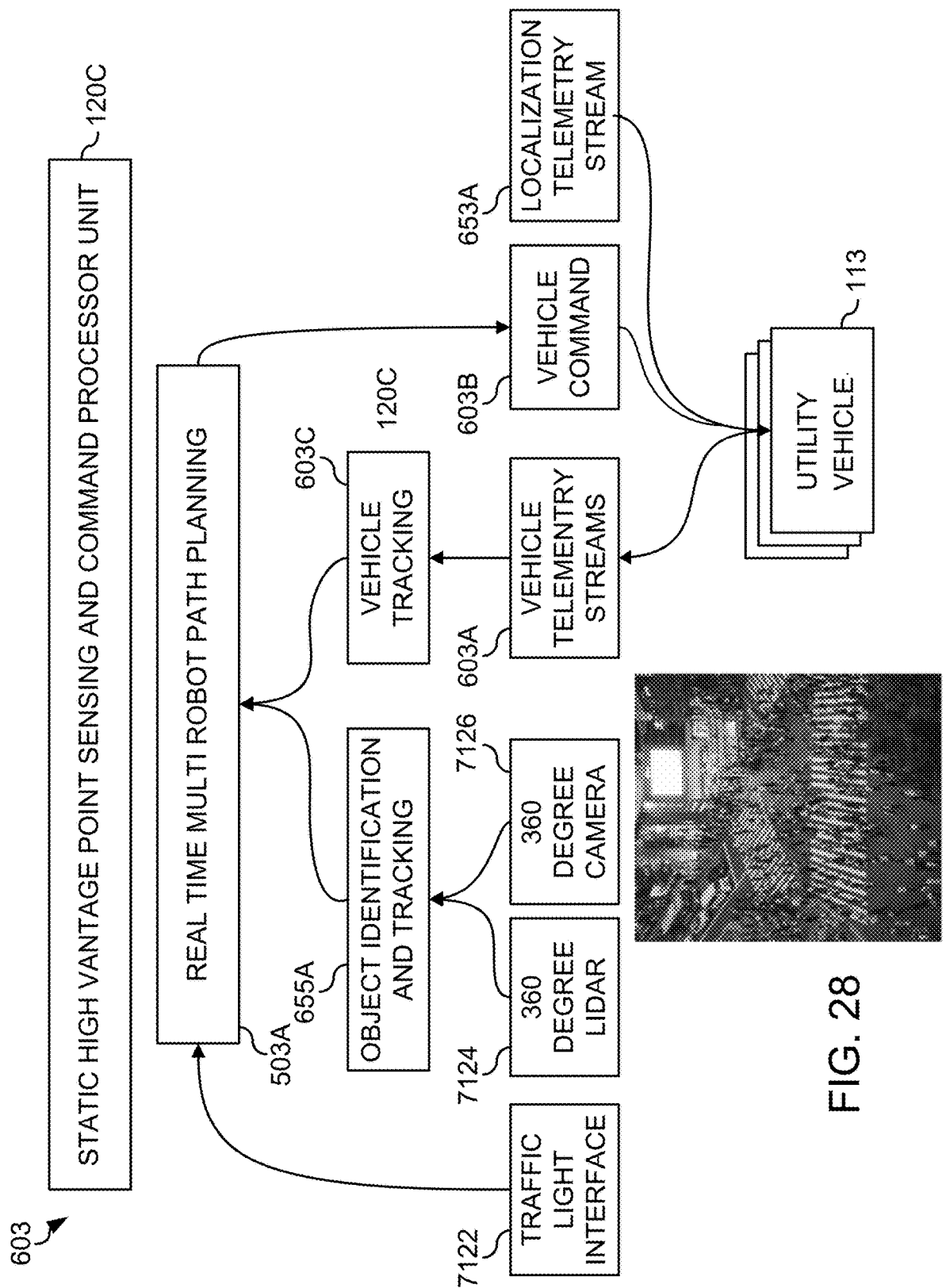
FIG. 28 is a schematic block diagram of multi-robot path planning of the present teachings.

Referring now primarily to FIGS. 27 and 28, supervisory autonomous layer 703 (FIG. 18A) can rescue utility vehicle 113 (FIG. 28) automatically under some circumstances. In other circumstances, utility vehicle 113 (FIG. 28) can encounter situations that could require a non-automated response. Human autonomous layer 705 (FIG. 18A) can provide such support. One way to determine to which layer to hand over control of utility vehicle 113 (FIG. 28) is to determine if sensors that are providing path-relevant information to utility vehicle 113 (FIG. 28) are providing accurate data. Localization process 653 (FIG. 18B) can include a fall-over sequence, that can include method 700 (FIG. 27). Method 700 (FIG. 27) can manage transfer of control of utility vehicle 113 (FIG. 28) when assistance is required. Method 700 (FIG. 27) can include, but is not limited to including, calculating 702 (FIG. 27), by localization process 653 (FIG. 18B), a confidence interval in the sensors whose data are used by localization process 653 (FIG. 18B), for example, but not limited to, sensors 118 (FIG. 18B), that can provide local perception. The confidence interval is calculated based at least on whether the signal to noise ratio in the sensor data is low, for example, if image contrast is within a pre-selected range. If 704 (FIG. 27) the confidence interval is greater than or equal to a pre-selected percentage, method 700 (FIG. 27) can include transferring 707 (FIG. 27) control, by localization process 653 (FIG. 18B), to object detection process 655 (FIG. 18B). After completing execution of perception process 536 (FIG. 18B) and path planning process 517 (FIG. 18B), method 700 (FIG. 27) can include following 719 (FIG. 27), by path following process 523 (FIG. 18B), the planned path. If 704 (FIG. 27) the confidence interval is less than a pre-selected percentage, method 700 (FIG. 27) can include locating 706 (FIG. 27), by localization process 653 (FIG. 18B), at least one of system collectors 119 (FIG. 2) that can satisfy pre-selected threshold criteria or a single threshold criterion. The threshold criteria can include, but are not limited to including, geographic location relative to utility vehicle 113 (FIG. 28), height of system collector 119 (FIG. 2), processing capability of system collector 119 (FIG. 2), and status of system collector 119 (FIG. 2). If 709 (FIG. 27) utility vehicle 113 (FIG. 28) and the located of system collectors 119 (FIG. 2) can communicate electronically, method 700 (FIG. 27) can include requesting 711 (FIG. 27), by localization process 653 (FIG. 18B), path planning instructions from the located of system collectors 119 (FIG. 2). If 713 (FIG. 27) the located of system collectors 119 (FIG. 2) can prepare a planned path for utility vehicle 113 (FIG. 28), method 700 (FIG. 27) can include receiving 715 (FIG. 27), by path following process 523 (FIG. 18B), the planned path, and following 719 (FIG. 27), by path following 523 (FIG. 18B), the planned path. If 713 (FIG. 27) the located of system collectors 119 (FIG. 2) cannot prepare a planned path for utility vehicle 113 (FIG. 28), or if 709 (FIG. 27) utility vehicle 113 (FIG. 28) and the located of system collectors 119 (FIG. 2) cannot communicate electronically, method 700 (FIG. 27) can include requesting 717 (FIG. 27), by localization system 653 (FIG. 18B) assistance from infrastructure 6128 (FIG. 18A).

Figure 30:
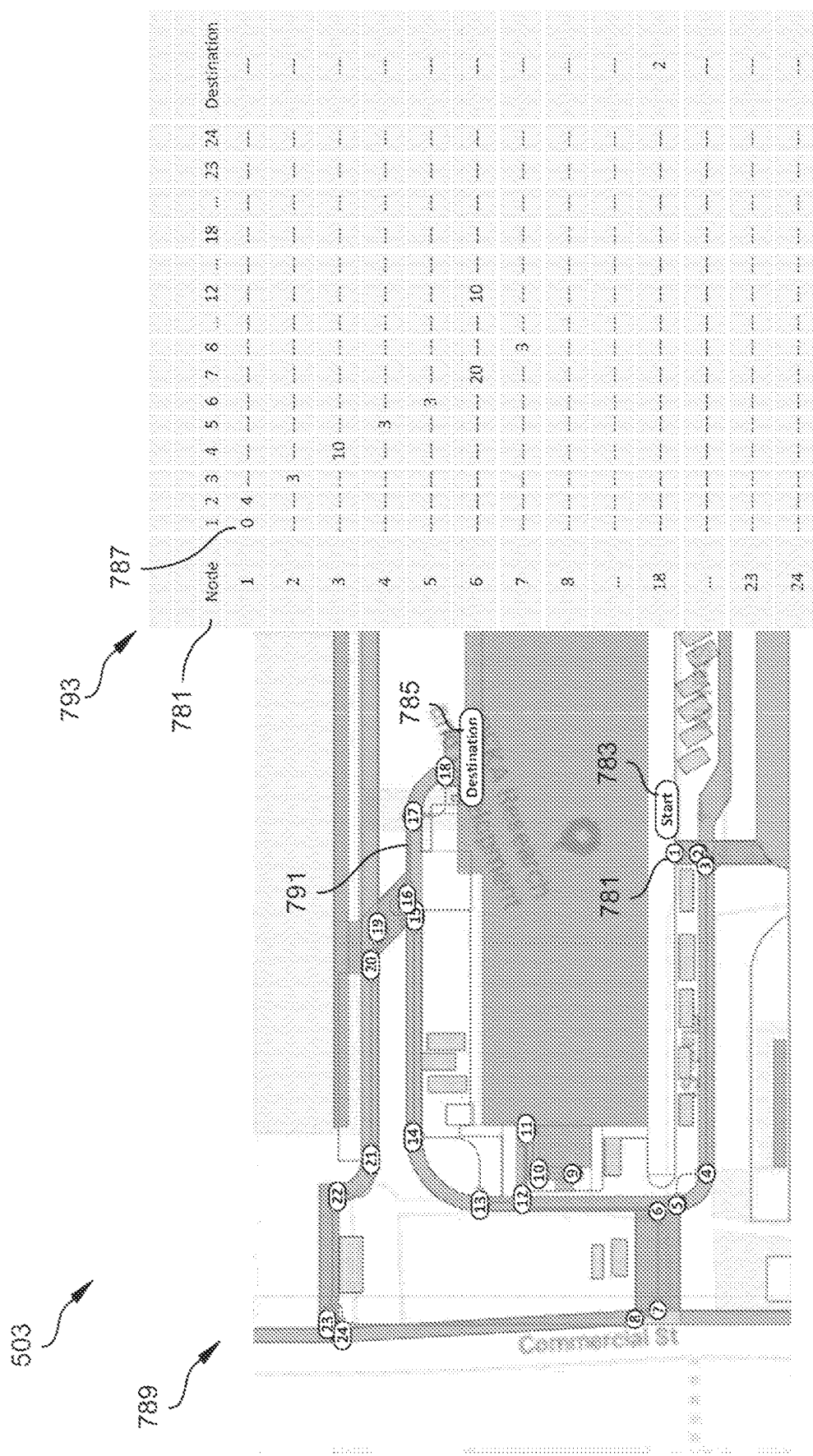
FIG. 30 is a pictorial representation of static route map construction of the present teachings.

Referring now to FIGS. 29 and 30, route planning process 503 (FIG. 30) can create a route map that can be used to create a path for utility vehicle 113 (FIG. 2) to follow. Route planning process 503 (FIG. 30) can form a series of connected nodes 781 (FIG. 30) based on map 751 (FIG. 29), start location 783 (FIG. 30), and destination location 785 (FIG. 30). Route planning process 503 (FIG. 30) can assign costs 787 (FIG. 30) to each segment at each of nodes 781 (FIG. 30). Assigned costs 787 (FIG. 30) can be based at least on detected and classified objects 757 (FIG. 29), identified driving surfaces 759 (FIG. 29), and localized sensor data 755 (FIG. 29), and conventional route planning algorithms that take into account the distance between nodes 781 (FIG. 30), the road surface, and the complexity of the travel route. Route planning process 503 (FIG. 30) can traverse graph 793 (FIG. 30) of costs 787 (FIG. 30) to create lowest cost path 791 (FIG. 30), and can overlay lowest cost path 791 (FIG. 30) on route map 789 (FIG. 30), a subset of map 751 (FIG. 30) corresponding to the geographic location of lowest cost path 791 (FIG. 30).

Figure 31:
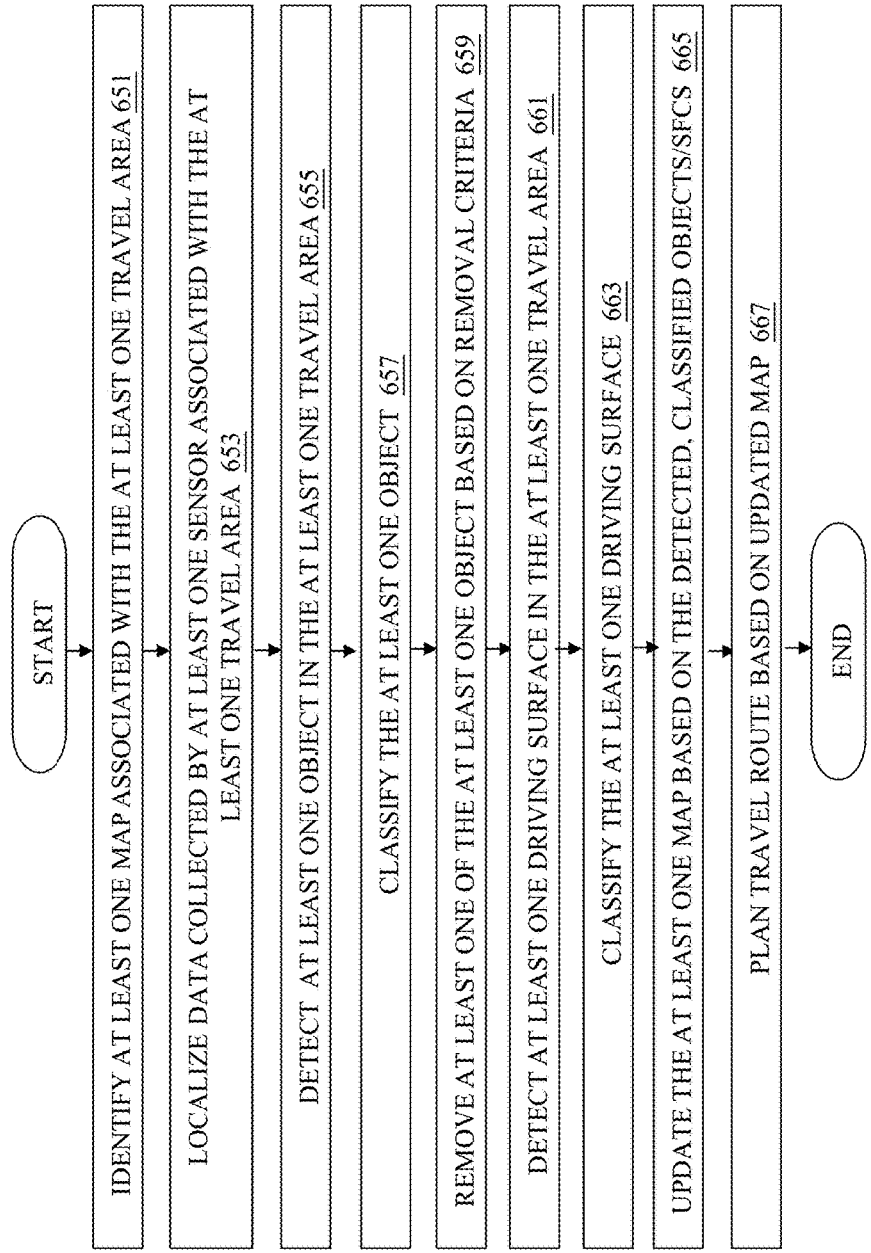
FIG. 31 is a flowchart of the method of map management of the present teachings.

Referring now to FIG. 31, method 650 for providing maps to route planning process 503 (FIG. 18A) can include, but is not limited to including, identifying 651 at least one map associated with a delivery area, where the map includes the path between a starting location and a destination. Method 650 can include localizing 653 data associated with the map and with data collected by at least one sensor associated with the delivery area. Method 650 can include detecting 655 at least one localized object in the at least one delivery area, classifying 657 the at least one localized object, and removing 659, when necessary, at least one of the localized objects based at least on removal criteria. Method 650 can include detecting 661 at least one localized surface in the at least one delivery area, and classifying 663 the at least one localized object. Method 650 can include updating 665 the map with the localized objects and surfaces, and planning 667 a utility vehicle route based at least on the updated map.

Figure 32A:
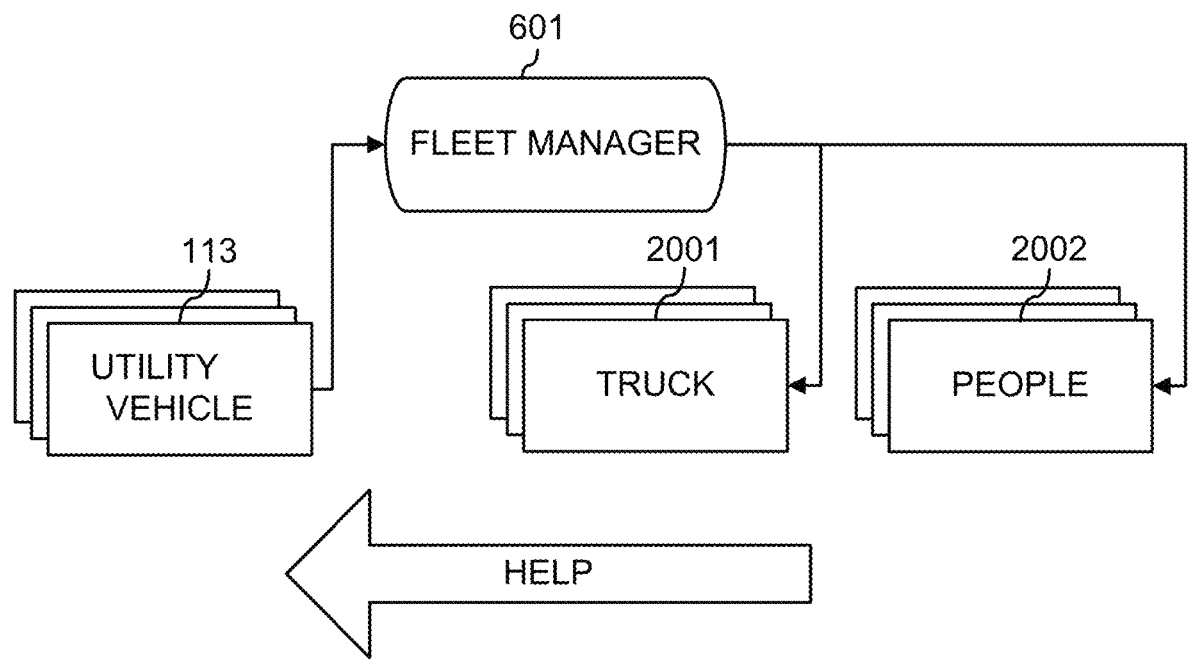
FIGS. 32A-32B are schematic block diagrams of fleet management components of the present teachings.

Referring now to FIG. 32A, human autonomous layer 705 can include, but is not limited to including, autonomous layer 701 (FIG. 18A) and infrastructure 6128 (FIG. 18A). Infrastructure 6128 can include, but is not limited to including, fleet manager 601 that can insure communication and coordination among the fleet members, among which are utility vehicles 113. Fleet manager 601 can, for example, execute in any appropriately-configured processor that is in electronic communications with fleet members. Utility vehicles 113 can send alerts to fleet manager 601, and fleet manager 601 can triage the alerts according to pre-selected criteria. In some configurations, fleet manager 601 can provide a first set of responses to alerts that are generated by utility vehicles 113 that are in a pre-selected geography relative to fleet assets, for example, trucks 2001. Fleet manager 601 can provide a second set of responses, that could be the same or different from the first set of responses, depending on the capabilities of the fleet assets. Fleet manager 601 can provide a third set of responses if utility vehicle 113 reports a malfunction. For example, as part of the third set of responses, fleet manager 601 can locate the fleet asset that is closest to utility vehicle 113 and that also includes repair capabilities appropriate for the malfunction. Fleet manager 601 can provide a fourth set of responses if utility vehicle 113 needs to deliver to an unreachable location, for example, a location that includes unnavigable terrain. For example, as part of the fourth set of responses, fleet manager 601 can request help from a human asset who has been trained to assist utility vehicles 113. Fleet manager 601 can include response sets for any number of use cases.

Figure 32B:
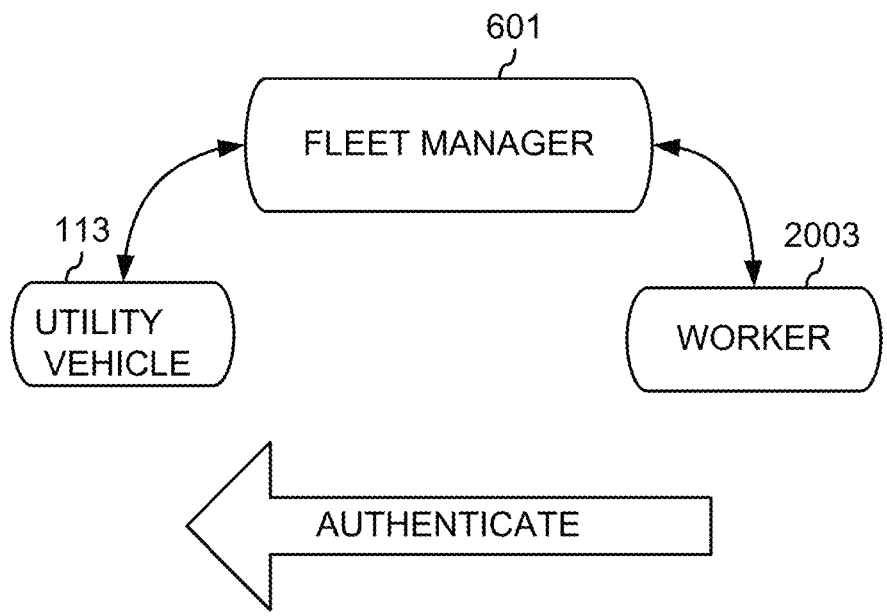

Referring now to FIG. 32B, fleet manager 601 can manage security screening of any entity that can have access to utility vehicles 113. Fleet manager 601 can include, but is not limited to including, authentication and roll-based access control. For entities that are known to fleet manager 601, credentials can be proved by something that the entity has, or something that the entity knows. For example, when utility vehicle 113 needs help, a remote operator 2002 can authenticate to take control of utility vehicle 113. In some configurations, a local employee known to fleet manager 601 who has a specific capability can take control of utility vehicle 113 and can authenticate to fleet manager 601 to perform a task. In some configurations, the entity can have a portable device, for example, that can be used as a credential. In some configurations, characteristics of the entity that are known to fleet manager 601 can be used for security purposes, for example, the entity's employment shift and employment location. Fleet manager 601 can manage authentication by remote entities or local entities. Authentication can be achieved by, for example, entering a password into a portable device when pre-selected criteria are met. Fleet manager 601 can identify utility vehicles 113 through, for example, but not limited to, cryptographic keys managed by fleet manager 601. Fleet manager 601 can combine the provable identity of utility vehicle 113 with the provable identity of worker 2003, can check the access controls of worker 2003, and can signal utility vehicle 113 to allow access to utility vehicle 113 by worker 2003. Access can include physical or remote access. If utility vehicle 113 is not able to communicate with fleet manager 601, fleet manager 601 can deploy assistants to rescue utility vehicle 113.

While the present teachings have been described in terms of specific configurations, it is to be understood that they are not limited to these disclosed configurations. Many modifications and other configurations will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A utility execution system delivering goods from at least one starting point to at least one utility execution point, the utility execution system comprising:
    a plurality of system collectors, the system collectors forming a communications network, the system collectors accessing historic data associated with a proposed path between the at least one starting point and the at least one utility execution point, the plurality of system collectors including at least one utility vehicle, the at least one utility vehicle including at least one sensor and at least one storage container, the at least one storage container housing the goods, the historic data including vehicle data previously collected along the proposed path, the plurality of system collectors collecting real time data about the proposed path before and while the at least one utility vehicle navigates the proposed path, at least one of the plurality of system collectors updating the proposed path based at least on the vehicle data, the historic data, and the real time data; and
    a processor continually updating, based at least on the historic data, the real time data, and the at least one sensor, the updated proposed path as the at least one utility vehicle navigates the updated proposed path from the at least one starting point to the at least one utility execution point, the processor configured to locate at least one obstacle in the updated proposed path, the processor updating the updated proposed path when the at least one obstacle is discovered, the processor configured to access image information, the processor configured to classify the at least one obstacle in the image information, the processor configured to draw bounding boxes around the classified at least one obstacle, the processor configured to segment the classified at least one obstacle into static obstacles and moving obstacles, the processor configured to track the bounding boxes of the moving obstacles over time, the processor configured to combine the tracked bounding boxes with sensor data from the at least one sensor to estimate parameters associated with the moving obstacles, the processor configured to predict movement of the moving obstacles based at least on the parameters and models associated with the moving obstacles forming an obstacle movement prediction, the processor configured to estimate uncertainty associated with the obstacle movement prediction, the processor configured to predict if the moving obstacles will end up in the updated proposed path of the at least one utility vehicle based at least on the obstacle movement prediction forming a collision prediction, the processor configured to modify the updated proposed path based at least on the collision prediction.

2. The utility execution system as in claim 1 wherein the processor executes in the at least one utility vehicle.

3. The utility execution system as in claim 1 wherein the processor executes in a server.

4. The utility execution system as in claim 1 wherein the plurality of system collectors comprises:
    at least one autonomous vehicle.

5. The utility execution system as in claim 1 wherein the plurality of system collectors comprises:
    at least one beacon positioned along the updated proposed path, the at least one beacon receiving and transmitting data over the communications network.

6. The utility execution system as in claim 1 wherein the plurality of system collectors comprises:
    at least one beacon positioned along the updated proposed path, the at least one beacon providing fiducial information to the utility execution system.

7. The utility execution system as in claim 1 wherein the plurality of system collectors comprises:
    at least one vehicle operating on a city sidewalk.

8. The utility execution system as in claim 1 wherein the plurality of system collectors comprises:
    at least one vehicle operating on a rural street.

9. The utility execution system as in claim 1 wherein the at least one utility vehicle comprises:
    at least one localization subsystem detecting, based at least on the historic data and the real time data, the current location and situation of the at least one utility vehicle.

10. The utility execution system as in claim 1 wherein the at least one utility vehicle comprises:
    at least one localization subsystem detecting, based at least on the historic data, the current location and situation of the at least one utility vehicle.

11. The utility execution system as in claim 1 wherein the plurality of system collectors comprises:
    at least one wireless access point.

12. The utility execution system as in claim 1 wherein the at least one utility vehicle comprises:
a preferred route subsystem determining at least one preferred path between the at least one starting point and the at least one utility execution point based at least on the historic data and the real time data, the preferred route subsystem determining at least one avoidable path between the at least one starting point and the at least one utility execution point based at least on the number of the at least one obstacle in the updated proposed path.

13. The utility execution system as in claim 12 further comprising:
a dispatching mechanism coupling the at least one delivery truck with the at least one utility vehicle, the dispatching mechanism tracking battery life in the at least one utility vehicle, the dispatching mechanism enabling the at least one utility vehicle to respond to a summons.

14. The utility execution system as in claim 1 wherein the at least one utility vehicle comprises:
a road obstacle-climbing subsystem detecting at least one road obstacle, the road obstacle-climbing subsystem commanding the at least one utility vehicle to crest the at least one road obstacle, the road obstacle-climbing subsystem commanding the at least one utility vehicle to maintain balance and stability while traversing the at least one road obstacle.

15. The utility execution system as in claim 14 wherein the at least one road obstacle comprises a curb.

16. The utility execution system as in claim 14 wherein the at least one road obstacle comprises a step.

17. The utility execution system as in claim 1 wherein the at least one utility vehicle comprises:
a stair-climbing subsystem detecting at least one stair, the stair-climbing subsystem commanding the at least one utility vehicle to encounter and traverse the at least one stair, the stair-climbing subsystem commanding the at least one utility vehicle to achieve stabilized operation while traversing the at least one stair.

18. The utility execution system as in claim 1 wherein the processor comprises:
a rules compliance subsystem accessing navigation rule information from at least one of the historic data, the real time data, and the at least one sensor, the rules compliance subsystem commanding the at least one utility vehicle to navigate at least according to the navigation rule information, the system collectors learning the navigation rule information as the system collectors operate and interact with the updated proposed navigation path.

19. The utility execution system as in claim 1 further comprising a training subsystem including a neural network.

20. The utility execution system as in claim 1 wherein the at least one utility vehicle comprises:
a grouping subsystem commanding at least one second of the at least one utility vehicle to follow a first of the at least one utility vehicle, the grouping subsystem maintaining a coupling between the first utility vehicle and the at least one second utility vehicle.

21. The utility execution system as in claim 20 wherein the coupling comprises an electronic coupling.

22. The utility execution system as in claim 1 wherein the at least one utility vehicle comprises:
at least one battery, the battery including a quick charge feature, the quick charge feature accommodating a minimum amount of non-operational time of the at least one utility vehicle.

23. The utility execution system as in claim 22 wherein the at least one battery comprises:
a locking feature locking the at least one battery to the at least one utility vehicle, the locking feature including a security feature to enable removal of the at least one battery.

24. The utility execution system as in claim 1 wherein the at least one utility vehicle comprises:
at least one battery, the battery including a quick change feature, the quick change feature accommodating a minimum amount of non-operational time of the at least one utility vehicle.

25. The utility execution system as in claim 1 further comprising:
a sensor subsystem processing data from the at least one sensor, the at least one sensor including:
at least one heat sensor sensing live objects;
at least one camera sensing moving objects;
at least one laser sensor providing a point cloud representation of an object, the laser sensor sensing distance to an obstacle;
at least one ultrasonic sensor sensing distance to the obstacle; and
at least one radar sensor sensing speed of the obstacle, and weather and traffic proximate to the at least one utility vehicle;
a sensor fusion subsystem fusing data from a plurality of the at least one sensor, the sensor fusion subsystem classifying the at least one obstacle; and
a behavior model subsystem predicting a future position of the at least one obstacle.

26. The utility execution system as in claim 1 further comprising:
a sensor subsystem processing data from the at least one sensor, the at least one sensor including at least two of:
at least one heat sensor sensing dynamic objects;
at least one camera sensing moving objects;
at least one laser sensor providing a point cloud representation of an object, the laser sensor sensing distance to an obstacle;
at least one ultrasonic sensor sensing distance to the obstacle; and
at least one radar sensor sending speed of the obstacle, and weather and traffic proximate to the at least one utility vehicle;
a sensor fusion subsystem fusing data from a plurality of the at least one sensor, the sensor fusion subsystem classifying the at least one obstacle; and
a behavior model subsystem predicting a future position of the at least one obstacle.

27. The utility execution system as in claim 1 wherein the plurality of system collectors comprises:
at least one delivery truck transporting the goods to the at least one utility vehicle, the at least one delivery truck transporting the at least one utility vehicle to at least one delivery location.

28. The utility execution system as in claim 27 wherein the at least one delivery truck enabling exchanging of a spent at least one battery with a charged at least one battery in the at least one utility vehicle.

29. The utility execution system as in claim 27 wherein the at least one delivery truck comprises at least one battery charging feature.

30. The utility execution system as in claim 27 wherein the at least one delivery truck comprising:
  at least one lift mechanism enabling ingress and egress of the at least one utility vehicle.

31. The utility execution system as in claim 27 wherein the at least one delivery truck comprising:
  at least one in-lift feature enabling ingress of the at least one utility vehicle; and
  at least one out-lift feature enabling egress of the at least one utility vehicle,
  wherein the delivery truck is capable of moving during the ingress and the egress.

32. The utility execution system as in claim 27 wherein the plurality of system collectors comprises:
  at least one airborne vehicle transporting the goods to the at least one delivery truck.

33. The utility execution system as in claim 1 wherein the plurality of system collectors comprises:
  at least one beacon sensing the at least one obstacle, the at least one beacon enabling communication among the plurality of system collectors, the at least one beacon protecting the sensor data exchanged between the at least one beacon and the plurality of system collectors from tampering, the at least one beacon being physically separate from the at least one utility vehicle, the at least one beacon collecting the sensor data from the updated proposed path.

34. The utility execution system as in claim 1 wherein at least one of the static obstacles comprises a stair.

\* \* \* \* \*